US012030668B2

(12) United States Patent
Ratajczak et al.

(10) Patent No.: US 12,030,668 B2
(45) Date of Patent: Jul. 9, 2024

(54) FLYING VEHICLE SYSTEMS AND METHODS

(71) Applicant: Workhorse Group Inc., Loveland, OH (US)

(72) Inventors: Jay Ratajczak, Maineville, OH (US); Wei Wei, Mason, OH (US); Haonan Zhang, Mason, OH (US); Thaddeus Bort, Loveland, OH (US)

(73) Assignee: Workhorse Group Inc., Loveland, OH (US)

( * ) Notice: Subject to any disclaimer, the term of this patent is extended or adjusted under 35 U.S.C. 154(b) by 544 days.

(21) Appl. No.: 17/223,589

(22) Filed: Apr. 6, 2021

(65) Prior Publication Data

US 2021/0309358 A1    Oct. 7, 2021

Related U.S. Application Data

(60) Provisional application No. 63/005,652, filed on Apr. 6, 2020.

(51) Int. Cl.
  *B64F 1/36*    (2024.01)
  *B60L 5/36*    (2006.01)
  (Continued)

(52) U.S. Cl.
  CPC .............. *B64F 1/364* (2013.01); *B60L 5/36* (2013.01); *B60L 50/66* (2019.02); *B60L 53/14* (2019.02);
  (Continued)

(58) Field of Classification Search
  CPC .... B64F 1/364; B64F 1/32; B60L 5/36; B60L 50/66; B60L 53/14; B60L 53/80;
  (Continued)

(56) References Cited

U.S. PATENT DOCUMENTS 2,467,112 A  *  4/1949  Cowgill, Jr. ............. B64D 1/22
                                                       258/1.6
3,611,371 A  *  10/1971  Morse ....................... G01S 7/22
                                                       342/29
(Continued)

FOREIGN PATENT DOCUMENTS

CN       103523238         1/2014
DE      19904380 A1        10/1999
(Continued)

OTHER PUBLICATIONS

International Search Report; ISA/US, Commissioner for Patents; International Application No. PCT/US2021/025990; Aug. 18, 2021; 6 pages.

(Continued)

*Primary Examiner* — Medhat Badawi
(74) *Attorney, Agent, or Firm* — Taft Stettinius & Hollister LLP

(57) ABSTRACT

An unmanned aerial vehicle according to certain embodiments generally includes a chassis, a control system, and at least one rotor. The chassis includes a first battery compartment configured to receive sliding insertion of a first battery, and a second battery compartment configured to receive sliding insertion of a second battery. The control system is operable to receive power from the first battery and the second battery when the first battery is received in the first battery compartment and the second battery is received in the second battery compartment. The at least one rotor is operable to generate lift under control of the control system when both the first battery and the second battery are installed to the chassis. The control system is configured to remain at least partially active under power supplied by the first battery when the second battery is removed from the second battery compartment.

6 Claims, 29 Drawing Sheets

(51) Int. Cl.
| | |
|---|---|
| *B60L 50/60* | (2019.01) |
| *B60L 53/14* | (2019.01) |
| *B60L 53/80* | (2019.01) |
| *B64C 1/06* | (2006.01) |
| *B64C 1/30* | (2006.01) |
| *B64C 25/00* | (2006.01) |
| *B64C 39/02* | (2023.01) |
| *B64D 1/10* | (2006.01) |
| *B64D 1/12* | (2006.01) |
| *B64D 1/22* | (2006.01) |
| *B64D 27/24* | (2006.01) |
| *B64D 31/00* | (2006.01) |
| *B64D 41/00* | (2006.01) |
| *B64F 1/32* | (2006.01) |
| *B64U 20/70* | (2023.01) |
| *B66D 1/48* | (2006.01) |
| *G05D 1/00* | (2006.01) |
| *G08G 5/00* | (2006.01) |
| *B64D 45/00* | (2006.01) |
| *B64U 10/13* | (2023.01) |
| *B64U 30/20* | (2023.01) |
| *B64U 50/13* | (2023.01) |
| *B64U 50/19* | (2023.01) |
| *B64U 70/00* | (2023.01) |
| *B64U 80/70* | (2023.01) |
| *B64U 80/86* | (2023.01) |
| *B64U 101/60* | (2023.01) |

(52) U.S. Cl.
CPC .............. *B60L 53/80* (2019.02); *B64C 1/061* (2013.01); *B64C 1/30* (2013.01); *B64C 25/001* (2013.01); *B64C 39/024* (2013.01); *B64D 1/10* (2013.01); *B64D 1/12* (2013.01); *B64D 1/22* (2013.01); *B64D 27/24* (2013.01); *B64D 31/00* (2013.01); *B64D 41/00* (2013.01); *B64F 1/32* (2013.01); *B64U 20/70* (2023.01); *B66D 1/48* (2013.01); *G05D 1/0094* (2013.01); *G05D 1/101* (2013.01); *G05D 1/106* (2019.05); *G08G 5/0069* (2013.01); *B60L 2200/10* (2013.01); *B64D 2045/0085* (2013.01); *B64U 10/13* (2023.01); *B64U 30/20* (2023.01); *B64U 50/13* (2023.01); *B64U 50/19* (2023.01); *B64U 70/00* (2023.01); *B64U 80/70* (2023.01); *B64U 80/86* (2023.01); *B64U 2101/60* (2023.01); *B64U 2201/10* (2023.01)

(58) Field of Classification Search
CPC .. B60L 2200/10; B60L 2240/62; B60L 53/16; B60L 53/36; B64C 1/061; B64C 1/30; B64C 25/001; B64C 39/024; B64D 1/10; B64D 1/12; B64D 1/22; B64D 27/24; B64D 31/00; B64D 41/00; B64D 2045/0085; B64U 20/70; B64U 10/13; B64U 30/20; B64U 50/13; B64U 50/19; B64U 70/00; B64U 80/70; B64U 80/86; B64U 2101/60; B64U 2201/10; B64U 70/30; B66D 1/48; G05D 1/0094; G05D 1/101; G05D 1/106; G08G 5/0069; Y02T 10/7072; Y02T 10/72; Y02T 90/16; Y02T 10/70; Y02T 90/12; B66C 1/36; B66F 19/00

See application file for complete search history.

(56) References Cited

U.S. PATENT DOCUMENTS

| | | | | |
|---|---|---|---|---|
| 3,847,329 | A | * | 11/1974 | Stanley .................. B64D 25/08 244/122 AD |
| 3,904,156 | A | * | 9/1975 | Smith ...................... B64D 1/22 244/3 |
| 3,908,933 | A | * | 9/1975 | Goss ......................... F02K 9/95 60/768 |
| 3,994,451 | A | * | 11/1976 | Cole ......................... B64C 3/48 244/214 |
| 4,039,220 | A | * | 8/1977 | Stoops ..................... B66C 1/36 24/600.1 |
| 5,292,165 | A | * | 3/1994 | Wiklund .................. B66C 1/38 294/82.2 |
| 6,032,343 | A | * | 3/2000 | Blanch ............... G05B 19/4182 53/118 |
| 6,765,610 | B1 | * | 7/2004 | Nakamura ............. H04N 25/76 348/E3.018 |
| 7,673,831 | B2 | * | 3/2010 | Steele .................... F42B 12/365 244/1 TD |
| 8,523,253 | B1 | * | 9/2013 | Yustus ..................... B66C 1/36 294/82.21 |
| 8,662,549 | B2 | * | 3/2014 | Hallett ..................... B64F 5/50 294/215 |
| 9,051,043 | B1 | * | 6/2015 | Peeters .................. G05D 1/102 |
| 9,139,310 | B1 | * | 9/2015 | Wang ..................... B60L 53/31 |
| 9,205,922 | B1 | * | 12/2015 | Bouwer ............... G05D 1/0858 |
| 9,244,147 | B1 | * | 1/2016 | Soundararajan .......... G01S 1/44 |
| 9,280,038 | B1 | * | 3/2016 | Pan ...................... H04N 23/633 |
| 9,310,518 | B2 | * | 4/2016 | Haas ....................... G06T 7/292 |
| 9,363,008 | B2 | * | 6/2016 | Boss ..................... H04M 15/68 |
| 9,384,668 | B2 | * | 7/2016 | Raptopoulos ...... H04B 7/18506 |
| 9,420,562 | B1 | * | 8/2016 | Cai ........................ H04W 4/029 |
| 9,422,139 | B1 | * | 8/2016 | Bialkowski .............. B64D 1/22 |
| 9,460,616 | B1 | * | 10/2016 | Miyahira ............. G08G 1/0967 |
| 9,463,875 | B2 | * | 10/2016 | Abuelsaad ........ G08G 1/096716 |
| 9,471,064 | B1 | * | 10/2016 | Boland ...................... G06N 7/01 |
| 9,561,852 | B1 | * | 2/2017 | Beaman ................ B64C 39/024 |
| 9,573,605 | B2 | * | 2/2017 | Steele ..................... A63G 21/22 |
| 9,576,482 | B2 | * | 2/2017 | Yamamoto ............ H04W 4/027 |
| 9,594,372 | B1 | * | 3/2017 | Sills ...................... B64C 39/024 |
| 9,637,233 | B2 | * | 5/2017 | Bivens .................... A01K 15/025 |
| 9,650,136 | B1 | * | 5/2017 | Haskin .................. B64U 10/13 |
| 9,651,945 | B1 | * | 5/2017 | Erickson ............... G08G 5/0082 |
| 9,659,503 | B2 | * | 5/2017 | Gordon ................ G08G 5/0069 |
| 9,676,481 | B1 | * | 6/2017 | Buchmueller ........... B64D 1/02 |
| 9,688,404 | B1 | * | 6/2017 | Buchmueller ........... B64D 1/22 |
| 9,702,830 | B1 | * | 7/2017 | Akselrod ................ H04L 67/12 |
| 9,915,956 | B2 | | 3/2018 | Bokeno et al. |
| 9,957,048 | B2 | | 5/2018 | Gil |
| 9,969,494 | B1 | * | 5/2018 | Buchmueller ........... B64D 1/12 |
| 10,000,285 | B2 | * | 6/2018 | Shannon .................. B66D 1/60 |
| 10,040,551 | B2 | * | 8/2018 | Erickson .................... A61B 5/01 |
| 10,040,552 | B2 | * | 8/2018 | Gordon .................. G05D 1/106 |
| 10,071,804 | B1 | * | 9/2018 | Buchmueller ........ B64C 39/024 |
| 10,239,638 | B1 | * | 3/2019 | Cohen ..................... B64F 1/027 |
| 10,364,030 | B2 | * | 7/2019 | Prager .................. G05D 1/0016 |
| 10,407,182 | B1 | * | 9/2019 | Alcorn ................... B64U 10/30 |
| 10,476,614 | B1 | * | 11/2019 | Brinkoetter ............. B64C 1/36 |
| 10,482,414 | B2 | | 11/2019 | Gil |
| 10,507,920 | B2 | * | 12/2019 | Waltner ................. F16F 9/067 |
| 10,543,984 | B1 | * | 1/2020 | Alduaiji ............... B64C 39/024 |
| 10,668,997 | B2 | * | 6/2020 | Moses .................... B64U 50/19 |
| 10,689,107 | B2 | * | 6/2020 | Baracaldo Angel ... F16M 11/18 |
| 10,689,113 | B2 | | 6/2020 | Prager et al. |
| 10,793,274 | B2 | * | 10/2020 | Prager .................. G06Q 10/083 |
| 10,899,444 | B2 | * | 1/2021 | Blomberg ............. B64C 39/024 |
| 10,899,449 | B2 | * | 1/2021 | Luckay ................. B64C 39/024 |
| 10,922,983 | B2 | * | 2/2021 | Blomberg ............. G08G 5/0021 |
| 11,006,974 | B2 | * | 5/2021 | Sanders ................ A61B 17/322 |
| 11,046,459 | B2 | * | 6/2021 | Stamatovski ............. B64F 1/18 |
| 2002/0156645 | A1 | * | 10/2002 | Hansen ................... G07F 17/13 705/26.1 |
| 2008/0087762 | A1 | * | 4/2008 | Holloman .............. B64C 1/0009 244/30 |

(56) References Cited

U.S. PATENT DOCUMENTS

| | | | | |
|---|---|---|---|---|
| 2009/0012923 | A1* | 1/2009 | Moses | G06Q 10/10 706/46 |
| 2009/0152391 | A1* | 6/2009 | McWhirk | B64B 1/70 244/30 |
| 2011/0192932 | A1* | 8/2011 | Brenner | B64D 1/22 244/17.13 |
| 2012/0271491 | A1* | 10/2012 | Spata | G01W 1/00 701/1 |
| 2013/0059626 | A1* | 3/2013 | Hopkins | H04W 68/00 455/552.1 |
| 2013/0233964 | A1* | 9/2013 | Woodworth | B64C 27/20 244/175 |
| 2013/0238135 | A1* | 9/2013 | Fisher | F16M 11/18 254/290 |
| 2014/0032034 | A1* | 1/2014 | Raptopoulos | H04B 7/18506 701/25 |
| 2014/0149244 | A1* | 5/2014 | Abhyanker | G06Q 30/0605 705/26.2 |
| 2014/0163664 | A1* | 6/2014 | Goldsmith | A61B 17/0057 604/93.01 |
| 2014/0254896 | A1* | 9/2014 | Zhou | G07F 17/13 705/16 |
| 2014/0263823 | A1* | 9/2014 | Wang | B64D 47/08 244/17.23 |
| 2014/0293432 | A1* | 10/2014 | Takemoto | H04N 9/3155 353/121 |
| 2015/0069968 | A1* | 3/2015 | Pounds | H02J 7/0044 320/109 |
| 2015/0076287 | A1* | 3/2015 | Dula | B64G 1/244 244/158.2 |
| 2015/0120094 | A1* | 4/2015 | Kimchi | G08G 5/0069 701/3 |
| 2015/0154559 | A1* | 6/2015 | Barbush | G06Q 10/08355 705/338 |
| 2015/0158587 | A1* | 6/2015 | Patrick | B64D 1/12 701/3 |
| 2015/0158599 | A1* | 6/2015 | Sisko | B64F 1/20 244/114 R |
| 2015/0178649 | A1* | 6/2015 | Furman | G06Q 10/06312 705/7.22 |
| 2015/0183528 | A1* | 7/2015 | Walsh | A01M 29/16 244/114 R |
| 2015/0183615 | A1* | 7/2015 | Vander Lind | B65H 75/265 242/478.1 |
| 2015/0259078 | A1* | 9/2015 | Filipovic | G05D 1/0011 244/114 R |
| 2015/0284076 | A1* | 10/2015 | Cacciaguera | B64C 1/26 244/6 |
| 2015/0284079 | A1* | 10/2015 | Matsuda | B64C 39/024 244/7 A |
| 2015/0286216 | A1* | 10/2015 | Miwa | G05D 1/0858 701/4 |
| 2015/0323932 | A1* | 11/2015 | Paduano | G06Q 50/28 701/3 |
| 2015/0336667 | A1* | 11/2015 | Srivastava | G05D 1/1062 701/2 |
| 2015/0363843 | A1* | 12/2015 | Loppatto | G06Q 30/0283 705/330 |
| 2015/0370251 | A1* | 12/2015 | Siegel | G05D 1/0684 701/2 |
| 2015/0375398 | A1* | 12/2015 | Penn | B25J 5/005 700/218 |
| 2016/0003637 | A1* | 1/2016 | Andersen | H04L 12/1827 701/519 |
| 2016/0009392 | A1* | 1/2016 | Korhonen | G05D 1/106 244/137.3 |
| 2016/0011592 | A1* | 1/2016 | Zhang | B60L 53/80 244/114 R |
| 2016/0016652 | A1* | 1/2016 | Barrett | B64C 25/06 244/15 |
| 2016/0016664 | A1* | 1/2016 | Basuni | B64C 27/08 244/17.13 |
| 2016/0023743 | A1* | 1/2016 | Barrett | A63H 27/02 244/119 |
| 2016/0033966 | A1* | 2/2016 | Farris | G06Q 50/28 701/16 |
| 2016/0039300 | A1* | 2/2016 | Wang | B64D 27/24 244/58 |
| 2016/0039541 | A1* | 2/2016 | Beardsley | G05D 1/0088 701/2 |
| 2016/0048131 | A1* | 2/2016 | Lesperance | G05D 1/102 701/8 |
| 2016/0059963 | A1* | 3/2016 | Burgess | B64D 1/12 701/49 |
| 2016/0068264 | A1* | 3/2016 | Ganesh | G06Q 30/0641 701/4 |
| 2016/0068265 | A1* | 3/2016 | Hoareau | G06Q 10/083 701/3 |
| 2016/0068267 | A1* | 3/2016 | Liu | G05D 1/0088 701/4 |
| 2016/0086494 | A1* | 3/2016 | Anandayuvaraj | G08G 5/0039 701/3 |
| 2016/0096622 | A1* | 4/2016 | Richardson | B64D 1/02 701/2 |
| 2016/0101874 | A1* | 4/2016 | McKinnon | A47G 29/14 244/114 R |
| 2016/0107750 | A1* | 4/2016 | Yates | B64C 39/024 244/2 |
| 2016/0114887 | A1* | 4/2016 | Zhou | H04N 7/181 348/148 |
| 2016/0115702 | A1* | 4/2016 | Nordbruch | G05D 1/0297 414/231 |
| 2016/0130000 | A1* | 5/2016 | Rimanelli | B64C 39/024 244/2 |
| 2016/0131025 | A1* | 5/2016 | Pekrul | F02B 53/10 123/205 |
| 2016/0131026 | A1* | 5/2016 | Pekrul | F01C 21/0836 123/205 |
| 2016/0137293 | A1* | 5/2016 | Santangelo | B64C 39/024 244/50 |
| 2016/0137304 | A1* | 5/2016 | Phan | B64C 27/08 244/17.23 |
| 2016/0140496 | A1* | 5/2016 | Simms | B64C 39/024 705/337 |
| 2016/0140851 | A1* | 5/2016 | Levy | G08G 5/0069 701/410 |
| 2016/0144734 | A1* | 5/2016 | Wang | B60L 53/124 701/17 |
| 2016/0144982 | A1* | 5/2016 | Sugumaran | A01D 41/12 244/108 |
| 2016/0157653 | A1* | 6/2016 | Manitta | A47G 29/20 232/27 |
| 2016/0159472 | A1* | 6/2016 | Chan | B64C 39/024 244/39 |
| 2016/0163205 | A1* | 6/2016 | Jenkins | G08G 5/0069 701/3 |
| 2016/0167778 | A1* | 6/2016 | Meringer | B64U 10/10 244/17.11 |
| 2016/0185466 | A1* | 6/2016 | Dreano, Jr. | A47G 29/141 705/26.81 |
| 2016/0189101 | A1* | 6/2016 | Kantor | G06Q 10/08355 705/338 |
| 2016/0189549 | A1* | 6/2016 | Marcus | G08G 5/0091 701/3 |
| 2016/0194959 | A1* | 7/2016 | Pekrul | F01C 19/06 418/146 |
| 2016/0196756 | A1* | 7/2016 | Prakash | G06Q 10/083 701/3 |
| 2016/0200207 | A1* | 7/2016 | Lee | B64C 25/32 244/17.23 |
| 2016/0200438 | A1* | 7/2016 | Bokeno | G05D 1/102 244/2 |
| 2016/0207627 | A1* | 7/2016 | Hoareau | B64D 1/02 |
| 2016/0209839 | A1* | 7/2016 | Hoareau | G08G 5/0069 |
| 2016/0214713 | A1* | 7/2016 | Cragg | B64D 47/08 |
| 2016/0214714 | A1* | 7/2016 | Sekelsky | B60L 53/32 |
| 2016/0214717 | A1* | 7/2016 | De Silva | H04L 67/12 |
| 2016/0221186 | A1* | 8/2016 | Perrone | B25J 9/1661 |

(56) References Cited

U.S. PATENT DOCUMENTS

| | | | |
|---|---|---|---|
| 2016/0221683 A1* | 8/2016 | Roberts | B64D 27/02 |
| 2016/0225263 A1* | 8/2016 | Salentiny | G05D 1/0061 |
| 2016/0229299 A1* | 8/2016 | Streett | B64C 39/024 |
| 2016/0229534 A1* | 8/2016 | Hutson | B64C 27/08 |
| 2016/0236778 A1* | 8/2016 | Takayama | B64D 47/06 |
| 2016/0239798 A1* | 8/2016 | Borley | G06Q 10/08355 |
| 2016/0244162 A1* | 8/2016 | Weller | B64C 39/024 |
| 2016/0244187 A1* | 8/2016 | Byers | B64F 1/12 |
| 2016/0253908 A1* | 9/2016 | Chambers | G08G 5/006 701/2 |
| 2016/0257423 A1* | 9/2016 | Martin | B64F 1/00 |
| 2016/0257424 A1* | 9/2016 | Stabler | B64C 39/02 |
| 2016/0257426 A1* | 9/2016 | Mozer | B64F 1/36 |
| 2016/0266579 A1* | 9/2016 | Chen | G08G 5/0052 |
| 2016/0272308 A1* | 9/2016 | Gentry | B64C 25/001 |
| 2016/0272312 A1* | 9/2016 | Mallard | B64C 39/024 |
| 2016/0280075 A1* | 9/2016 | McCrady | H02K 47/00 |
| 2016/0280371 A1* | 9/2016 | Canavor | B64C 39/024 |
| 2016/0297521 A1* | 10/2016 | Cheatham, III | G08G 5/0069 |
| 2016/0300493 A1* | 10/2016 | Ubhi | G08G 5/0082 |
| 2016/0300496 A1* | 10/2016 | Cheatham, III | G08G 5/0013 |
| 2016/0304198 A1* | 10/2016 | Jourdan | G05D 1/042 |
| 2016/0304217 A1* | 10/2016 | Fisher | B60L 53/51 |
| 2016/0307449 A1* | 10/2016 | Gordon | G08G 5/0043 |
| 2016/0311329 A1* | 10/2016 | Rodriguez | H02J 7/06 |
| 2016/0311529 A1* | 10/2016 | Brotherton-Ratcliffe | B64C 27/30 |
| 2016/0320773 A1* | 11/2016 | Skaaksrud | H04L 41/0823 |
| 2016/0338274 A1* | 11/2016 | Messner | B05B 1/044 |
| 2016/0340006 A1* | 11/2016 | Tang | B64C 39/024 |
| 2016/0340038 A1* | 11/2016 | Chavez | B64D 47/08 |
| 2016/0364989 A1* | 12/2016 | Speasl | G08G 5/0091 |
| 2016/0376004 A1* | 12/2016 | Claridge | B64C 1/30 701/3 |
| 2017/0015415 A1* | 1/2017 | Chan | B64C 39/024 |
| 2017/0021923 A1* | 1/2017 | Fisher | B64F 1/005 |
| 2017/0023949 A1* | 1/2017 | Fisher | G08G 5/0091 |
| 2017/0025022 A1* | 1/2017 | Henry | H04W 4/029 |
| 2017/0050749 A1* | 2/2017 | Pilskalns | B64D 45/08 |
| 2017/0073071 A1* | 3/2017 | Salzmann | B64D 1/22 |
| 2017/0074666 A1* | 3/2017 | Kobayashi | G06Q 30/0201 |
| 2017/0081043 A1* | 3/2017 | Jones | B64C 37/02 |
| 2017/0096075 A1* | 4/2017 | Henry | B64D 45/08 |
| 2017/0096222 A1* | 4/2017 | Spinelli | B64C 39/024 |
| 2017/0097260 A1* | 4/2017 | Nagashima | G01J 1/4257 |
| 2017/0121023 A1* | 5/2017 | High | B64D 9/00 |
| 2017/0129603 A1* | 5/2017 | Raptopoulos | G08G 5/0069 |
| 2017/0129749 A1* | 5/2017 | Rodríguez Mijangos | B66C 13/06 |
| 2017/0132558 A1* | 5/2017 | Perez | G06Q 10/083 |
| 2017/0132562 A1* | 5/2017 | High | G06Q 10/0833 |
| 2017/0144776 A1* | 5/2017 | Fisher | B64C 29/02 |
| 2017/0217323 A1* | 8/2017 | Antonini | B60L 53/30 |
| 2017/0240062 A1* | 8/2017 | Jaiswal | B60L 53/14 |
| 2017/0253349 A1* | 9/2017 | Wang | B64F 1/02 |
| 2017/0267347 A1* | 9/2017 | Rinaldi | B65D 81/18 |
| 2017/0283090 A1* | 10/2017 | Miller | B64C 39/024 |
| 2017/0308850 A1* | 10/2017 | Roush | G01C 21/343 |
| 2017/0313421 A1 | 11/2017 | Gil | |
| 2017/0313422 A1* | 11/2017 | Gil | G06Q 10/0832 |
| 2017/0334561 A1* | 11/2017 | Sopper | B66D 5/026 |
| 2017/0337511 A1* | 11/2017 | Shroff | G06F 16/9535 |
| 2017/0372256 A1* | 12/2017 | Kantor | G08G 5/0013 |
| 2018/0056794 A1* | 3/2018 | Kim | B60L 53/12 |
| 2018/0072416 A1* | 3/2018 | Cantrell | G08G 5/0069 |
| 2018/0074523 A1* | 3/2018 | Cantrell | B60L 53/55 |
| 2018/0092345 A1* | 4/2018 | Okumura | F41G 3/145 |
| 2018/0118340 A1* | 5/2018 | Russo | B64D 1/16 |
| 2018/0134388 A1* | 5/2018 | Gil | B64U 20/40 |
| 2018/0149137 A1* | 5/2018 | Nordstrom | F03D 13/25 |
| 2018/0155027 A1 | 6/2018 | Gil | |
| 2018/0155028 A1 | 6/2018 | Gil | |
| 2018/0155029 A1 | 6/2018 | Gil | |
| 2018/0155030 A1 | 6/2018 | Gil | |
| 2018/0155031 A1 | 6/2018 | Gil | |
| 2018/0155032 A1 | 6/2018 | Gil et al. | |
| 2018/0196445 A1 | 7/2018 | Bokeno et al. | |
| 2018/0257779 A1 | 9/2018 | Shannon et al. | |
| 2018/0291579 A1* | 10/2018 | Gharabegian | E01H 5/106 |
| 2018/0312255 A1* | 11/2018 | Illuminati | G08B 29/145 |
| 2018/0312276 A1* | 11/2018 | Miller | B64C 39/024 |
| 2018/0349840 A1 | 12/2018 | Gil et al. | |
| 2019/0023113 A1* | 1/2019 | Stoltz | B60T 1/06 |
| 2019/0071176 A1* | 3/2019 | von Flotow | B64C 39/024 |
| 2019/0100108 A1* | 4/2019 | Davis | H02J 7/0042 |
| 2019/0122172 A1 | 4/2019 | Gil et al. | |
| 2019/0161190 A1* | 5/2019 | Gil | B65G 1/0435 |
| 2019/0193855 A1* | 6/2019 | Prager | B64D 1/10 |
| 2019/0193856 A1* | 6/2019 | Prager | B64D 1/22 |
| 2019/0193952 A1* | 6/2019 | Zevenbergen | B64U 80/00 |
| 2019/0196512 A1* | 6/2019 | Blake | G06Q 50/30 |
| 2019/0197643 A1* | 6/2019 | Cochran | G06Q 10/06315 |
| 2019/0233254 A1* | 8/2019 | Shin | B64D 1/22 |
| 2019/0245365 A1* | 8/2019 | Farrahi Moghaddam | B60L 53/14 |
| 2019/0247050 A1* | 8/2019 | Goldsmith | A61F 2/82 |
| 2019/0261618 A1 | 8/2019 | Okumura | |
| 2019/0276140 A1* | 9/2019 | Poltorak | B64C 39/024 |
| 2019/0291961 A1* | 9/2019 | Urban | B64C 39/024 |
| 2019/0315235 A1* | 10/2019 | Kung | B64C 39/024 |
| 2019/0326764 A1* | 10/2019 | Gu | H02J 7/00714 |
| 2019/0340569 A1* | 11/2019 | Prager | G06Q 10/06315 |
| 2019/0348862 A1* | 11/2019 | Obayashi | B64U 50/19 |
| 2019/0383917 A1* | 12/2019 | Shinozuka | G01C 3/06 |
| 2020/0039367 A1* | 2/2020 | Lyden | B60L 53/51 |
| 2020/0039643 A1* | 2/2020 | Fuller | B64D 47/02 |
| 2020/0044453 A1* | 2/2020 | Lyden | H01Q 1/32 |
| 2020/0055613 A1* | 2/2020 | Miller | B64F 1/125 |
| 2020/0130864 A1* | 4/2020 | Brockers | B64D 47/08 |
| 2020/0140245 A1* | 5/2020 | Yasuda | B64U 10/13 |
| 2020/0148322 A1* | 5/2020 | Pekrul | B63H 5/02 |
| 2020/0262550 A1* | 8/2020 | Dailey | B64C 39/024 |
| 2020/0290752 A1* | 9/2020 | Kolosiuk | B64D 39/06 |
| 2020/0406773 A1* | 12/2020 | Lacaze | B64C 39/022 |
| 2021/0017000 A1* | 1/2021 | Sikora | B66D 3/18 |
| 2021/0031947 A1* | 2/2021 | Wankewycz | E04H 6/44 |
| 2021/0053677 A1* | 2/2021 | Passley | B64U 10/13 |
| 2021/0071530 A1* | 3/2021 | Pekrul | F02B 53/10 |
| 2021/0074170 A1* | 3/2021 | Barker | B64U 70/00 |
| 2021/0122495 A1* | 4/2021 | Rezvani | B64F 1/12 |
| 2021/0125503 A1* | 4/2021 | Henry | G05D 1/0038 |
| 2021/0140317 A1* | 5/2021 | Pekrul | F01C 1/3442 |
| 2021/0163103 A1* | 6/2021 | Pekrul | F01C 1/3445 |
| 2021/0163135 A1* | 6/2021 | Shin | H05K 9/00 |
| 2022/0185473 A1* | 6/2022 | King | G01T 1/17 |

FOREIGN PATENT DOCUMENTS

| | | |
|---|---|---|
| EP | 0850789 A1 | 7/1998 |
| EP | 1845005 A2 | 10/2007 |
| GB | 2540052 A | 1/2017 |
| IN | 110436340 A | 11/2019 |
| JP | 2003104295 A | 4/2003 |
| KR | 20090115096 A | 11/2009 |
| KR | 20100027087 A | 3/2010 |
| KR | 20120112315 A | 10/2012 |
| KR | 20140094482 A | 7/2014 |
| KR | 20140005836 U | 11/2014 |
| KR | 20170001964 A | 1/2017 |
| KR | 20170081589 A | 7/2017 |
| KR | 20180017061 A | 2/2018 |
| KR | 20180108055 A | 10/2018 |
| WO | 2007005976 A1 | 1/2007 |
| WO | 2019123738 A1 | 6/2019 |
| WO | 20190164720 A1 | 8/2019 |
| WO | 2019204932 A1 | 10/2019 |

OTHER PUBLICATIONS

Written Opinion of the International Searching Authority; ISA/US, Commissioner for Patents; International Application No. PCT/US2021/025990; Aug. 18, 2021; 12 pages.

(56) References Cited

OTHER PUBLICATIONS

International Search Report; ISA/US; International Application No. PCT/US2021/025965; Mar. 1, 2022; 5 pages.
Written Opinion of the International Searching Authority; ISA/US; International Application No. PCT/US2021/025965; Mar. 1, 2022; 8 pages.
Technical specifications; Sunflower Labs; https://www.sunflower-labs.com/specs; 4 pages.

* cited by examiner

FLYING VEHICLE SYSTEMS AND METHODS

CROSS-REFERENCE TO RELATED APPLICATIONS

The present application claims the benefit of U.S. Provisional Patent Application No. 63/005,652, filed Apr. 6, 2020, the contents of which are incorporated by reference in their entirety.

TECHNICAL FIELD

The present disclosure generally relates to flying vehicles, and more particularly but not exclusively relates to systems and methods relating to unmanned aerial vehicles (UAVs) and unmanned aerial systems (UASs).

BACKGROUND

The use of unmanned aerial vehicles (UAVs) is currently on the rise for many applications, including those such as surveillance, photography, filming, and package delivery. However, many existing UAV devices and systems suffer from certain drawbacks and limitations. As one example, while certain existing delivery drones include a winch operable to lower the package via a line attached to the winch, many such delivery UAVs lower the package at a constant velocity. Should the velocity be too high, the package may become damaged by impact with the ground. Should the velocity be too low, the delivery time will be unnecessarily extended. Moreover, should the line become caught or tangled, the UAV may be prevented from completing its mission and/or returning to its point of origin.

As another example, certain existing UAV operating methods involve landing the UAV on a flat landing pad. However, these operating methods typically require that the UAV be controlled with relatively low tolerances, particularly in instances in which the landing pad is relatively small and/or is mounted to a moving vehicle. As a result, more complex control algorithms may be required to ensure that the UAV lands within a relatively small zone, which may present a moving target.

As a further example, certain UAVs require that the battery be removed for charging, or that a charge cord be attached to the UAV for charging the battery. In situations that require removal of the battery, the UAV loses power while the battery is removed, and must reboot when a new battery is installed. In situations that require a charge cord be attached, the operator must perform the extra step of attaching the cord in order for the battery to begin charging. In either event, the operator must take some positive action to begin the charging process, which can be time-consuming and/or laborious, and which may result in material wear and cause material failure. Moreover, when the UAV must reboot after installation of a new battery, the process of rebooting can be time-consuming.

As should be evident from the foregoing, existing UAV systems and methods suffer from a variety of drawbacks and limitations. For these reasons among others, there remains a need for further improvements in this technological field.

SUMMARY

An exemplary unmanned aerial vehicle (UAV) includes a chassis, a power supply mounted to the chassis, a control system operable to receive power from the power supply, and at least one rotor operable to generate lift under control of the control system. In certain embodiments, the UAV further comprises at least one auxiliary system, such as a carriage, a winch, or a surveillance mechanism.

An unmanned aerial vehicle according to certain embodiments generally includes a chassis, a control system, and at least one rotor. The chassis includes a first battery compartment configured to receive sliding insertion of a first battery, and a second battery compartment configured to receive sliding insertion of a second battery. The control system is operable to receive power from the first battery and the second battery when the first battery is received in the first battery compartment and the second battery is received in the second battery compartment. The at least one rotor is operable to generate lift under control of the control system when both the first battery and the second battery are installed to the chassis. The control system is configured to remain at least partially active under power supplied by the first battery when the second battery is removed from the second battery compartment. Further embodiments, forms, features, and aspects of the present application shall become apparent from the description and figures provided herewith.

DETAILED DESCRIPTION OF ILLUSTRATIVE EMBODIMENTS

Figure 1:
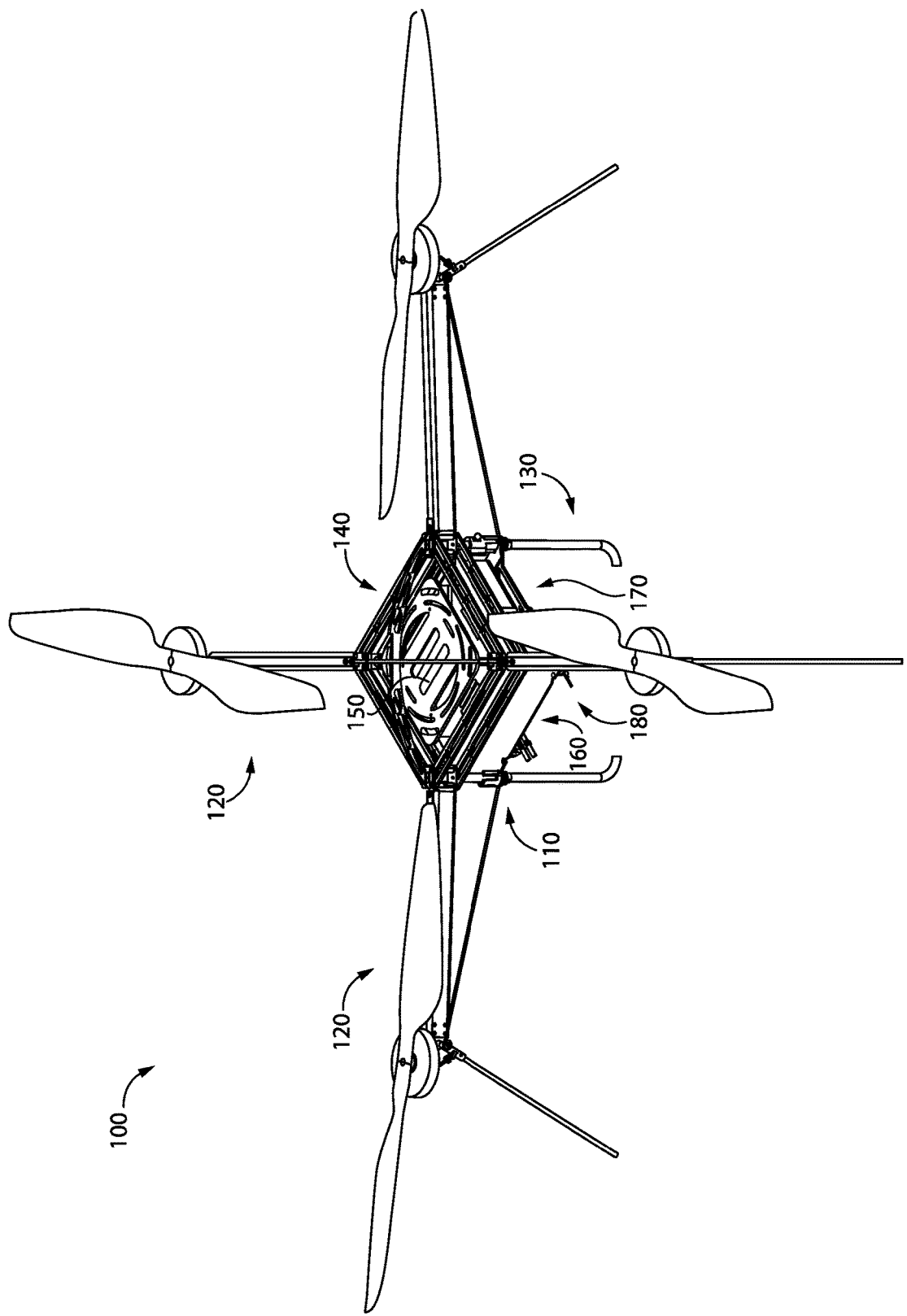
FIG. 1 is a perspective illustration of an unmanned aerial vehicle (UAV) according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a drone or unmanned aerial vehicle (UAV) 100 according to certain embodiments. The UAV 100 has a central axis 101 (FIG. 2), and generally includes a chassis 110, a plurality of arms 120 extending outward from the chassis 110, a landing apparatus 130 extending downward from the chassis 110, and a support structure 140 positioned atop the chassis 110. As described herein, the chassis 110 has mounted therein a control system 150 and an onboard power supply 160 operable to provide electrical power to the control system 150 and other electronic components of the UAV 100. In certain embodiments, the UAV 100 may further include one or more auxiliary systems 170, such as a carriage 180.

Figure 2:
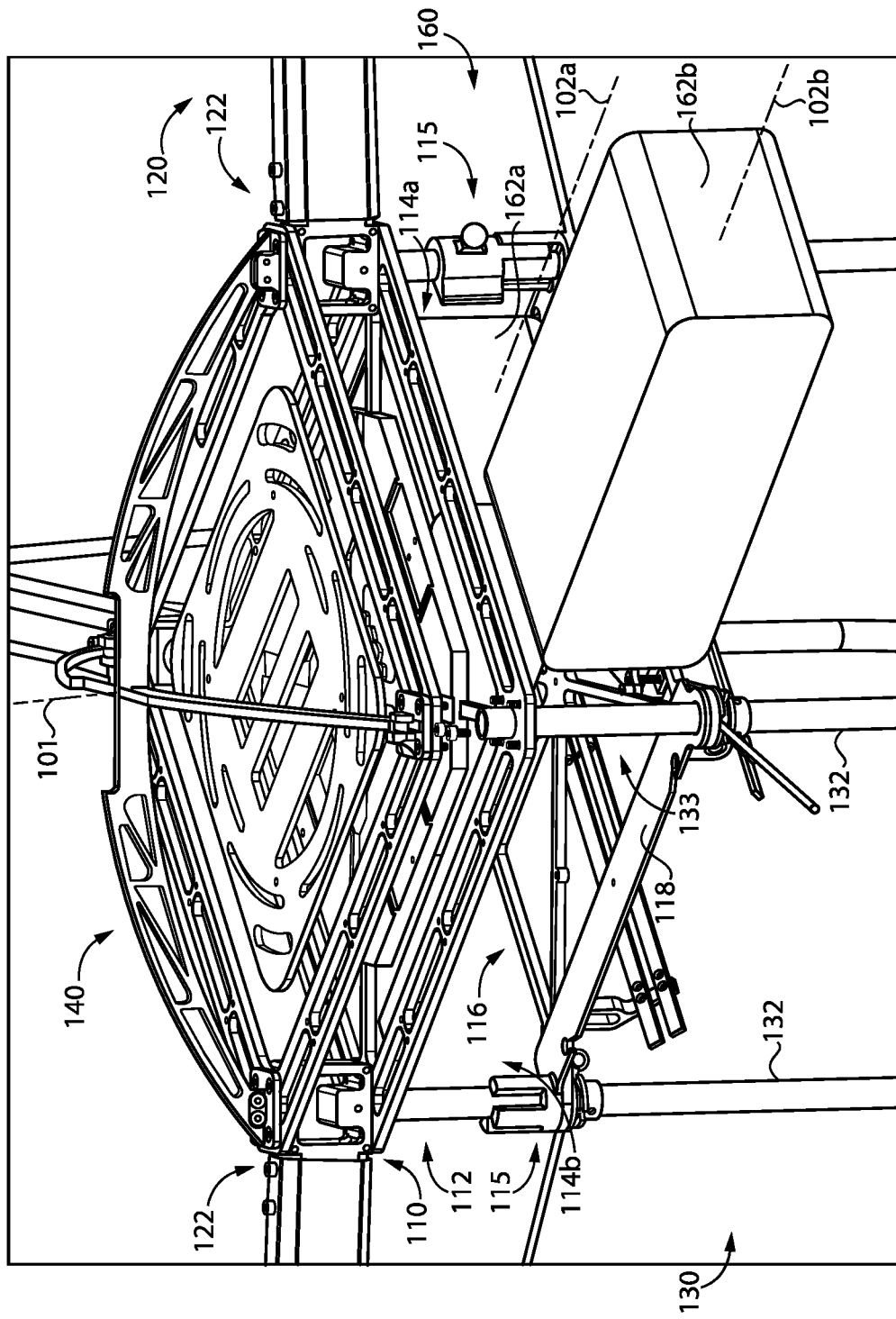
FIG. 2 is a perspective illustration focused on a chassis of the UAV illustrated in FIG. 1.

With additional reference to FIG. 2, the chassis 110 defines a central housing 112 in which at least a portion of the control system 150 is mounted. The chassis 110 includes at least one battery compartment 114, each of which is operable to receive a battery 162 of the onboard power supply 160. The compartment(s) 114 may be defined in part by the landing apparatus 130. For example, each compartment 114 may be defined at least in part by a floor 118 that is coupled to the legs 132 of the landing apparatus 130, and which provides vertical support for the corresponding battery 162. Each compartment 114 may be further defined by one or more rails 117 (FIG. 4) that confine lateral shifting of the battery 162. Each compartment 114 is configured to receive sliding insertion of a corresponding one of the batteries 162, and includes a latch mechanism 115 configured to releasably lock the corresponding battery 162 within the compartment 114. As described herein, the illustrated power supply 160 comprises two batteries 162, including a first battery 162a and a second battery 162b. As such, the at least one battery compartment 114 includes a first battery compartment 114a sized and shaped to receive the first battery 162a and a second battery compartment 114b sized and shaped to receive the second battery 162b. Further details regarding an example form of the latch mechanism 115 are provided below with reference to FIGS. 26-28.

Figure 3:
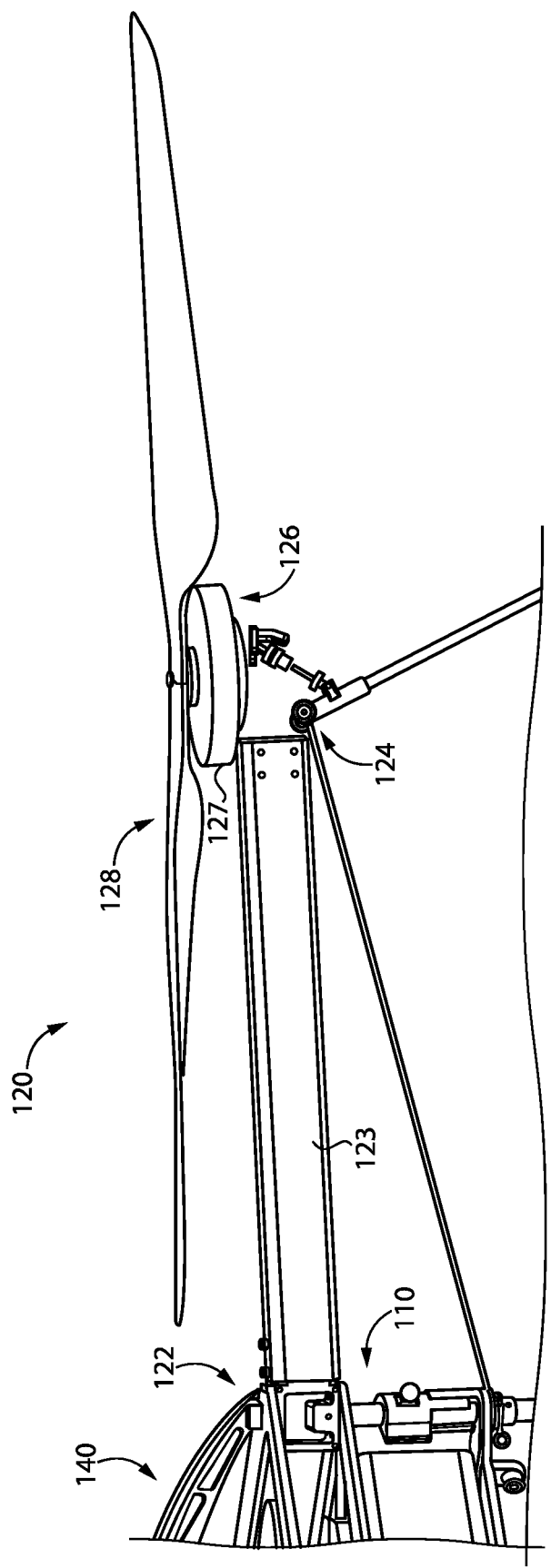
FIG. 3 is a perspective illustration focused on an arm of the UAV illustrated in FIG. 1.

With additional reference to FIG. 3, each arm 120 generally includes an inward end portion 122 connected with the chassis 110 and an opposite outward end portion 124, and a body portion 123 extends between and connects the inward end portion 122 and the outward end portion 124. Mounted to the outward end portion 124 of each arm 120 is a rotor 126 operable to generate lift for the UAV 100 under control of the control system 150. As is typical in UAVs of this type, the rotor 126 generally includes a propeller blade 128 and a motor 127 configured to rotate the blade 128 to generate lift under control of the control system 150, and may further include an electronic control system (ECS). In the illustrated form, the UAV 100 includes four arms 120. It is also contemplated that the UAV 100 may include more or fewer arms 120.

Figure 4:
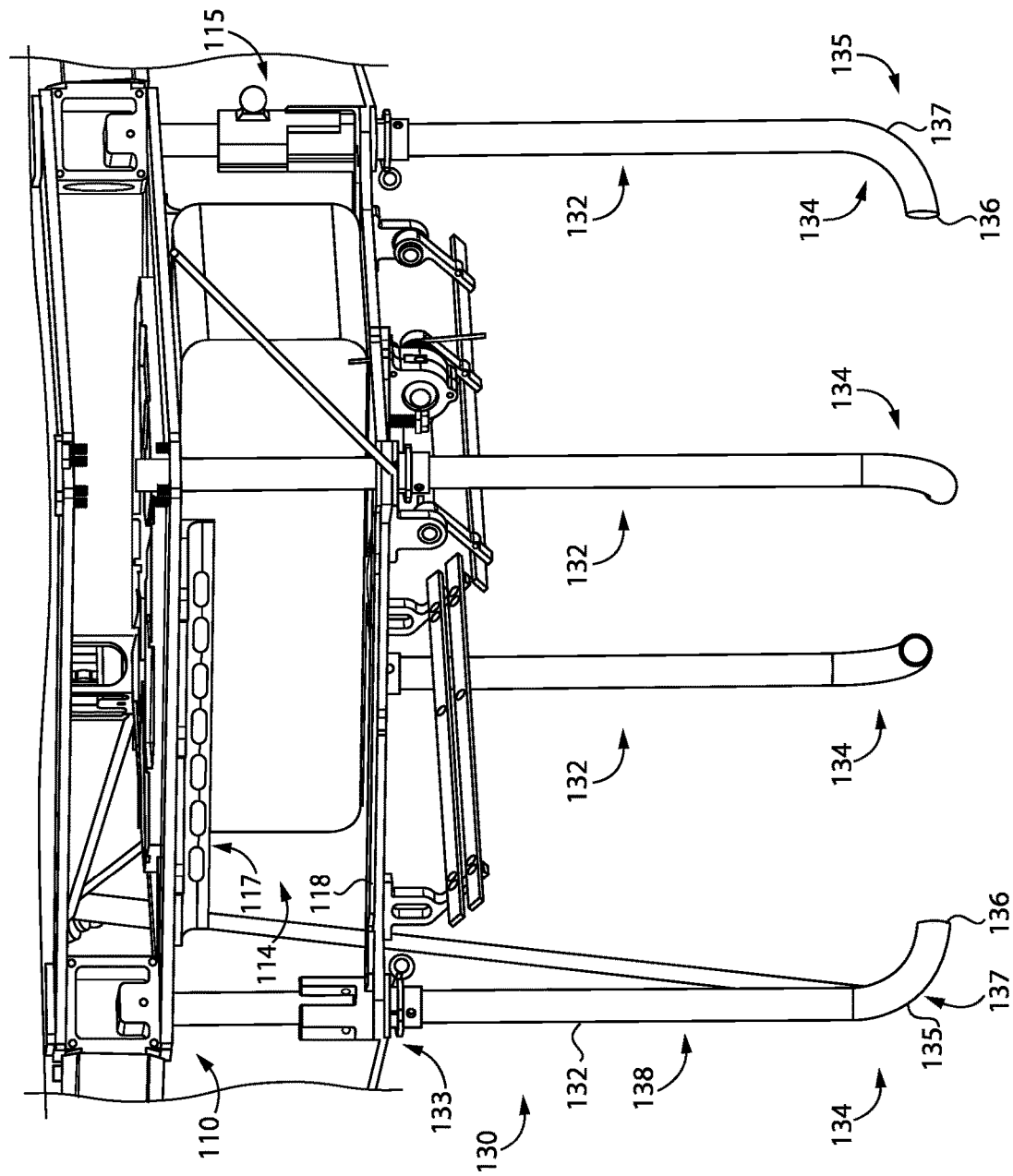
FIG. 4 is a perspective illustration focused on a landing apparatus of the UAV illustrated in FIG. 1.

With additional reference to FIG. 4, the landing apparatus 130 generally includes a plurality of legs 132. Each leg 132 has an upper end portion connected with the chassis 110, and extends downward to a foot 134. In certain embodiments, one or more of the feet 134 may have a shoe mounted thereon, for example as described below with reference to FIGS. 18-20. Each foot 134 includes a heel 135 connected with the leg 132 and a toe 136 extending from the heel 135. The landing apparatus 130 is electrically connected with the control system 150 and/or the power supply 160 such that the power supply 160 can be charged via the landing apparatus 130. More particularly, each leg 132 includes a contact surface 137 that is electrically connected with the power supply 160 via a corresponding electrical conduit 138. In the illustrated form, the contact surfaces 137 are defined by the feet 134, and each leg 132 is formed of an electrically conductive material and defines the electrical conduit 138. It is also contemplated that the contact surfaces 137 and conduits 138 may be provided in another form. As one example, the contact surfaces 137 may be provided as contact pads that are mounted to the feet 134, and the electrical conduits may be provided as wires that run from the contact pads to the respective points of connection with the control system 150 and/or power supply 160.

Figure 5B:
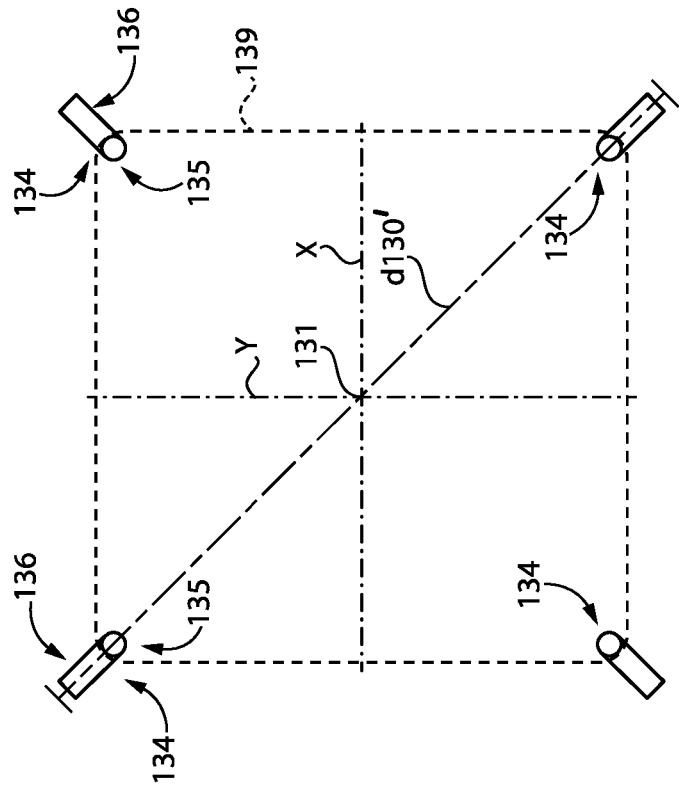
FIG. 5b is a plan view of the landing apparatus in an outward-facing arrangement.
Figure 5A:
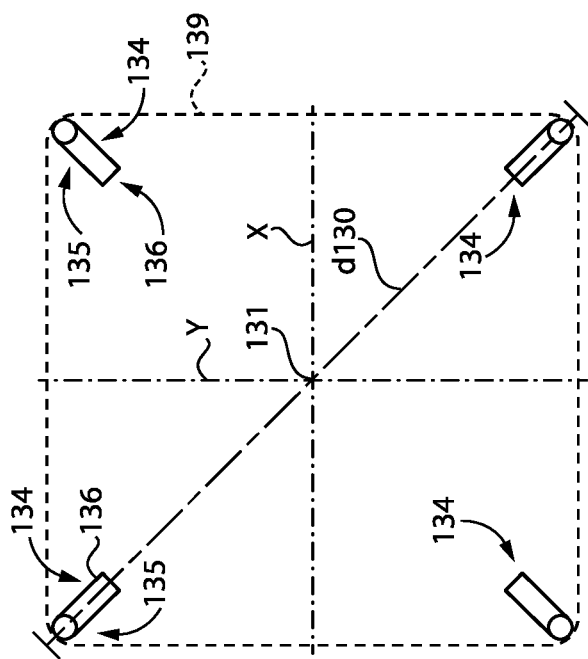
FIG. 5a is a plan view of the landing apparatus in an inward-facing arrangement.

With additional reference to FIG. 5a, illustrated therein is one exemplary arrangement for the landing apparatus 130. In this arrangement, an outer perimeter 139 is defined about the heels 135 of the feet 134, and a central axis 131 of the landing apparatus 130 is defined at a center of the perimeter 139. While other forms are contemplated, in the illustrated embodiment, the landing apparatus central axis 131 is generally coincident with the UAV central axis 101. For purposes of illustration, also illustrated in FIG. 5a are a first axis X and a second axis Y that meets the first axis X at the central axis 131 such that the axes X, Y, 131 are mutually orthogonal. The arrangement illustrated in FIG. 5a is an inward-facing arrangement, in which each toe 136 extends from the corresponding heel 135 in a direction generally toward the origin point at which the axes X, Y, 131 meet. As a result, each foot 134 and each toe 136 is contained within the outer perimeter 139. It is also contemplated that the feet 134 may be contained within the outer perimeter 139 in another configuration. By way of example, each foot 134 may extend from the heel 135 to the toe 136 in a direction generally toward the first axis X, or in a direction generally toward the second axis Y. With the feet 134 contained within the outer perimeter 139, an effective diameter d130 of the landing apparatus 130 is defined between the radially-outer sides of the heels 135.

With additional reference to FIG. 5b, illustrated therein is another example arrangement for the landing apparatus 130, in which the outer perimeter 139 is again defined about the heels 135. The arrangement illustrated in FIG. 5b is an outward-facing arrangement, in which each toe 136 extends from the corresponding heel 135 in a direction generally away from the origin point. As a result, each foot 134 extends beyond the outer perimeter 139 defined by the heels 135. It is also contemplated that the feet 134 may extend beyond the outer perimeter 139 in another configuration. By way of example, each foot 134 may extend from the heel 135 to the toe 136 in a direction generally away from the first axis X, or in a direction generally away from the second axis Y. With the feet 134 extending beyond the outer perimeter 139, an effective diameter d130' of the landing apparatus 130 is defined between the radially-outer sides of the toes 136. Due to the differing orientations of the feet 134, the effective diameter d130' of the outward-facing arrangement illustrated in FIG. 5b is greater than the effective diameter d130 of the inward facing arrangement illustrated in FIG. 5a.

Figure 6:
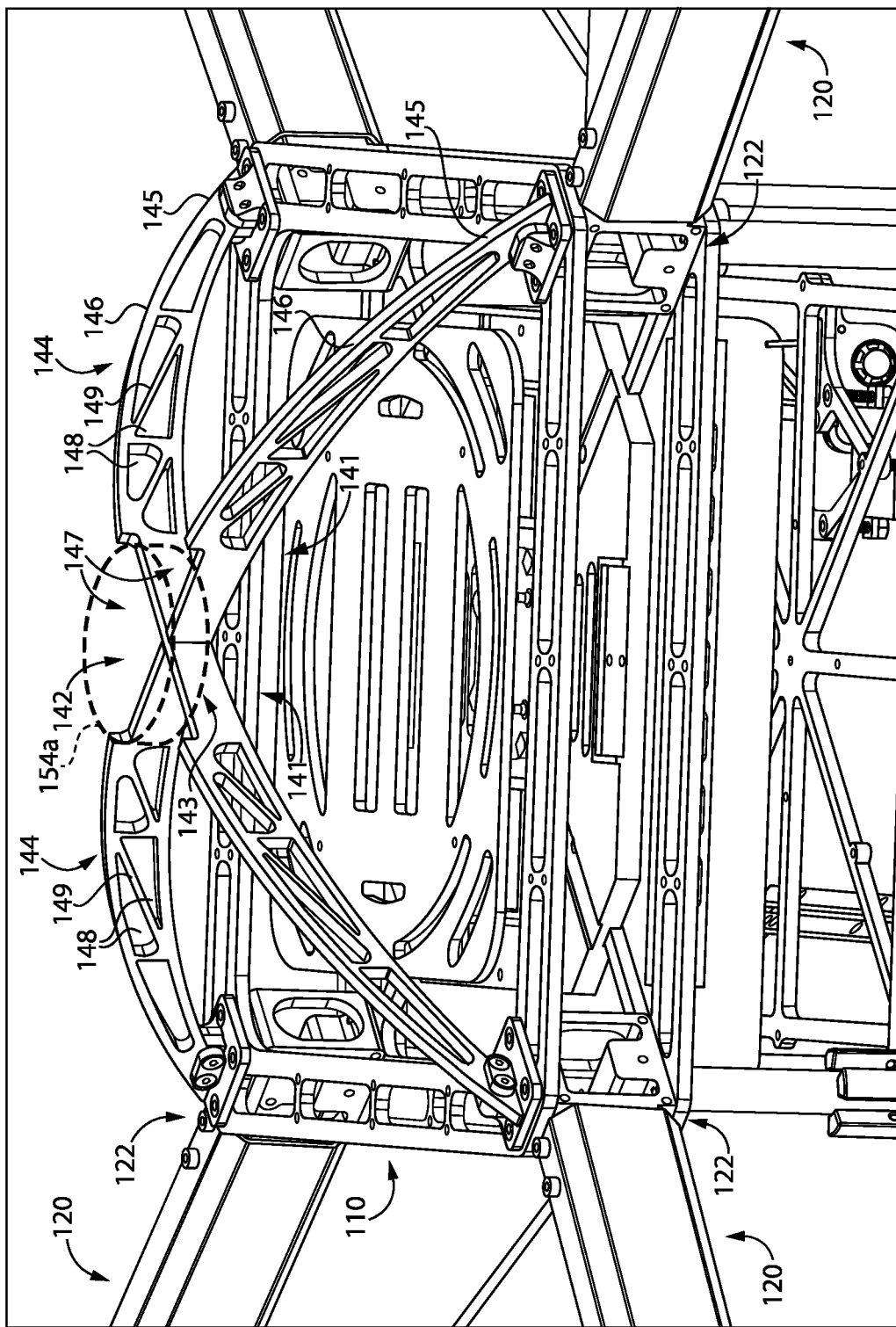
FIG. 6 is a perspective illustration focused on a support structure of the UAV illustrated in FIG. 1.

With additional reference to FIG. 6, the support structure 140 is mounted to the chassis 110, and generally includes an apex region 142 and a plurality of struts 144 extending between the apex region 142 and the arms 120. The apex region 142 may define a seat 143 sized and shaped to receive an outward-facing ranging-and-detection device 154a of the control system 150. Each strut 144 includes an outer end portion 145, an inner end portion 147, and a strut body 146 extending between and connecting the outer end portion 145 and the inner end portion 147. Each outer end portion 145 is connected to the inner end portion 122 of a corresponding one of the arms 120, and the inner end portions 147 are joined to one another at the apex region 142.

In the illustrated form, the struts 144 are provided as two pairs of struts 144, with each pair of struts 144 defining a corresponding and respective arch 141. It is also contemplated that the struts 144 may meet at the apex region 142 in another manner. By way of example, the apex region 142 may be provided as an annular apex region to which each inner end portion 147 is coupled (e.g., by welding). In the illustrated form, each strut body 146 is curved. It is also contemplated that one or more of the strut bodies 146 may be straight. Each strut body 146 may include one or more openings 148, one or more of which may be defined in part by a reinforcing rib 149. The openings 148 may serve to reduce the weight of the support structure 140 while the reinforcing ribs 149 serve to maintain the structural integrity of the support structure 140. Further details regarding the support structure 140 and the function thereof are provided herein.

It has been found that during operation of a UAV such as the UAV 100, the thrust generated by operation of the rotors 126 can generate significant bending moments on the chassis 110. More particularly, these bending moments generally urge the outer portions of the chassis 110 (e.g., the locations at which the inward end portions 122 are connected to the chassis 110) toward the vertical axis 101. In the illustrated UAV 100, however, these bending moments are counteracted by the support structure 140, such that the support structure 140 provides additional structural rigidity to the chassis 110. As a result, the chassis 110 experiences less stress and strain, each of which can lead to unwanted fatigue and potential failure.

Figure 7:
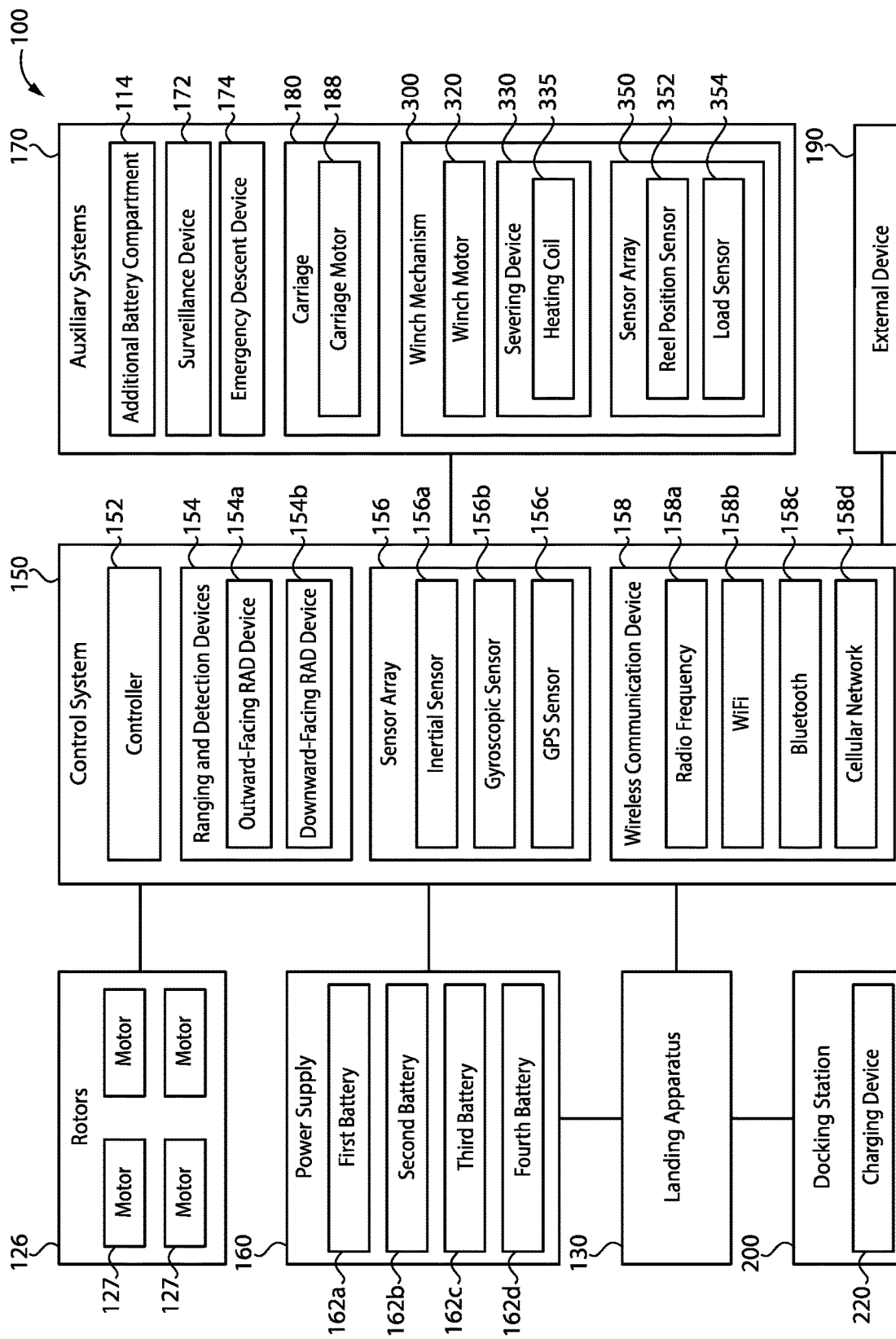
FIG. 7 is a schematic block diagram of the UAV illustrated in FIG. 1.

With additional reference to FIG. 7, the control system 150 generally includes a controller 152, one or more ranging-and-detection devices (RADs) 154, and a sensor array 156, and may further include one or more wireless communication devices 158. The control system 150 is in communication with the rotors 126 and is connected with the power supply 160 such that the controller 152 is operable to control the motors 127 to generate lift to fly the UAV 100. The control system 150 may be configured to control the rotors 126 to control the flight envelope of the UAV 100. The control system 150 may be configured to provide for protection of the flight envelope by avoiding obstacles, for example using the ranging-and-detection device(s) 154. In embodiments that include the auxiliary system(s) 170, the control system 150 may further be in communication with the auxiliary system(s) 170 to receive information from and/or control operation of the auxiliary system(s) 170.

The ranging-and-detection devices 154 may include an outward-facing ranging-and-detection device 154a operable to sense obstacles in the flight path of the UAV 100 and/or a downward-facing ranging-and-detection device 154b operable to sense a distance between the UAV 100 and the ground. As noted above, the outward-facing ranging-and-detection device 154a may be mounted in the seat 143 defined by the apex region 142 of the support structure 140, and may be utilized to aid in providing flight envelope protection for the UAV. The downward-facing ranging-and-detection device 154b may be mounted to the underside of the chassis 110. Each of the ranging-and-detection devices 154 may, for example, be provided as radar-type, optical camera devices, infrared detection devices, or LIDAR-type ranging-and-detection devices. In certain embodiments, optical and infrared detection devices may employ the use of active emitters, such as visible-spectrum searchlights, and non-visible spectrum lights. In certain embodiments, a ranging-and-detection device 154 may utilize binocular stereo vision technology.

The sensors of the sensor array 156 may be of any type typical to unmanned aerial vehicles, and the information generated by the sensors may be used to aid in the control of the UAV 100 and/or other vehicles on the ground or in the air. By way of non-limiting example, the sensor array 156 may include an inertial sensor 156a, a gyroscopic sensor 156b, and/or a global positioning system (GPS) chip 156c. The inertial sensor 156a may, for example, take the form of a gyroscopic sensor or an accelerometer. In certain embodiments, the sensor array 156 may include an altitude sensor operable to sense the current altitude of the UAV 100. In certain embodiments, the sensor array 156 may include a battery level sensor operable to sense the charge level of the batteries 162. In certain embodiments, the sensor array 156 may include one or more of an Automated Dependent Surveillance Broadcast (ADSB) sensor, legacy 4056 aviation transponder sensors, Terminal Collision and Avoidance System (TCAS) sensors, Enhanced Ground Proximity Warning Device (EGPWS) sensors, and/or laser-gyroscope sensors. Additionally or alternatively, the sensor array 156 may include one or more of a magnetometer, a barometer, and/or an airspeed sensor. The sensor array 156 may additionally or alternatively include one or more of current sensors, one or more voltage sensors, and/or one or more temperature sensors.

The wireless communication device(s) 158 facilitate communication between the controller 152 and one or more external devices 190. By way of non-limiting example, one or more of the wireless communication device(s) 158 may be provided as a radio frequency (RF) wireless communication device 158a configured to facilitate communication between the control system 150 and the external device 190 via radio frequency electromagnetic radiation. In certain embodiments, an RF wireless communication device 158a may be configured to communicate over the 915 MHz band. Additionally or alternatively, an RF wireless communication device 158a may be configured to communicate over the 2.4 GHz band (e.g., WiFi). In certain embodiments, the wireless communication device(s) 158 may include a Wi-Fi chip 158b operable to facilitate communication between the control system 150 and the external device 190 via Wi-Fi wireless communication protocols. In certain embodiments, the wireless communication device(s) 158 may include a Bluetooth chip 158c operable to facilitate communication between the control system 150 and the external device 190 via Bluetooth wireless communication protocols. In certain embodiments, the wireless communication device(s) 158 may include a cellular network communication device 158d. It is also contemplated that the wireless communication device(s) 158 may include one or more wireless communication devices of another form.

In the illustrated form, the onboard power supply 160 includes a plurality of batteries 162, including at least a first battery 162a and a second battery 162b. Each battery 162 is configured for sliding insertion into the corresponding one of the battery compartments 114 and to engage the latch 115 such that the latch 115 lockingly engages the battery 162 when the battery 162 is fully inserted. In certain embodiments, the batteries 162 may be interchangeable such that each battery 162 is operable to be inserted to each battery compartment 114. In certain embodiments, the batteries 162 may be connected with the control system 150 such that the control system 150 is operable to remain active upon removal of one battery 162 while the other battery 162 remains installed. Further details regarding the charging and replacement of the batteries 162 are provided herein. The control system 150 and/or the power supply 160 may be electrically connected with the landing apparatus 130 such that the UAV 100 is operable to charge the batteries 162 via the landing apparatus 130 when the landing apparatus 130 is engaged with a docking station 200 including a charging device 220. Further details regarding an example form for the docking station 200 are provided below with reference to FIGS. 9-11.

As noted above, the UAV 100 may include at least one auxiliary system 170, which may be electrically connected and/or otherwise in communication with the control system 150. The auxiliary system(s) 170 may, for example, be installed to the underside of the chassis 110. In certain forms, the auxiliary system(s) 170 may include at least one additional battery compartment 114 to which an additional battery 162 may be installed to increase the time that the UAV is operable to remain airborne. In certain embodiments, the auxiliary system(s) 170 may include a surveillance device 172 (e.g., a camera) by which the UAV 100 can surveil an area. In certain embodiments, the auxiliary system(s) 170 may include an emergency descent device 174, such as a parachute. In certain embodiments, the auxiliary system(s) 170 may include a carriage 180 operable to hold a load (e.g., a package) to be carried and/or delivered by the UAV 100. In certain embodiments, the auxiliary system(s) 170 may include a winch mechanism 300 operable to raise and lower loads. Further details regarding exemplary auxiliary systems 170 are provided herein.

Figure 8:
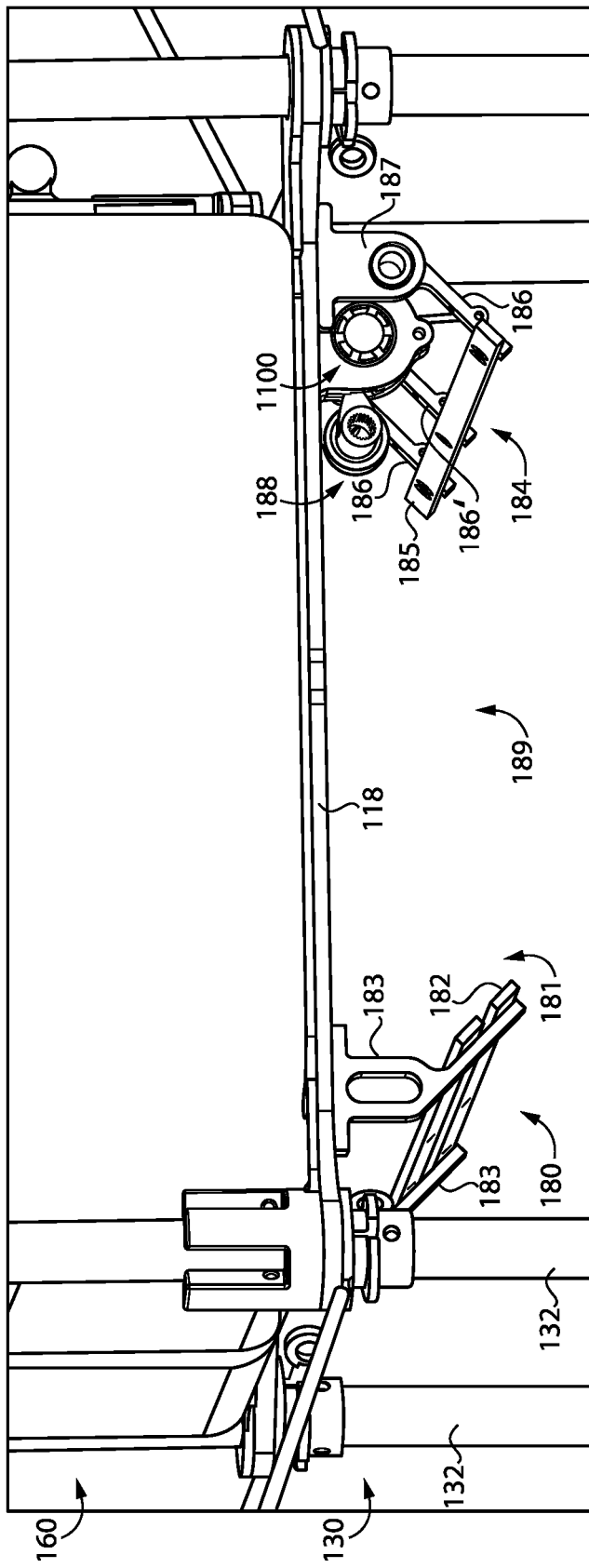
FIG. 8 is a perspective illustration focused on a carriage of the UAV illustrated in FIG. 1.

With additional reference to FIG. 8, the illustrated carriage 180 is mounted to the underside of the chassis 110, and generally includes a first grip 181, a second grip 184, and a motor 188 operable to cause movement of the second grip 184. A receiving space 189 is defined between the grips 181, 184, and is operable to receive a load such as a package to be carried and/or delivered by the UAV 100. The first grip 181 includes a first grip pad 182 and a pair of arms 183 to which the first grip pad 182 is mounted. The second grip 184 includes a second grip pad 185 that is mounted to a pair of pivot arms 186 and a retention arm 186'. The pivot arms 186 are pivotably attached to a mounting bracket 187 such that the second grip 184 is pivotable in each of a capturing direction and a releasing direction, and the retention arm 186' is engaged with the motor 188 via a carriage lock mechanism 1100 that selectively prevents pivoting of the retention arm 186'. As described in further detail with respect to FIGS. 29-31, the carriage lock mechanism 1100 is configured to selectively lock the second grip 184 in a capturing position, and to selectively release the second grip 184 for pivoting to a releasing position.

Pivoting of the second grip 184 in the capturing direction (e.g., from the releasing position toward the capturing position) causes contraction of the receiving space 189 such that the load can be captured between the grips 181, 184. Pivoting of the second grip 184 in the releasing (e.g., from the capturing position toward the releasing position) direction causes expansion of the receiving space 189 such that the load can be released from the carriage 180. In certain forms, such as those that do not include the winch mechanism 300, release of the load may simply cause the load to drop under freefall conditions. In other embodiments, such as those that include the winch mechanism 300, release of the load may cause a controlled descent of the load under control of the winch mechanism 300, for example as described below with reference to FIGS. 15 and 16.

In the illustrated form, the first grip 181 provides a mechanical anchor point against which the load can by urged by the second grip 184, and is not controlled by the control system 150. In other embodiments, the first grip 181 may be operable to move under control of the control system 150. As one example, the first grip 181 may be operably coupled with the motor 188 such that the motor 188 is operable to cause or permit pivoting of the first grip 181. As another example, the carriage 180 may include a second motor, and movement of the first grip 181 may be controlled by such a motor. Additionally, while the illustrated second grip 184 is configured to pivot under control of the motor 188, it is also contemplated that expansion and contraction of the receiving space 189 may be provided in another manner. As one example, the second grip 184 may be provided with a rack-and-pinion device that causes the motor 188 to linearly drive the second grip 184 and/or the first grip 181 for expansion and contraction of the receiving space 189.

Figure 10:
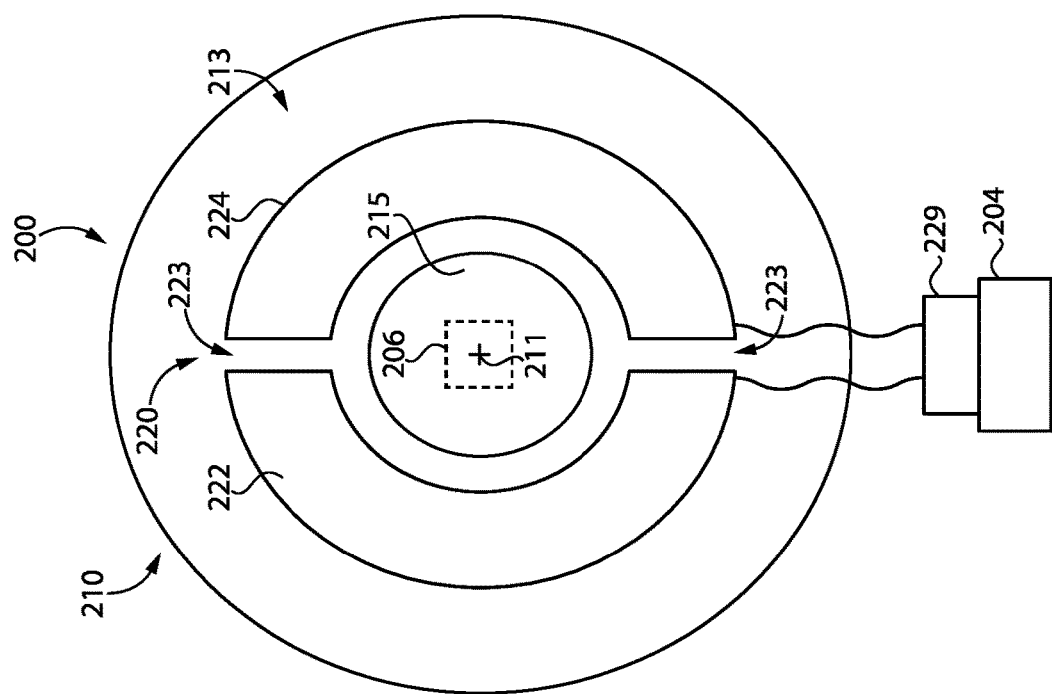
FIG. 10 is a schematic plan view of a portion of the docking station illustrated in FIG. 9.
Figure 9:
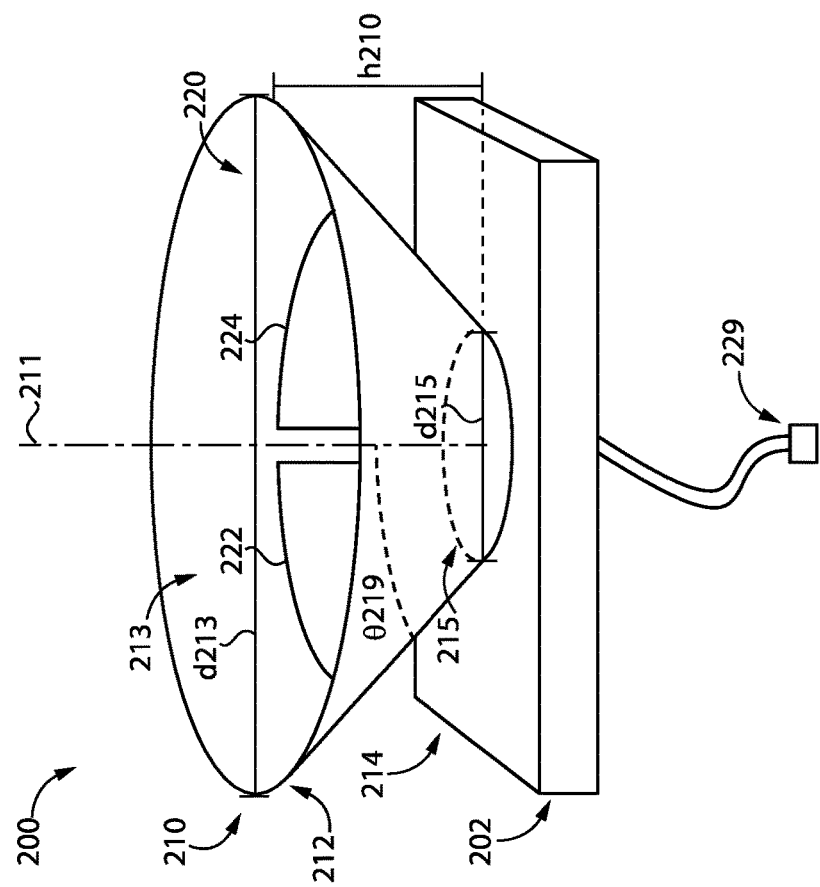
FIG. 9 is a schematic perspective illustration of a docking station according to certain embodiments.

With additional reference to FIGS. 9 and 10, illustrated therein is a docking station 200 according to certain embodiments, which in the illustrated form is provided as a charging station 200. The charging station 200 generally includes a nest 210 and a charging device 220 mounted in the nest 210, and may further include a base 202 to which the nest 210 is mounted. As described herein, the nest 210 aids in aligning the UAV 100 during landing, and the charging device 220 is operable to charge the onboard power supply 160 via the landing apparatus 130. While the illustrated device is provided as a charging station 200 that includes the charging device 220, it is also contemplated that the charging device 220 may be omitted, resulting in a non-charging docking station 200.

The nest 210 has a central axis 211, an upper portion 212, and a lower portion 214, and is defined by at least one sidewall 219 that is angled or curved relative to the central axis 211 such that the upper portion 212 is larger in diameter than the lower portion 214. The upper portion 212 defines an upper opening 213 having an upper opening diameter d213 that is greater than the landing apparatus effective diameter d130. The upper opening diameter d213 may, for example, be in a range of 50% larger to 200% larger than the landing apparatus effective diameter d130. The lower portion 214 may include a lower surface 215 having a lower surface diameter d215. In certain embodiments, the lower surface diameter d215 may be less than the landing apparatus effective diameter d130 such that the landing apparatus 130 cannot fit within the lower surface 215, and instead must contact the inner surface of the sidewall 219. In other embodiments, the lower surface diameter d215 may be greater than the landing apparatus effective diameter d130 such that the landing apparatus 130 is capable of fitting onto the lower surface 215. Furthermore, while the illustrated nest 210 has a lower surface 215, it is also contemplated that the nest 210 may instead come to a point. As described herein, it is also contemplated that the lower surface 215 may be omitted such that the bottom of the nest 210 is at least selectively open to permit access to the underside of the chassis 110, for example as described below with reference to FIG. 21.

In the illustrated form, the nest 210 is defined by a single frustoconical sidewall 219 that defines an oblique angle θ219 relative to the central axis 211. It is also contemplated that the nest 210 may have another configuration. As one example, the nest 210 may instead be defined by a plurality of planar, trapezoidal or triangular sidewalls that are joined such that the smaller ends define the lower portion 214 and the larger ends define the upper portion 216. Additionally or alternatively, the one or more sidewalls 219 may be curved relative to the central axis 211. Various dimensions of the nest 210, such as the height h210 and the oblique angle θ219, may be selected so as to not interfere with the rotors 126 and/or the arms 120 during landing of the UAV 100. In the illustrated form, the oblique angle θ219 is greater than 45° such that the nest 210 expands relatively rapidly along the central axis 211. In other forms, the oblique angle θ219 may be less than 45° such that the nest 210 expands relatively slowly along the central axis 211. In further embodiments, the central angle θ219 may be about 45° (e.g., from 40° to 50°).

The charging device 220 includes a first contact pad 222 and a second contact pad 224, and the contact pads 222, 224 are electrically isolated from one another. For example, one or more electrically insulating regions 223 may be provided between the contact pads 222, 224. In the illustrated form, the contact pads 222, 224 are provided on the inner surface of the sidewall(s) 219, and do not extend to the lower surface 215. In certain embodiments, one or both of the contact pads 222, 224 may extend onto the lower surface 215. In certain embodiments, such as those in which the lower surface diameter d215 is greater than the landing apparatus diameter d130, the contact pads 222, 224 may be provided entirely on the lower surface 215.

The charging device 220 includes or is configured for connection with a power source 204, for example via a plug 229. In certain embodiments, the charging device 220 may include the power source 204, such as in embodiments in which the power source 204 is provided in the form of a battery, a generator, a solar panel, or another form of power source that can be provided with the charging station 200. Additionally or alternatively, the charging device 220 may be configured for connection with the power source 204, such as in embodiments in which the power source 204 is provided as line power or the battery of a vehicle to which the charging station 200 is mounted. When connected with the power source 204, the charging device 220 is operable to generate a voltage differential across the first contact pad 222 and the second contact pad 224 such that the UAV is operable to draw electrical power from the charging device 220. In certain embodiments, the charging device 220 may further include one or more sensors. As one example, one or more sensors may be used to determine when to start charging the UAV 100. As another example, one or more sensors may be used to regulate the rate of charge according to the needs of the batteries 162. As another example, one or more sensors may be used to stop charging and transition to a battery-maintenance function at the appropriate time.

Figure 11:
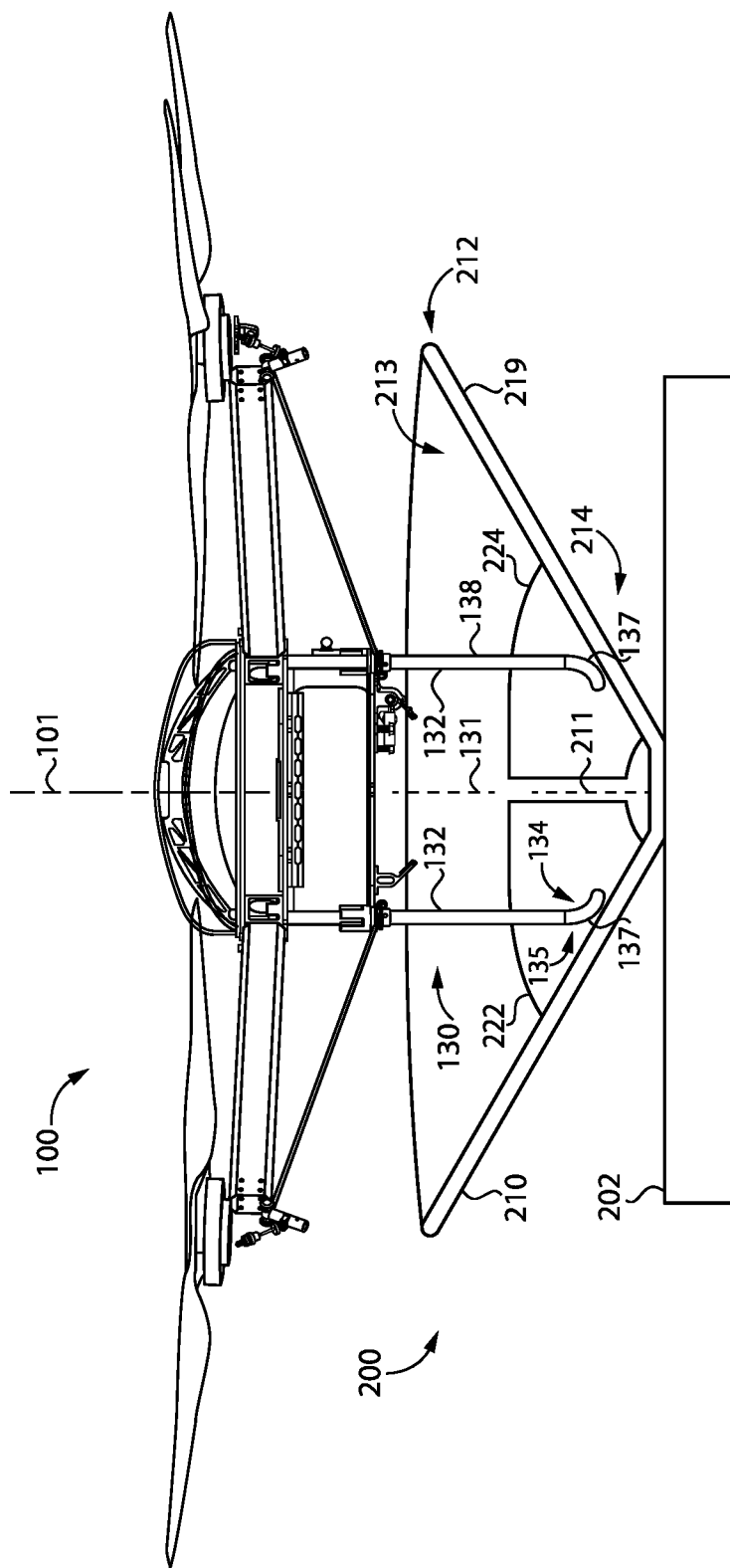
FIG. 11 is a partial cutaway view illustrating the UAV of FIG. 1 landing in the docking station illustrated in FIG. 9.

With additional reference to FIG. 11, the UAV 100 is operable to land within the nest 210. In certain embodiments, such as those in which the UAV 100 is remotely controlled by a user, the UAV 100 may land in the nest 210 under remote control of the user. In certain embodiments, such as those in which the UAV 100 is autonomous, the control system 150 may be programmed to autonomously land the UAV 100 within the nest 210. In order to aid such autonomous landing, the charging station 200 and/or the nest 210 may include a landing assistance device 206. While the illustrated landing assistance device 206 is provided within the nest 210, it is also contemplated that the landing assistance device 206 may be provided at another location having a known position and/or orientation relative to the nest 210.

In certain embodiments, the landing assistance device 206 may include active features. For example, the landing assistance device 206 may include one or more beacons that provide electromagnetic homing signals (e.g., radio signals, infrared signals, visible light signals, or signals of other wavelengths). In such forms, the UAV 100 may be configured to receive such homing signals (e.g., via one or more of the sensors of the sensor array 156), and the control system 150 may be programmed to land in the nest 210 based upon such homing signals.

In addition or as an alternative to the active features, the landing assistance device 206 may include passive features. For example, the landing assistance device 206 may include a barcode that provides position information to the UAV 100. In such forms, the sensor array 156 may include a camera or other optical detector operable to provide to the control system 150 information relating to the passive feature(s), and the control system 150 may be programmed to land in the nest 210 based upon the position and/or orientation information provided by the barcode. In certain forms, the barcode may be provided as a two-dimensional barcode, such as a Quick Response (QR) code or another form of two-dimensional barcode. One advantage of such two-dimensional barcodes is the ability to provide orientation information in addition to position information. As a result, such forms of the landing assistance device 206 may aid the UAV 100 in landing in a given orientation. By way of example, if a first of the legs 132 is electrically connected with a positive terminal of the power supply 160 and a second of the legs 132 is electrically connected with a negative terminal of the power supply 160, the orientation information may aid the UAV in landing in an orientation in which each of the first leg 132 and the second leg 132 is in contact with the appropriate one of the contact pads 222, 224.

As noted above, certain existing UAV systems and methods provide a flat surface such as a landing pad on which the UAV is intended to land. Regardless of whether the UAV is user-controlled or autonomous, the illustrated docking station 200 may provide for certain advantages over such prior art UAV base stations. For example, such prior art landing pads typically require that the control of the UAV be precise so as to land the UAV at a central position on the landing pad. As noted above, however, the upper opening diameter d213 is greater than the landing apparatus effective diameter d130, and the nest 210 tapers or curves inward from this larger diameter to a smaller diameter. It may be the case that the UAV 100 is off-center during its initial contact with the nest 210. For example, the UAV central axis 101 and/or the landing apparatus central axis 131 may be offset from the nest central axis 211. In such circumstances, the tapered or curved sidewall(s) 219 will urge the UAV 100 toward the central axis 211 of the nest 210 as the UAV 100 descends. Thus, the upper opening 213 provides the UAV with a larger target area or strike zone that can be hit during the landing process, while the tapered or curved sidewall(s) 219 ensure that the final position of the UAV 100 is substantially centered. As a result, the docking station 200 may obviate the need for tight controls and heightened precision during the final approach.

As should be appreciated, there is an acceptable margin of error in centering of the UAV 100. Should the acceptable margin of error be exceeded, one or more of the feet 134 will land outside of the nest 210, resulting in a failed landing and potential damage to the UAV 100. Those skilled in the art will readily appreciate that this margin of error corresponds to the difference between the landing apparatus effective diameter d130 and the upper opening diameter d213. For a nest 210 having a given upper opening diameter d213, one manner in which the acceptable margin of error can be increased is by decreasing the landing apparatus effective diameter d130. Thus, it may be advantageous to provide the landing apparatus 130 with an inward-facing arrangement (such as that illustrated in FIG. 5*a*) as opposed to an outward-facing arrangement (such as that illustrated in FIG. 5*b*).

As noted above, each leg 132 includes a contact surface 137 that is connected with the power supply 160 via an electrical conduit 138. When the UAV 100 is received in in the nest 210, each of the contact pads 222, 224 is in contact with one or more of the contact surfaces 137. Thus, the charging device 220 is electrically connected with the power supply 160 via the contact surfaces 137 and the electrical conduits 138. In the illustrated form, the contact surfaces 137 are defined by the feet 134, which are provided with an inward-facing arrangement such as that shown in FIG. 5*a*. In addition to providing a greater acceptable margin of error, inward-facing arrangements for the landing apparatus 130 may have the further advantage of increasing the area of contact between each foot 134 and the corresponding contact pad 222, 224. For example, the contact surfaces 137 may be defined on the heels 135, which may be angled or curved so as to conform more closely to the geometry of the contact pads 222, 224. As should be appreciated, increasing the area of contact between the contact surfaces 137 and the contact pads 222, 224 facilitates transmission of electrical current by reducing the electrical resistance at the interface between the contact surfaces 137 and the contact pads 222, 224, thereby increasing the efficiency and rapidity of the charging process.

Figure 12:
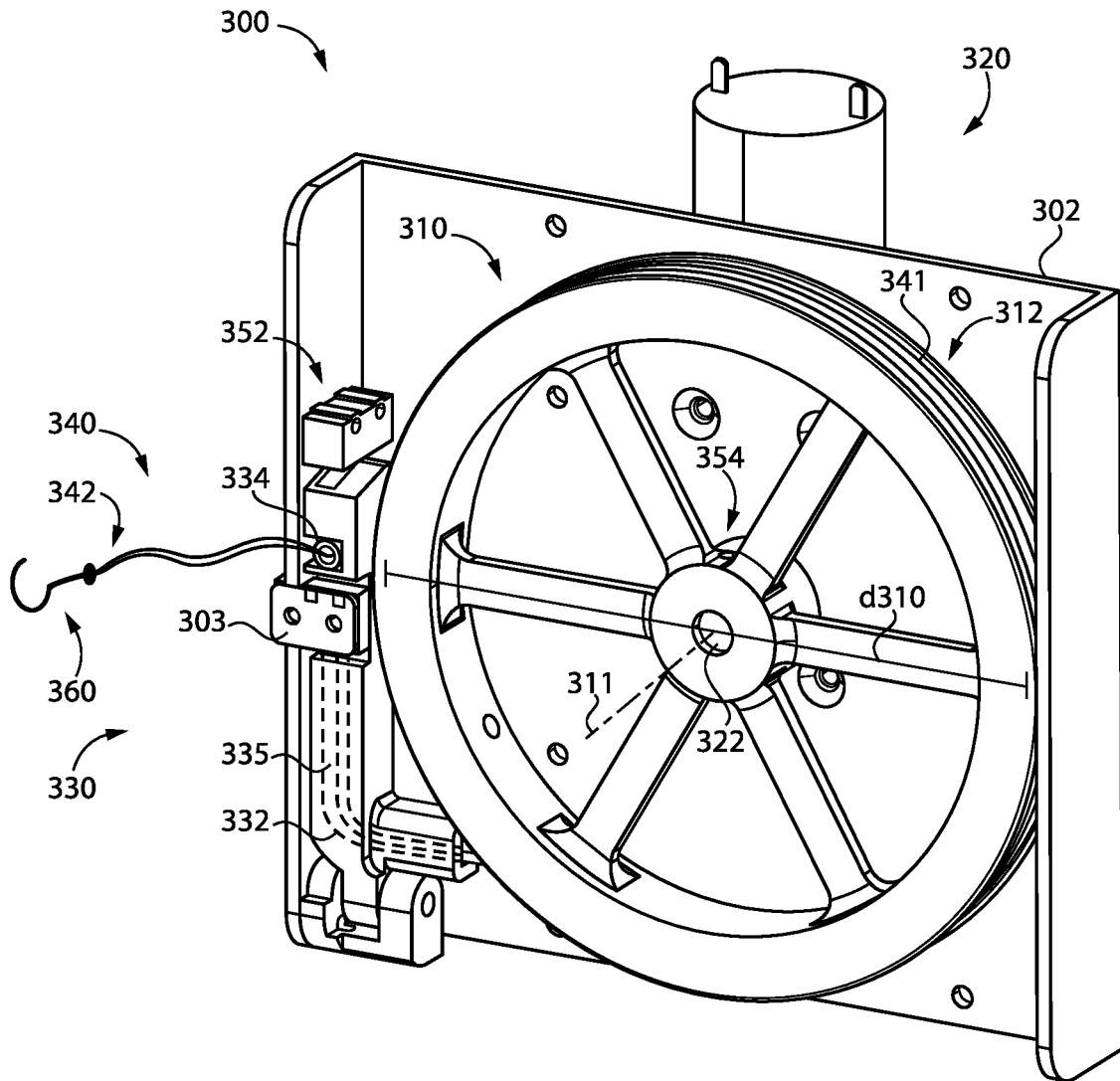
FIG. 12 is a perspective illustration of a winch mechanism according to certain embodiments.

With additional reference to FIG. 12, illustrated therein is a winch mechanism 300 according to certain embodiments. The illustrated winch mechanism 300 generally includes a mounting bracket 302, a reel 310 rotatably mounted to the mounting bracket 302, a motor 320 operable to rotate the reel 310, a severing device 330 mounted to the mounting bracket 302, a line 340 mounted to the reel 310 and extending through the severing device 330, and a sensor array 350 operable to sense various operating parameters of the winch mechanism 300, and may further include an attachment device 360 attached to a free end 342 of the line 340. As noted above, the winch mechanism 300 is in communication with the control system 150, and is operable to raise and/or lower a load under the control of the control system 150. As described herein, the winch mechanism 300 may be mounted to the chassis 110 in the vicinity of the carriage 180 such that the winch mechanism 300 is operable to control the descent of a load upon release of the load by the carriage 180.

The reel 310 is rotatably mounted to the mounting bracket 302, and is operably connected with a motor shaft 322 of the motor 320 such that the motor 320 is operable to control rotation of the reel 310 about a rotation axis 311. The reel 310 includes a circumferential channel 312 in which the line 340 is wound onto the reel 310. While other forms are contemplated, in the illustrated form, the winch mechanism 300 is mounted to the chassis 110 with the reel 310 in a horizontal orientation such that the rotation axis 311 is a vertical rotation axis.

Figure 13:
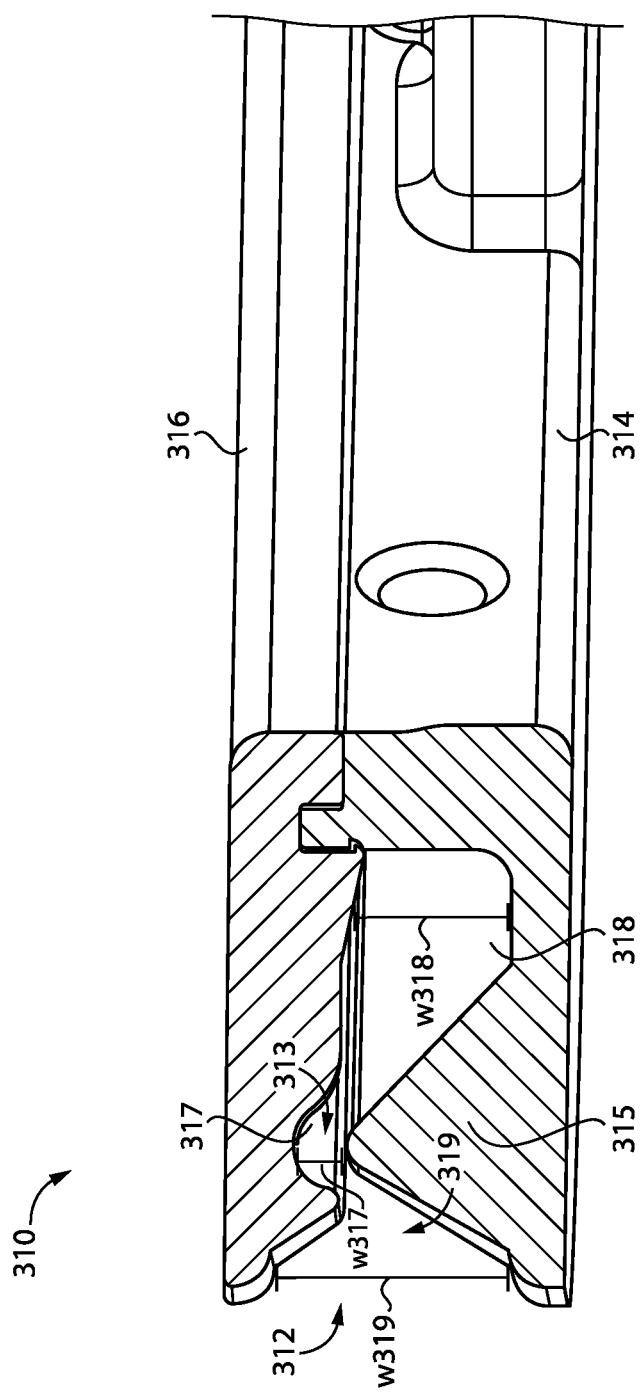
FIG. 13 is cross-sectional view of a reel of the winch mechanism illustrated in FIG. 12.

With additional reference to FIG. 13, the illustrated reel 310 is provided as a two-piece reel, and includes a base portion 314 and a cover portion 316, each of which partially defines the circumferential channel 312. The base portion 314 includes a circumferential ridge 315, and the cover portion 316 includes a circumferential groove 313 that faces an apex of the ridge 315, thereby defining a narrow, somewhat tortuous passage 317 of the circumferential channel 312. The passage 317 connects a radially inner portion 318 of the channel 312 with a radially outer portion 319 of the channel 312. The inner portion 318 has an inner portion width w318, the passage 317 has a passage width w317 less than the inner portion width w318, and the outer portion 319 tapers inward from a maximum outer portion width w319 to the passage width w317. When the line 340 is wound onto the reel 310, the majority of the line 340 is seated in the radially inner portion 318, and a portion of the line 340 extends through the passage 317. As described herein, the passage 317 may aid in discouraging tangling of the line 340 as the line 340 is unspooled from the reel 310.

The motor 320 includes a motor shaft 322, and is operable to control rotation of the motor shaft 322. As noted above, the motor shaft 322 is coupled with the reel 310 such that the motor 320 is operable to control rotation of the reel 310. In the illustrated form, the motor shaft 322 is directly coupled with the reel 310 and extends along the rotational axis 311. In other embodiments, the motor shaft 322 may be indirectly coupled with the reel 310, for example via one or more gears that cause rotation of the reel 310 in response to rotation of the motor shaft 322. Rotation of the motor shaft 322 and the reel 310 in a first direction causes the line 340 to unwind from the reel 310, thereby causing the free end 342 of the line 340 to descend under the force of gravity. Rotation of the motor shaft 322 and the reel 310 in a second direction opposite the first direction causes the line 340 to wind onto the reel 310, thereby causing the free end 342 of the line 340 to raise. Accordingly, the first direction may alternatively be referred to as the line lowering direction, and the second direction may alternatively be referred to as the line raising direction.

During rotation of the reel 310 in the line lowering direction, it may be the case that slack develops in the line 340, for example in the event that the reel 310 is being rotated faster than the line 340 is being paid out. With conventional reels, such slack may lead to the development of tangles in the line 340. However, the illustrated reel 310 discourages the generation of such tangles. More particularly, the ridge 315 retains the majority of the slackened portion of the line 340 confined within the inner portion 318 of the channel 312, while the passage 317 permits the line 340 to pay out at the appropriate speed. As a result, the line 340 does not unspool so quickly as to risk the generation of tangles.

The severing device 330 is in communication with the control system 150 and is operable to sever the line 340. In the illustrated form, the severing device 330 generally includes an armature 332 and a heating tube 334 passing through the armature 332. The armature 332 is pivotably mounted to the mounting bracket 302 for movement between an actuated position and a deactuated position, and may be biased toward the deactuated position by a biasing member. The pivotal range of the armature 332 may be limited by a stop arm 303 of the mounting bracket 302. The line 340 passes through the heating tube 334, which includes a heating coil 335 in communication with the control system 150. Upon receiving an appropriate severing signal from the control system 150, the heating coil 335 generates a heat sufficient to burn and/or melt the through line 340, thereby severing the line 340. It is also contemplated that the severing device 330 may sever the line in another manner, such as by employing a blade that moves to cut the line 340 upon receiving the severing signal from the control system 150. However, it has been found that the use of a heating coil 335 to melt and/or burn the line may provide certain advantages, such as reducing the number of moving parts and obviating the possibility of an inadvertent severing of the line 340.

The line 340 includes a wound portion 341 that is wound about the reel 310, and extends through the severing device 330 to the free end 342, which is coupled with the attachment device 360. As noted above, rotation of the reel 310 in the line raising direction winds the line 340 onto the reel 310 and raises the free end 342, and rotation of the reel 310 in the line lowering direction unwinds the line 340 from the reel 310 and lowers the free end 342. In the illustrated form, the line 340 is formed of a material that is sufficiently durable to support loads of a predetermined weight while remaining susceptible to melting and/or burning by the heating coil 335. By way of non-limiting example, the line 340 may be formed of nylon, polyvinylidene fluoride (PVDF), polyethylene, and/or ultra-high molecular weight polyethylene (UHMWPE), and may be provided as monofilament, braided, or another form.

The sensor array 350 is in communication with the control system 150, and includes a rotary position sensor 354 and a load sensor 352, each of which may be mounted to the mounting bracket 302. The rotary position sensor 354 is associated with the reel 310 and is configured to provide the control system 150 with information relating to the angular position of the reel 310. The rotary position sensor 354 may, for example, be provided as a magnetic rotary sensor.

The control system 150 may be provided with (e.g., have stored in memory) information relating to the diameter d310 of the reel 310 such that the control system 150 is able to calculate the length of line 340 that has been paid out based upon the information provided by the rotary position sensor 354. More particularly, the control system may calculate this length based upon the equation $L340 = \pi \cdot d310 \cdot n$, where L340 is the length of line 340 that has been paid out, d310 is the diameter of the reel 310, and n is the number of revolutions that the reel 310 has rotated as indicated by the information received from the rotary position sensor 354. For example, if the diameter of the reel is 20 cm and the rotary position sensor 354 indicates that the reel 310 has undergone ten revolutions in the line lowering direction, the control system 150 may determine that the load has dropped approximately 6.28 meters. As described herein, this information can be compared with information generated by the downward-facing ranging-and-detection device 154b to determine how far the load is from the ground or other designated delivery surface.

The load sensor 352 is associated with the armature 332 of the severing device 330 such that the load sensor 352 is operable to distinguish between the actuated and deactuated positions of the armature 332. As described herein, these positions respectively correspond to loaded and unloaded conditions of the winch mechanism 300 such that the control system 150 is operable to determine whether the winch mechanism 300 is supporting a load based upon the information received from the load sensor 352. In the illustrated form, the load sensor 352 is provided as a snap action mechanical switch or microswitch. It is also contemplated that the load sensor 352 may be provided as another form of sensor operable to sense the actuated/deactuated position of the armature 332, such as an optical switch, a magnetic switch, or a Hall effect switch or sensor.

Figure 14:
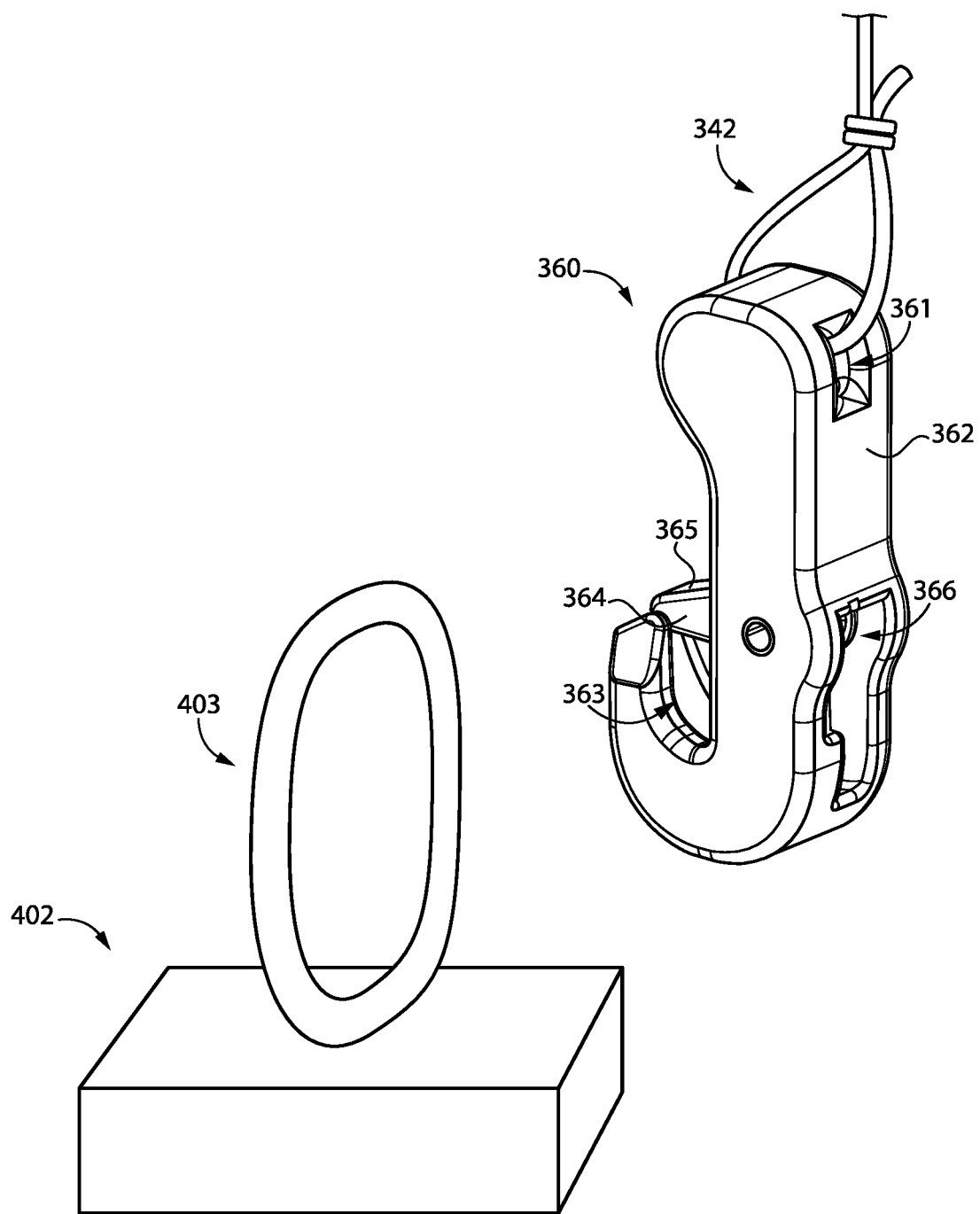
FIG. 14 is a perspective illustration of an attachment device according to certain embodiments.

With additional reference to FIG. 14, the attachment device 360 of the illustrated embodiment is provided in the form of a gravity hook 360 that is coupled (e.g., tied) to the free end 342 of the line 340, which may pass through an aperture 361 formed in the gravity hook 360. Also illustrated in FIG. 14 is a load 402 to be carried and released by the gravity hook 360, the load 402 including a ring 403 by which the load 402 can be loaded onto the gravity hook 360. The gravity hook 360 generally includes a hook-shaped body 362 defining a hook recess 363. A lever 364 is pivotably mounted to the body 362, and an upper side of the lever 364 defines a ramp 365. The lever 364 is pivotable relative to the body 362 between a substantially horizontal upper position (illustrated) and a substantially vertical lower position, and is biased toward the upper position by a biasing member 366. In the illustrated form, the biasing member 366 is provided in the form of a torsion spring. In other embodiments, the biasing member 366 may be provided in another form, such as one that includes a compression spring, an extension spring, an elastic member, or one or more magnets.

The load 402 may be loaded onto the gravity hook 360 by passing the tip of the hook through the ring 403 such that the ring 403 engages the lever 364 and urges the lever 364 to its lower position against the force of the biasing member 366. When so loaded, a portion of the ring 403 is seated in the hook recess 363 and maintains the lever 364 in its lower position. In this state, the force of the biasing member 366 is substantially side-to-side, and is insufficient to drive the lever 364 to its upper position against the weight of the load 402. The load 402 may then be delivered to a designated delivery surface as described in further detail below. When the load 402 is supported by the designated surface, further downward movement of the gravity hook 360 causes the ring 403 to exit the hook recess 363, thereby causing the lever 364 to pivot to its upper position under the force of the biasing member 366. When the gravity hook 360 is subsequently raised, the biasing member 366 retains the lever 364 in its upper position as the ramp 365 causes the ring 403 to slide out of engagement with the lever 364, thereby releasing the load 402 from the gravity hook 360.

As noted above, the UAV 100 may be operated to deliver a load 402, such as a package, to a destination or delivery zone. In order to do so, the load may be attached to the winch mechanism 300 via the attachment device 360. In certain embodiments, the load 402 may also be loaded onto the carriage 180 or a similar device. It is also contemplated that the carriage 180 may be omitted, and that the load may be borne by the winch mechanism alone 300. The UAV 100 may then be operated, either autonomously or under control of a user, to fly to the destination. Upon arriving at the destination, the control system 150 may operate the carriage motor 188 to release the load 402 from the carriage 180, thereby causing the load 402 to drop slightly until the line 340 becomes taut. As the weight of the load 402 is transferred to the line 340, the severing device armature 332 pivots to its actuated position, thereby actuating the load sensor 352 and indicating to the control system 150 that the load is being borne by the winch mechanism 300. The control system 150 may then operate the winch mechanism 300 to lower the load 402 to the ground or other surface, for example as described below with reference to FIGS. 15 and 16.

When the load 402 is supported by the ground or other surface, the gravity hook 360 disengages as described above, thereby releasing the weight of the load 402 from the line 340. As a result, the armature 332 pivots to its deactuated position, thereby deactuating the load sensor 352 and indicating to the control system 150 that the load 402 has been delivered. In response to this information, the control system 150 may operate the motor 320 to rotate the reel 310 in the line raising direction to retract the line 340.

During movement of the line 340, it may be the case that the line 340 becomes tangled, caught, or otherwise prevented from operating as designed. For example, the line 340 may become tangled on itself, or caught on an obstacle such as a tree or fence. In the event of such a tangle or catch, the current drawn by the motor 320 may spike, or the sensor array 156 may indicate an unexpected jerk in the position of the UAV 100, each of which may be interpreted as a fault condition relating to the line 340. Regardless of the manner of detecting the fault condition, it may be desirable to sever the line 340 to free the UAV 100 for further operation. Thus, in response to detecting the fault condition, the control system 150 may transmit the severing signal to the severing device 330, thereby causing the severing device 330 to sever the line 340. In the illustrated embodiment, the severing signal may be provided as a voltage sufficient to cause the heating coil 335 to heat to a temperature sufficient to melt and/or burn at least a portion of the line 340 within the tube 334. With the line 340 severed, the UAV 100 once again is free to travel, and may return to a base station for maintenance to replace the line 340 or couple a new attachment device 360 to the severed end of the line 340.

Figure 15:
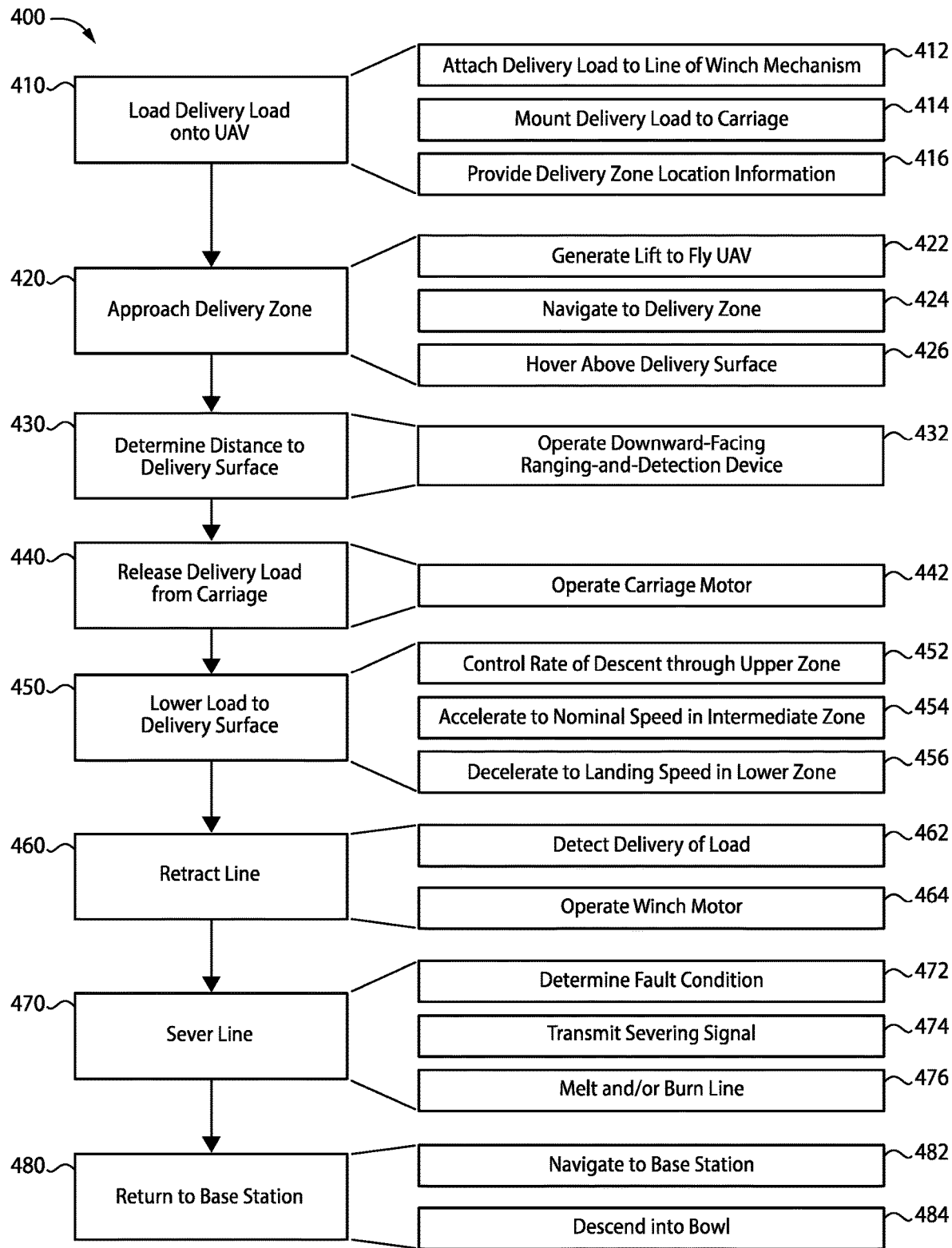
FIG. 15 is a schematic flow diagram of a load delivery process according to certain embodiments.
Figure 16:
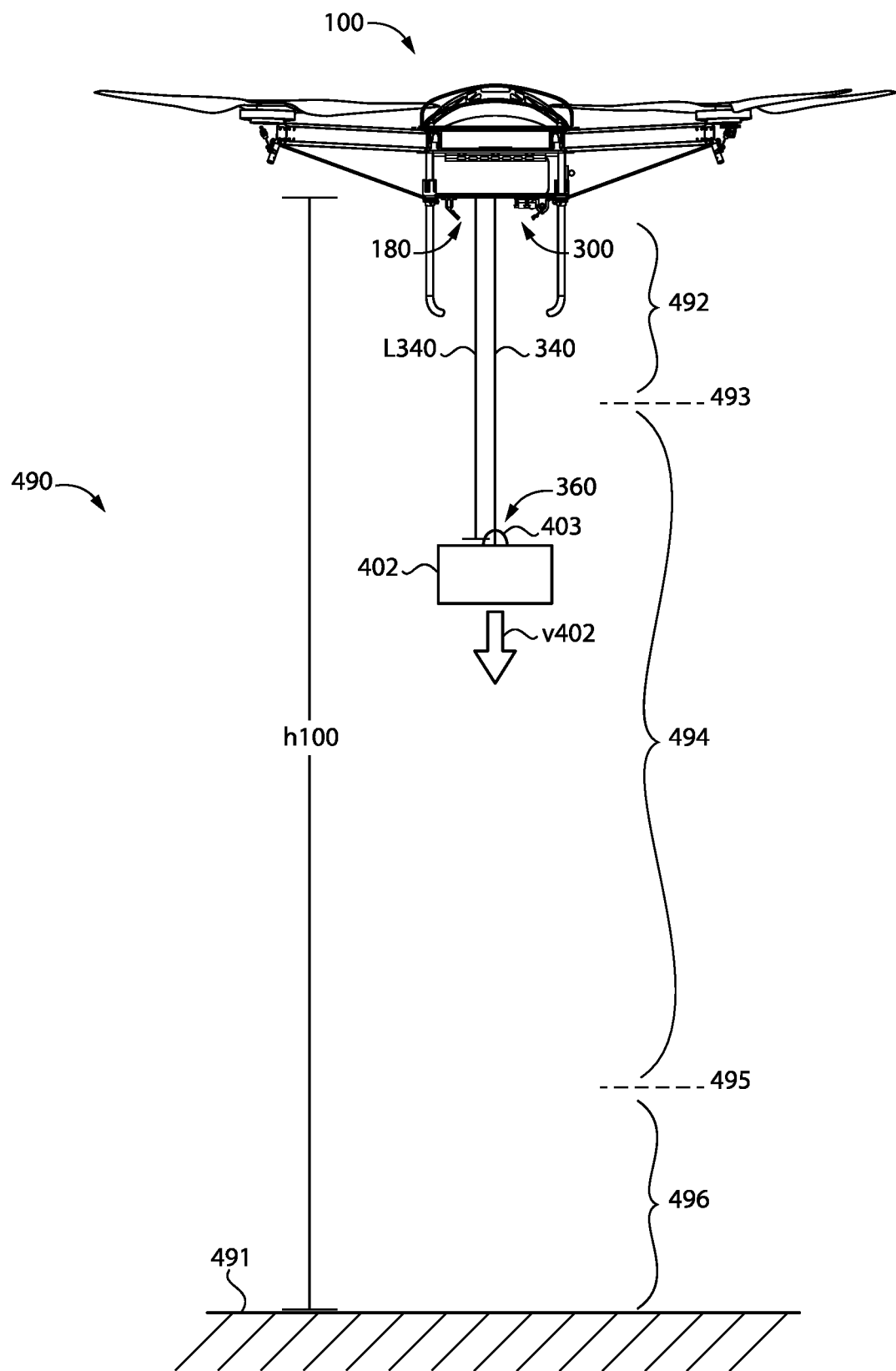
FIG. 16 illustrates the UAV of FIG. 1 delivering a load during the process illustrated in FIG. 15.

With additional reference to FIGS. 15 and 16, illustrated therein is an exemplary process 400 that may be performed using a UAV to deliver a delivery load 402 to a destination such as a delivery zone 490. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 400 may be performed wholly by one or more components of the UAV, or that the blocks may be distributed among one or more of the elements and/or additional devices or systems that are not specifically illustrated in FIGS. 1-14. Additionally, while the blocks are illustrated in a relatively serial fashion, it is to be understood that two or more of the blocks may be performed concurrently or in parallel with one another unless specified to the contrary. Moreover, while the process 400 is described with specific reference to the example UAV 100 illustrated in FIG. 1, it is to be appreciated that the process 400 may be performed using a UAV of similar or different configurations.

The process 400 generally includes a loading procedure 410, an approach procedure 420, a ranging procedure 430, a release procedure 440, a delivery procedure 450, and a line retracting procedure 460, and may further include a line severing procedure 470 and/or a return procedure 480. As described herein, the loading procedure 410 generally involves loading the delivery load 402 onto the UAV 100, the approach procedure 420 generally involves approaching a delivery zone 490 having a designated delivery surface 491, the ranging procedure 430 generally involves determining a distance between the UAV 100 and the designated surface 491, and the release procedure 440 generally involves releasing the load 402 from the carriage 180. Additionally, the delivery procedure 450 generally involves delivering the load 402 to the delivery surface 491 using the line 340, the line retracting procedure 460 generally involves retracting the line 340, the line severing procedure 470 generally involves severing the line 340, and the return procedure 480 generally involves returning the UAV 100 to a base station or a docking station.

The loading procedure 410 generally involves loading a delivery load 402 such as a parcel or package onto the UAV 100 such that the UAV 100 is operable to carry the load 402. The loading procedure 410 may, for example, be performed at a base station, which may be static (e.g., provided to a building) or mobile (e.g., provided to a delivery truck). The loading procedure 410 may, for example, be performed by one or more of delivery personnel, the owner and/or operator of the UAV 100, or other personnel.

The loading procedure 410 includes block 412, which generally involves attaching a delivery load 402 to a line 340 of a winch mechanism 300 of a UAV 100. In the illustrated form, block 412 generally involves attaching the delivery load 402 to the free end 342 of the line 340, for example using the attachment device 360. By way of illustration, block 412 may involve attaching the gravity hook 360 to the ring 403 of the load 402 such that the winch mechanism 300 is operable to raise and lower the load 402 by rotating the reel 310 in the line raising direction and the line lowering direction.

In certain embodiments, such as those in which the UAV 100 includes the carriage 180, the loading procedure 410 may further include block 414, which generally involves mounting the delivery load 402 in the carriage of the UAV. In the illustrated form, block 414 generally involves mounting the delivery load 402 into the carriage 180 of the UAV 100. As should be appreciated, mounting the load 402 to the carriage 180 may reduce the amount by which the load 402 can sway during transport, which may facilitate the control of the UAV 100 during subsequent procedures and blocks.

In certain embodiments, such as those in which the UAV 100 is operable to autonomously deliver the load 402, the loading procedure 410 may further include block 416, which generally involves providing the control system 150 with information relating to the location of the delivery zone 490. In certain embodiments, the information may be provided by the load 402 itself. As one example, the load 402 or a sticker attached thereto may include (e.g., have printed thereon) the information, either in plaintext or in an encoded form (e.g., a barcode), and the control system 150 may derive such information via an optical scanner of the sensor array 156. As another example, the load 402 may be provided with a radio frequency identification (RFID) tag having the information encoded thereon, and the control system 150 may derive such information via an RFID reader of the sensor array 156. In certain embodiments, the information may be provided in another manner. As one example, the delivery personnel may upload the information to the control system 150 via an external device 190 (e.g., a mobile device) in communication with the control system 150, such as via the one or more wireless communication devices 158.

With the delivery load 402 loaded onto the UAV 100, the process 400 may continue to the approach procedure 420, which generally involves approaching the delivery zone 490. In certain embodiments, such as those in which the UAV 100 is controlled remotely, the approach procedure 420 may be performed by and/or under the control of a user or external control system, such as the external device 190. In certain embodiments, such as those in which the UAV 100 is partially or wholly autonomous, the approach procedure 420 may be performed by and/or under the control of the control system 150.

The approach procedure 420 includes block 422, which generally involves operating one or more rotors of the UAV to generate lift. In the illustrated form, block 422 involves supplying, by the control system 150, power from the power supply 160 to the rotor motors 127, thereby causing the motors 127 to rotate the propellers 128 to generate the lift. When sufficient lift is generated, the UAV 100 will rise from the ground, loading surface or docking station.

The approach procedure 420 includes block 424, which generally involves navigating the load-carrying UAV to the delivery zone to which the load is to be delivered. In the illustrated form, block 424 generally involves navigating the UAV 100 to the delivery zone 490 to which the load 402 is to be delivered. In certain forms, the navigating may be performed using GPS information, such as GPS information provided by the GPS device 156*c*. During navigation, the control system 150 may operate the outward-facing ranging-and-detection device 154*a* to detect and avoid obstacles in the path of the UAV 100. While certain examples have been provided regarding the navigation of block 424, it is to be appreciated that various other manners of navigating to the delivery zone 490 may occur to those having skill in the art, and may be employed without departing from the spirit of the current disclosure.

The approach procedure 420 may further include block 426, which generally involves hovering above the designated delivery surface. Block 426 may, for example, be performed upon completion of the navigating in block 424, and generally involves hovering at a hover height h100 above the delivery surface 491. In certain embodiments, the hover height h100 may be a predetermined hover height. In certain embodiments, the hover height h100 may not necessarily be predetermined. The hovering of block 426 may, for example, be performed throughout one or more of the following procedures (e.g., the ranging procedure 430, and/or the delivery procedure 450) to maintain a substantially constant hover height h100 during the performance of such procedures.

Upon arriving at the delivery zone 490, the process 400 may continue to the ranging procedure 430, which generally involves providing the control system with information relating to the distance between the UAV and the delivery surface. In the illustrated form, this distance corresponds to the hover height h100, which is the height at which the UAV 100 hovers above the delivery zone 490 in block 426. In the illustrated form, the ranging procedure 430 includes block 432, which generally involves operating the downward-facing ranging-and-detection device 154*b* to determine the hover height h100. In certain embodiments, the process 400 may involve adjusting the altitude of the UAV to reach a predetermined hover height h100. In certain embodiments, such as those in which the UAV 100 is operated to hover at a substantially constant hover height h100, the ranging of block 432 may be performed a single time to determine the substantially constant hover height h100. It is also contemplated that the ranging of block 432 may be performed intermittently, continually, or continuously, for example in embodiments in which the UAV 100 does not necessarily maintain a constant hover height h100.

In certain embodiments, such as those in which the delivery load 402 has been loaded onto a carriage such as the carriage 180, the process 400 may include the release procedure 440, which generally involves releasing the delivery load 402 from the carriage 180. In the illustrated form, the release procedure 440 includes block 442, which generally involves operating the carriage motor 188 to move the second grip 184 outward under the control of the control system 150. As a result of this movement, the receiving space 189 expands, thereby causing the load 402 to drop a distance corresponding to the slack in the line 340. Upon release of the load 402 by the carriage 180, the load 402 is supported by the line 340 such that the line becomes taut. Additionally, the armature 332 moves from its deactuated position to its actuated position, thereby tripping the load sensor 352 and indicating to the control system 150 that the weight of the load 402 is being carried by the line 340.

The process 400 further includes the delivery procedure 450, which may, for example, be performed upon completion of the release procedure 440 (e.g., in embodiments in which the load 402 is mounted in the carriage 180 for transport). For example, performance of the delivery procedure 450 may begin in response to the information from the load sensor 352 indicating that the load 402 has been released from the carriage 180. In embodiments in which the UAV 100 lacks the carriage 180, the delivery procedure 450 may begin based upon one or more alternative criteria, such as a determination that the UAV 100 has reached the delivery zone 490. As described herein, the delivery procedure 450 generally includes providing the load 402 with a controlled rate of descent v402 as the load passes through an upper zone 492 in block 452, accelerating the rate of descent v402 as the load 402 passes through an intermediate zone 494 in block 454, and reducing the rate of descent v402 as the load 402 passes through a lower zone 496 in block 456.

As noted above, the hover height h100 corresponds to the distance between the UAV 100 and the delivery surface 491. This distance may be divided into three zones through which the load 402 descends during the delivery procedure 450: an upper zone 492 in the vicinity of the UAV, a lower zone 496 in the vicinity of the delivery surface 491, and an intermediate zone 494 between the upper zone 492 and the lower zone 496. As noted above, the control system 150 is operable to determine the free length L340 of line 340 that has been doled out, for example based upon the information received from the rotary sensor 354. The control system 150 may further be operable to determine which zone the load 402 currently occupies, for example based upon a comparison of the free length L340 and thresholds corresponding to each zone.

When the load 402 is located in the upper zone 492, the free length L340 is less than a first threshold length, which corresponds to a selected distance for the upper zone 492. When the load is located in the intermediate zone 494, the free length L340 is between the first threshold length and a second threshold length, which corresponds to a difference between the hover height h100 and a selected height for the lower zone 496. When the load 402 is located in the lower zone 496, the free length L340 is greater than the second threshold length and less than a third threshold length, which corresponds to the hover height h100. When the load 402 is positioned on the delivery zone 490, the free length L340 is greater than or equal to the third threshold length. Thus, the zone through which the load 402 is currently passing and/or the presence of the load 402 on the delivery surface 491 can be determined based upon the free length L340 of the line 340, which in turn can be calculated by the control system 150 based upon the information received from the rotary sensor 354.

In certain forms, one or more of the zones 492, 494, 496 may have a predetermined height. By way of non-limiting example, the upper zone 492 may have a height of four feet, the lower zone 496 may have a height of five feet, and the height of the intermediate zone 494 may be defined as the hover height h100 minus the nine feet occupied by the upper zone 492 and the lower zone 496. In this example, if the hover height h100 were set to or measured as forty feet, the first threshold would be set to four feet (the selected height for the upper zone 492), the second threshold would be set to 35 feet (the difference between the hover height h100 and the selected height for the lower zone 496), and the third threshold would be set to forty feet (the hover height h100). It should be appreciated that these examples are illustrative only, and may be selected based upon various criteria and/or parameters.

The delivery procedure 450 includes block 452, which generally involves providing the load 402 with a controlled rate of descent v402 as the load 402 passes through the upper zone 492. In the illustrated form, block 452 involves operating the winch motor 320 to cause or permit the reel 310 to rotate in the line lowering direction at a controlled rate of speed. In certain embodiments, the controlled rate of speed may be a constant rate of speed. In other forms, the controlled rate of speed may be variable. As will be appreciated, controlling the rate of speed at which the reel 310 rotates controls the rate of load descent v402. In certain embodiments, controlling the rate of load descent v402 may involve limiting the rate of load descent v402 to a threshold velocity, such as 10 cm/s. As another example, the threshold velocity may be provided between 5 cm/s and 15 cm/s.

Those skilled in the art will readily recognize that lowering of the load 402 is correlated with the unspooling of the line 340 from the reel 310. It has been found that if the line 340 unspools from the reel 310 too quickly, tangles may develop in the line 340. Thus, in controlling the rate of load descent v402, the risk of developing tangles in the line 340 may be mitigated. In certain embodiments, block 452 may be performed to control the rate of load descent v402 for a predetermined period of time. In certain embodiments, block 452 may be performed to control the rate of descent v402 until the free length L340 reaches the first threshold length, at which point the load 402 is located at the boundary 493 between the upper zone 492 and the intermediate zone 494.

The delivery procedure 450 also includes block 454, which generally involves accelerating the load 402 to increase the rate of load descent v402 as the load 402 passes through the intermediate zone 494. In the illustrated form, block 454 involves operating the winch motor 320 to cause or permit the reel 310 to rotate in the line lowering direction at a greater rate of speed than was permitted in the initial descent stage of block 452, thereby increasing the rate of load descent v402. In certain embodiments, block 454 may involve operating the winch motor 320 to cause or permit the load 402 to descend under essentially free-fall conditions. In certain embodiments, block 452 involves limiting the rate of descent v402 to an initial descent velocity, and block 454 involves limiting the rate of descent v402 to a nominal velocity greater than the initial descent velocity. As should be appreciated, the increased rate of descent v402 provided in block 454 increases the speed of the delivery as compared to if the entire delivery procedure 450 were limited to a lesser velocity. In certain embodiments, block 454 may be performed to control the rate of descent v402 from the time the free length L340 is the first threshold length until the free length L340 reaches the second threshold length, at which point the load 402 is located at a boundary 495 between the intermediate zone 494 and the lower zone 496.

The delivery procedure 450 may also include block 456, which generally involves reducing the rate of load descent v402 as the load 402 passes through the lower zone 496. In the illustrated form, block 456 involves operating the winch motor 320 to cause or permit the reel 310 to rotate in the line lowering direction at a lesser rate of speed than was permitted in the intermediate descent stage of block 454, thereby reducing the rate of descent v402. In certain embodiments, block 454 involves limiting the rate of descent v402 to a nominal descent velocity, and block 454 involves reducing the rate of descent v402 to a landing velocity less than the nominal velocity. In certain embodiments, block 456 may be performed to control the rate of descent v402 from the time the free length L340 is the second threshold length until the free length L340 reaches the third threshold length, at which point the load 402 may be positioned on the delivery surface 491. In reducing the rate of descent v402 as the load 402 passes through the lower zone 496, the UAV 100 provides the load 402 with a softer landing than would be provided if the load 402 were allowed to land at the nominal speed of block 454. This soft landing may aid in reducing damage to the load 402, particularly in situations in which the load 402 is fragile.

Upon completion of the delivery procedure 450, the process 400 may continue to the line retracting procedure 460, which generally involves retracting the line 340. The line retracting procedure 460 may, for example, be performed by the winch mechanism 300 under control of the control system 150.

The line retracting procedure 460 may include block 462, which generally involves detecting delivery of the load 402. When the load 402 reaches the delivery surface 491, the gravity hook 360 may release the load 402 as described above. With the load 402 released, the 2moves to its deactuated position, thereby altering the output of the load sensor 352 such that the load sensor 352 indicates that the load 402 has been delivered. Thus, block 462 may involve detecting the delivery based upon information received from the load sensor 352. It is also contemplated that block 462 may involve inferring that the load has been delivered based upon one or more additional or alternative criteria, such as the free length L340 of the line 340 meeting or exceeding the third threshold length, which may correspond to the hover height h100.

The line retracting procedure 460 includes block 464, which generally involves operating the winch motor 320 to rotate the reel 310 in the line raising direction. In certain embodiments, block 464 may be performed in response to the delivery of the load 402 being detected based upon information received from the load sensor 352 in block 462. In certain embodiments, block 464 may involve operating the winch motor 320 until the free length L340 is zero or nominally zero. In certain embodiments, block 464 may involve operating the winch motor 320 to raise the line 340 at a constant retraction speed. In other forms, the retraction speed may be variable.

In certain circumstances, the process 400 may involve the severing procedure 470, which generally involves detecting a fault condition and severing the line in response to detecting the fault condition. The severing procedure 470 may be performed by the severing device 330 under control of the control system 150.

The severing procedure 470 includes block 472, which generally involves determining a fault condition. In certain embodiments, the fault condition may be determined based at least in part upon a spike in current drawn by the winch motor 320 during the line retracting procedure 460. In certain embodiments, the fault condition may be determined based at least in part upon acceleration or jerking of the UAV 100 during the line retracting procedure 460, which may be sensed by one or more sensors of the sensor array 156. In certain embodiments, the fault condition may be determined based at least in part upon stalling of the retraction of the line 340 during the retraction procedure. Such stalling may, for example, be determined when the winch motor 320 is attempting to retract the line 340 while the reel position sensor 352 indicates that the reel 310 is remaining stationary. In certain embodiments, there may be a time function involved with the detection of the fault condition, such as determining the fault condition only when the jerk or the stalling lasts a predetermined period of time.

The severing procedure 470 further includes block 474, which generally involves transmitting a severing signal in response to determining the fault condition. In the illustrated form, block 474 involves supplying the heating coil 335 of the severing device 330 with an electric current sufficient to cause the heating coil 335 to heat to a temperature sufficient to melt and/or burn through at least a portion of the line 340 that is positioned within the tube 334. In other embodiments, block 474 may involve transmitting a signal operative to cause a mechanical cutting device (e.g., a movable blade) to sever the line 340.

The illustrated severing procedure 470 further includes block 476, which generally involves melting and/or burning the line in response to the severing signal transmitted in block 474. More particularly, the illustrated embodiment of block 476 involves heating the heating coil 335 to a temperature sufficient to melt and/or burn at least a portion of the line 340 that is positioned within the tube 334. It is also contemplated that block 476 may include severing the line 340 in another manner, for example by causing a mechanical severing device (e.g., a movable blade) to sever the line 340.

The process 400 may further include a return procedure 480, which generally involves returning the UAV 100 to a base station. In certain forms, the base station may include the above-described docking station 200. In certain embodiments, the base station may be the same base station at which the UAV 100 was provided with the load 402 in the loading procedure 410, while in other embodiments the base station may be a different base station. In certain embodiments, the base station to which the UAV 100 returns may be a static or stationary base station, such as one located at a residence or a distribution center. In certain embodiments, the base station to which the UAV 100 returns may be a mobile base station, such as a delivery vehicle.

The return procedure 480 includes block 482, which generally involves navigating to the base station. In certain embodiments, the navigating of block 482 may be performed using the GPS chip 156c and based upon a known position of the base station. For example, in embodiments in which the base station is static or stationary, the control system 150 may have coordinates of the base station programmed in memory. In embodiments in which the base station is mobile, the base station may be equipped with a GPS chip and a wireless communication device, and the control system 150 may receive information relating to the current or future position of the base station via the wireless communication device 158. In certain embodiments, the base station may be equipped with one or more beacons (e.g. radio frequency beacons), and the UAV 100 may navigate to the base station using homing signals generated by the one or more beacons. While certain examples have been provided regarding the navigation of block 482, it is to be appreciated that various other manners of navigating to the base station may occur to those having skill in the art, and may be employed without departing from the spirit of the current disclosure.

In the illustrated form, the return procedure 480 further includes block 484, which generally involves lowering the UAV 100 into a nest 210 of a docking station 200 provided at the base station. In certain embodiments, the lowering of block 484 may involve descending into the nest 210 based at least in part upon information received from the landing assistance device 206. For example, the landing assistance device 206 may comprise an electromagnetic beacon (e.g., a radio frequency beacon, an infrared beacon, a visible light beacon, or a beacon using additional or alternative wavelengths), and the control system 150 may control the UAV 100 to descend into the nest 210 using positional information derived from the electromagnetic homing signal issued by the beacon. As another example, the landing assistance device 206 may comprise a barcode that provides the control system 150 with position and/or orientation information, and block 484 may involve lowering the UAV 100 into the nest 210 with its position and/or orientation being controlled based upon the position and/or orientation information provided by the barcode.

During the landing of block 484, the nest 210 may assist the UAV 100 in landing in a predetermined position and/or orientation. Such assistance may be provided at least in part by the landing assistance device 206 as described above. Additionally, the geometry of the nest 210 may itself aid in providing the UAV 100 with the desired position and/or orientation. For example, if the centering of the UAV 100 relative to the nest 210 is off by less than the acceptable margin of error, the sidewall(s) 219 may urge the descending UAV 100 to a centered position as described above. In embodiments in which the docking station 200 includes the charging device 220, the desired position and orientation may be a position and orientation in which a first leg 132 is positioned on the first contact pad 222 and a second leg 132 is positioned on the second contact pad 224. In such forms, the charging device 220 may begin recharging the onboard power supply 160 upon landing of the UAV 100.

While one example of a delivery process 400 has been described and illustrated, it is also contemplated that a delivery process may take other forms. For example, in embodiments that do not include the winch mechanism 300, a delivery process may simply involve mounting the load 402 to the carriage 180 or a similar carriage. In such forms, the delivery procedure 450 may simply involve releasing the load 402 from the carriage 180, such as when the UAV is at a relatively low height above the designated delivery surface 491.

As noted above, the power supply 160 may include plural batteries 162, and may be operable to receive electrical power for recharging via the landing apparatus 130. Additionally or alternatively, one or more of the batteries 162 may be replaced when the charge in the battery 162 has been reduced. An example process that involves replacing one or more of the batteries 162 will now be described with reference to FIG. 17.

Figure 17:
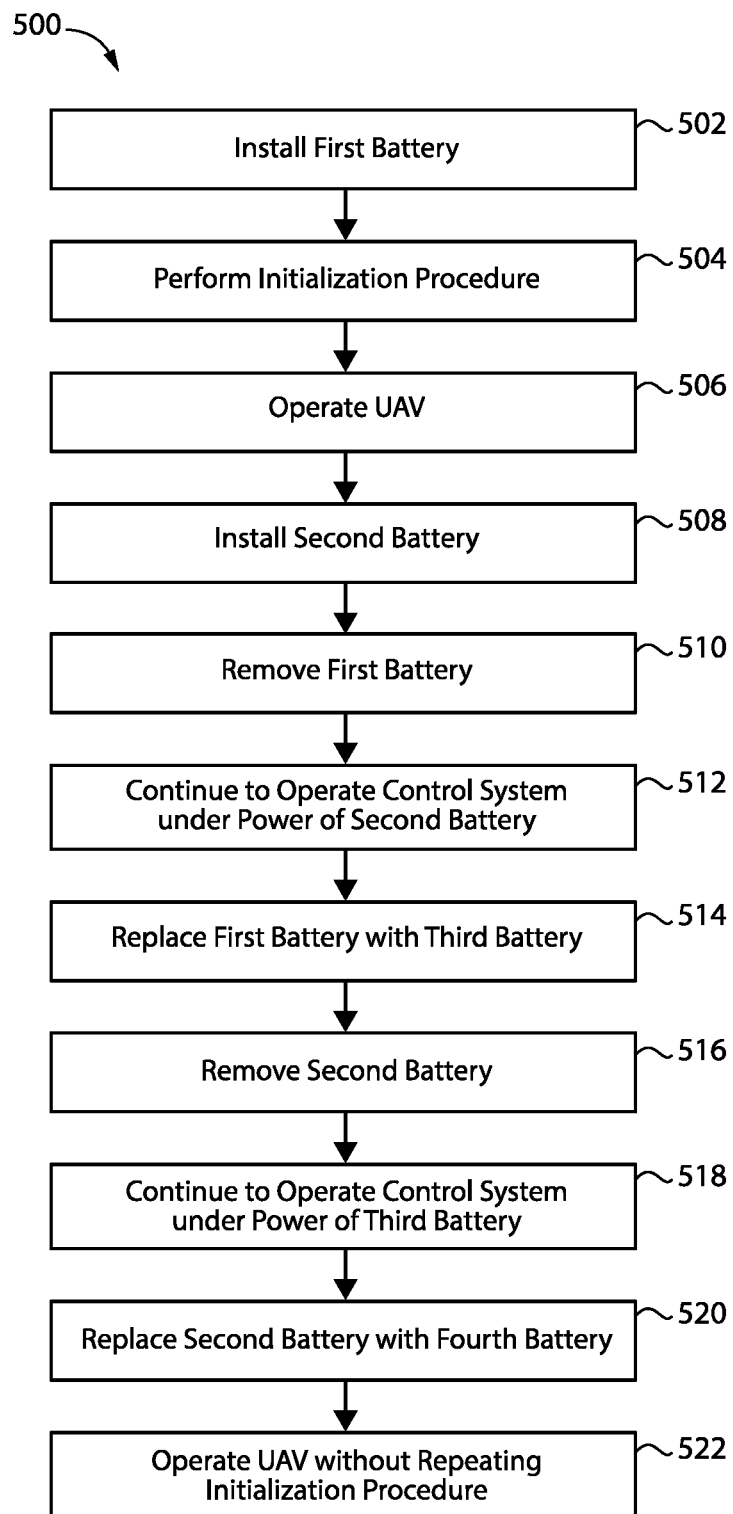
FIG. 17 is a schematic flow diagram of a battery replacement process according to certain embodiments.

With additional reference to FIG. 17, illustrated therein is an exemplary process 500 that may be performed using to replace one or more batteries of a UAV. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another unless specified to the contrary. Moreover, while the process 500 is described with specific reference to the example UAV 100 illustrated in FIG. 1, it is to be appreciated that the process 500 may be performed using a UAV of similar or different configurations.

In certain embodiments, the process 500 may begin with the UAV 100 unpowered and the power supply 160 uninstalled. As described herein, the process 500 generally involves installing a first battery 162a, performing an initialization procedure, installing a second battery 162b, and removing the first battery 162a after installing the second battery 162b. Due to the fact that the first battery 162a is removed only after the second battery is installed, the control system 150 can remain continuously active without the necessity of repeating the initialization procedure.

The process 500 includes block 502, which generally involves installing a first battery 162a to the chassis 110 such that the control system 150 is operable to receive electrical power from the first battery 162a. In the illustrated form, block 502 includes installing the first battery 162a to the first battery compartment 114. As noted above, the first battery compartment 114a is configured to receive sliding insertion of the first battery 162a, and the latch 115 is configured to lockingly engage the first battery 162a upon sliding insertion of the first battery 162a. Thus, block 502 may involve slidingly inserting the first battery 162a into the first battery compartment 114a along an insertion axis 102a (e.g., a horizontal insertion axis), and engaging the latch 115 of the first battery compartment 114a to lock the first battery 162a into the first battery compartment 114a. With the first battery 162a installed, the first battery 162a is electrically connected with the control system 150 such that the control system 150 is operable to receive electrical power from the first battery 162a.

The process 500 also includes block 504, which generally involves performing an initialization procedure to activate the control system 150. The initializing of block 504 may be performed after installing the first battery in block 502, and may be performed using power drawn from the first battery 162a. The initialization procedure performed in block 504 may include one or more operations necessary or desired for the proper operation of the UAV 100. As one example, the initializing of block 504 may include powering up the control system 150 and performing any processes attendant to such powering up. As another example, the initializing procedure of block 504 may include calibrating one or more components of the UAV 100, such as the ranging-and-detecting device(s) 154, the accelerometer, the gyroscope, and/or the magnetometer. In certain embodiments, the initializing of block 504 may involve confirming the status of system communications with the UAV 100 and its ground control station. In certain embodiments, the initializing of block 504 may involve performing one or more built-in-test-equipment checks for system continuity. In certain embodiments, the initialization of block 504 may include checks of battery voltage and/or checks of lighting and auxiliary systems that may be installed.

The process 500 may include block 506, which generally involves operating the UAV 100. Block 506 may be performed following performance of the initialization procedure in block 504, and the initialization procedure performed in block 504 may involve one or more operations necessary or desired for the operating of block 506. The operating of block 506 may be performed while the first battery 162a is installed using power drawn from the first battery 162a, thereby partially depleting the charge stored in the first battery 162a. In certain embodiments, the operating of block 506 may involve delivering a load 402 along the lines set above with reference to the process 400. It is also contemplated that the operating of block 506 may involve additional or alternative procedures. For example, in embodiments in which the auxiliary system 170 comprises a surveillance device 172, block 506 may involve operating the UAV 100 to conduct a surveillance operation.

The process 500 also includes block 508, which generally involves installing a second battery 162b to the chassis 110 such that the control system 150 is operable to receive electrical power from the second battery 162b. In certain embodiments, such as those in which the first battery compartment 114 and the second battery compartment 114 are substantially similar, the installing of block 508 may be substantially similar to the installing of block 502. For example, the installing of block 508 may involve slidingly inserting the second battery 162b into the second battery compartment 114b along an insertion axis 102b (e.g., a horizontal insertion axis), and engaging the latch 115 of the second battery compartment 114b to lock the second battery 162b into the second battery compartment 114b. With the second battery 162b installed to the chassis 110, the control system 150 is operable to receive electrical power from the second battery 162b.

The process 500 also includes block 510, which generally involves removing the first battery 162a. Block 510 may, for example, involve disengaging the latch 115 and slidingly removing the first battery 162a from the first battery compartment 114 along a removal axis. In certain embodiments, the removal axis may be the same as the insertion axis. In other embodiments, the removal axis may be different from the insertion axis. The removal of the first battery 162a in block 510 is performed after installation of the second battery 162b in block 508 such that the control system 150 is operable to remain at least partially active under power supplied by the second battery 162b upon removal of the first battery 162a. In certain embodiments, the control system 150 may remain partially active upon removal of the first battery 162a, for example by entering a sleep mode. In certain embodiments, the control system 150 may remain fully active upon removal of the first battery 162a.

The process 500 also includes block 512, which generally involves continuing to operate the control system 150 under power of the second battery 162b. As noted above, the second battery 162b is installed prior to the removal of the first battery 162a such that the control system 150 is capable of remaining at least partially active upon removal of the first battery 162a, thereby obviating the need for repeating the initialization procedure.

The process 500 may include block 514, which generally involves replacing the first battery 162a with a third battery 162c. Block 514 may, for example, involve installing the third battery 162c to the first battery compartment 114 in a manner substantially similar to that in which the first battery 162a was installed to the first battery compartment 114.

The process 500 may include block 516, which generally involves removing the second battery 162b. The removal of the second battery in block 516 may be performed after installation of the third battery 162c in block 514 such that the control system 150 is operable to remain powered under power supplied by the third battery 162c upon removal of the second battery 162b.

The process 500 may include block 518, which generally involves continuing to operate the control system 150 under power of the third battery 162c while the second battery 162b is removed. As noted above, the third battery 162c is installed prior to the removal of the second battery 162b such that the control system 150 is capable of remaining continuously powered upon removal of the second battery 162b, thereby obviating the need for repeating the initialization procedure.

The process 500 may include block 520, which generally involves replacing the second battery with a fourth battery. Block 520 may, for example, involve installing the fourth battery 162d to the second battery compartment 114 in a manner substantially similar to that in which the second battery 162b was installed to the second battery compartment 114.

The process 500 also includes block 522, which generally involves operating the UAV 100 without repeating the initialization procedure. In certain embodiments, the operating of block 522 may be performed with only the second battery installed (e.g., after block 508 and before block 514). In certain embodiments, the operating of block 522 may be performed with the second battery and the third battery installed (e.g., after block 514 and before block 516). In certain embodiments, the operating of block 522 may be performed with only the third battery installed (e.g., after block 516 and before block 520). In certain embodiments, the operating of block 522 may be performed with the third battery and the fourth battery installed (e.g., after block 520).

As noted above, blocks in the illustrated process 500 may be reordered except where noted to the contrary. As one example, the installation of the second battery in block 508 may be performed between the installation of the first battery in block 502 and the performance of the initialization procedure in block 504. As another example, installation of the second battery in block 508 may be performed between the performance of the initialization procedure in block 504 and the operating of the UAV 100 in block 506. Regardless of the precise order of the blocks, the process 500 may be employed to remove or replace an installed battery while continuously powering the control system 150 such that the UAV 100 can be operated without repeating an initialization procedure that was performed earlier in the continuous operation of the control system 150.

In certain circumstances, the initialization procedure performed in block 504 may be somewhat time-consuming and/or may require technical expertise. However, the process 500 allows for one or more batteries 162 of the UAV to be replaced while continuously operating at least a portion of the control system 150 such that the initialization procedure need not be repeated each time the power supply 160 loses charge. Thus, instead of performing the initialization procedure each time the power supply 160 loses charge, the operator may instead remove one battery 162 while another battery 162 is installed to the UAV 100 such that the control system 150 remains at least partially active, thereby obviating the need to repeat the initialization procedure. In obviating the need for the initialization procedure to be performed each time one or more batteries 162 are replaced, the process 500 may reduce the time and/or technical expertise needed to continue operation of the UAV 100. This may be particularly valuable in situations where the UAV 100 is operated via a mobile base station (e.g., a delivery vehicle), the operator of which may not necessarily have the time and/or expertise to perform the initialization procedure of block 504.

Figure 18:
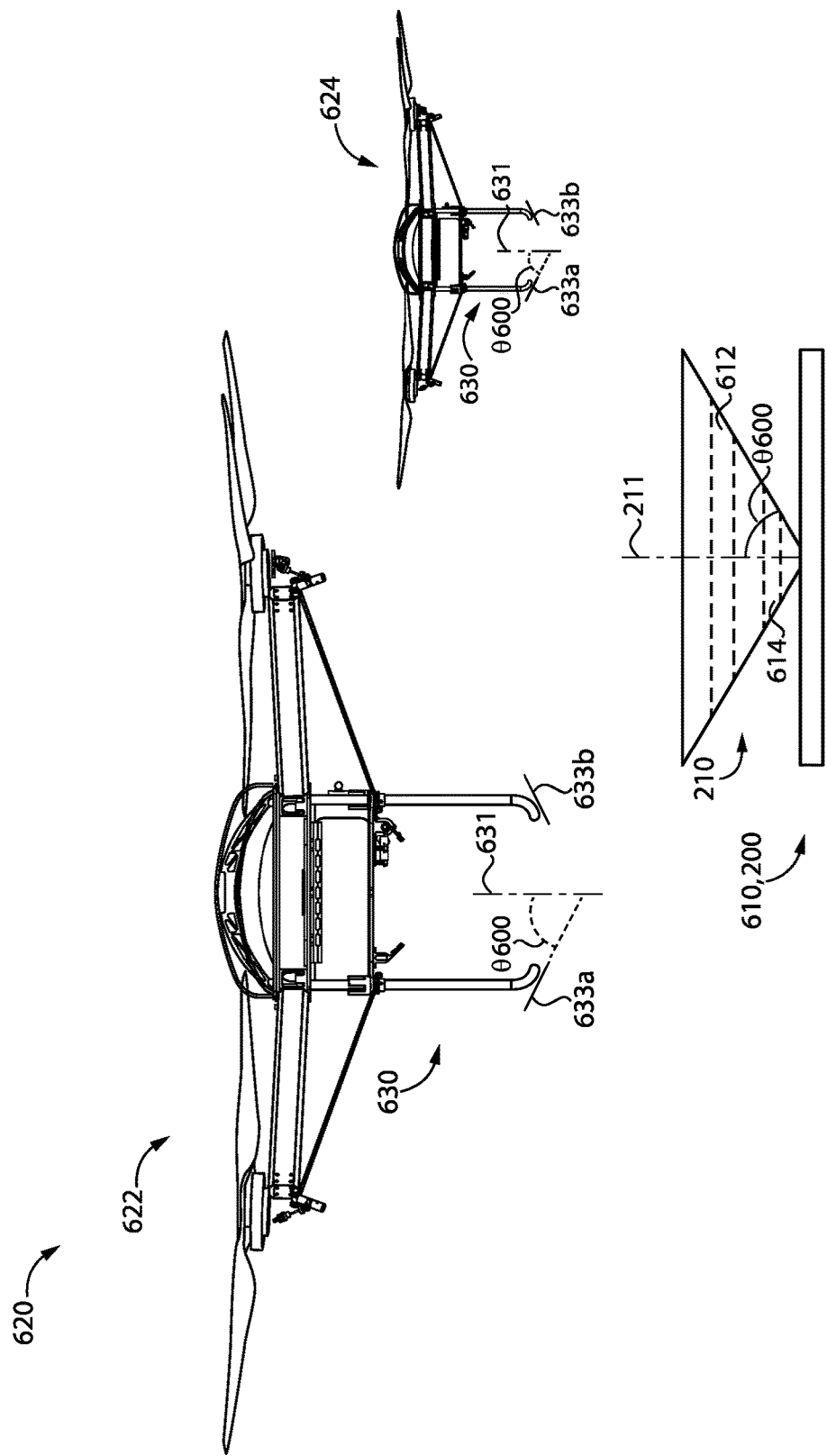
FIG. 18 is a schematic illustration of a product line according to certain embodiments.

With additional reference to FIG. 18, illustrated therein is a product line 600 according to certain embodiments. The product line 600 includes a docking station 610 and a UAV family 620 including a plurality of UAV configurations, each of which includes a landing apparatus 630 according to certain embodiments. As described herein, each member of the UAV family 620 is operable to land in the docking station 610, and the product line 600 has associated therewith a predetermined angle θ600 that defines certain aspects of the product line 600.

In the illustrated form, the docking station 610 is provided in the form of the above-described docking station 200, and includes a nest 210. As noted above, the nest 210 of the docking station 200 illustrated in FIGS. 9-11 is frustoconical, and the sidewall 219 thereof defines an oblique angle θ219 relative to the central axis 211 of the nest 210. In the product line 600, the oblique angle θ219 is defined as the predetermined angle θ600 that is associated with the product line 600.

The UAV family 620 includes a first UAV configuration 622 and a second UAV configuration 624 that is smaller than the first UAV configuration 622. It is also contemplated that the UAV family 620 may include additional UAV configurations, such as one or more UAV configurations larger than the first UAV configuration 622, one or more UAV configurations smaller than the second UAV configuration 624, and/or one or more UAV configurations smaller than the first UAV configuration 622 and larger than the second UAV configuration 624. One or more of the UAV configurations in the UAV family 620 may, for example, be provided along the lines of the UAV 100 described above.

Figure 19:
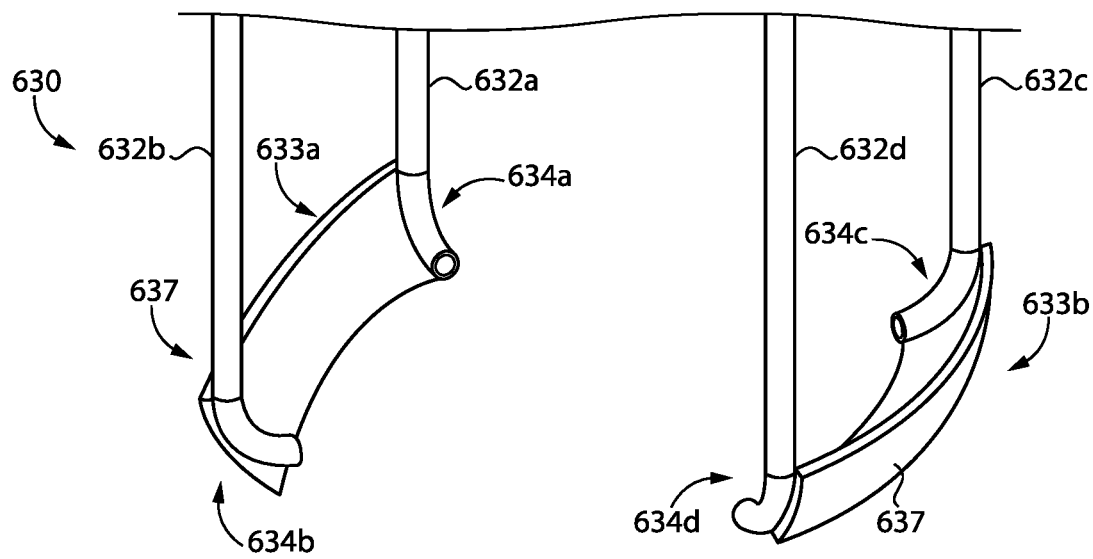
FIG. 19 is a perspective illustration of a landing apparatus according to certain embodiments.
Figure 20:
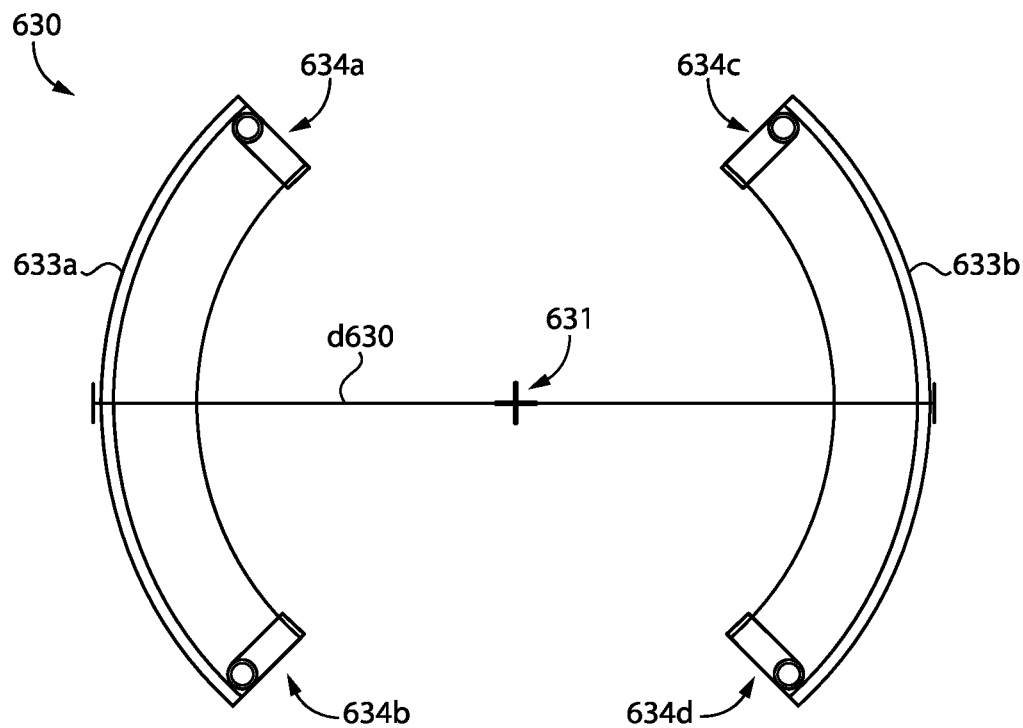
FIG. 20 is a plan view of the landing apparatus illustrated in FIG. 19.

With additional reference to FIGS. 19 and 20, the landing apparatus 630 is substantially similar to the landing apparatus 130, and similar reference characters are used to indicate similar features. For example, the illustrated landing apparatus 630 includes a plurality of legs 632 each having a corresponding foot 634, which respectively correspond to the above-described legs 132 having feet 134. In the illustrated form, the landing apparatus 630 includes four legs 632a-632d, each having a corresponding foot 634a-634d. It is also contemplated that more or fewer legs 632 may be utilized. The landing apparatus 630 further includes at least one shoe 633, and in the illustrated form includes a pair of shoes 633a, 633b. Each shoe 633 is attached to at least one foot 634, and in the illustrated form, each shoe 633 is attached to a corresponding pair of feet 634. More particularly, the first shoe 633a is attached to the first foot 634a and the second foot 634b, and the second shoe 633b is attached to the third foot 634c and the fourth foot 634d.

In the illustrated form, each shoe 633 is provided as a portion of a cone such that the shoes 633 provide the lower end portion of the landing apparatus 630 with a generally frustoconical geometry. Each shoe 633 extends at an oblique angle relative to a central vertical axis 631 of the landing apparatus 630. More particularly, each shoe 633 defines the predetermined angle θ600 relative to the central axis 631. As a result, the generally frustoconical geometry defined by the shoes 633 matches the frustoconical geometry of the nest 210.

While the landing apparatus 630 of the first UAV configuration 622 is substantially similar to the landing apparatus 630 of the second UAV configuration 624, the sizes of the landing apparatuses 630 may be scaled to match the sizes of the UAV configurations 622, 624. More particularly, the effective diameter d630 of the landing apparatus 630 of the larger first UAV configuration 622 may be greater than the effective diameter d630 of the landing apparatus 630 of the smaller second UAV configuration 624. In such forms, while each of the UAV configurations 622, 624 is operable to land in the nest 210 of the docking station 200/610, the landing apparatus 630 of the first UAV configuration 622 will sit higher in the docking station 610 than the landing apparatus 630 of the second UAV configuration 624. More particularly, the shoes 633 of the first UAV configuration 622 will occupy an upper region 612 within the nest 210, and the shoes 633 of the second UAV configuration 624 will occupy a lower region 614 in the nest 210.

As noted above, the docking station 200/610 may include a charging device 220 including first and second contact pads 222, 224. Each contact pad 222, 224 may be positioned at least partially in the upper region 612 such that the charging device 220 is operable to charge a UAV 100 of the first UAV configuration 622 when such a UAV 100 is seated in the nest 210. Additionally or alternatively, each contact pad 222, 224 may be positioned at least partially in the lower region 614 such that the charging device 220 is operable to charge a UAV 100 of the second UAV configuration 624 when such a UAV 100 is seated in the nest 210. In certain embodiments, each contact pad 222, 224 may extend between the upper region 612 and the lower region 614 such that the charging device 220 is operable to charge both UAVs of the first UAV configuration 622 and UAVs of the second UAV configuration 624.

As described above, the outer geometry of the shoes 633 generally conforms to the inner geometry of the nest 210. Those skilled in the art will readily recognize that such general conformity increases the area of contact between the landing apparatus 630 and the nest 210, thereby increasing the stability of a UAV 100 mounted in the docking station 200/610. In addition to providing increased structural stability, this increased area of contact further reduces the electrical resistance at the interface between the landing apparatus 630 and the contact pads 222, 224, thereby facilitating the charging process as described above.

As noted above, the contact pads 222, 224 are electrically isolated from one another, for example by one or more insulating regions 223. As also noted above, the landing assistance device 206 may provide the UAV 100 with position and orientation information that aids the UAV 100 in landing within the nest 210. In order to mitigate the possibility of a short circuit condition, the position and orientation information provided by the landing assistance device 206 may be used by the control system 150 to ensure that the shoes 633 do not cross the insulating regions 223 in a manner that would electrically connect the contact pads 222, 224. For example, the control system 150 may utilize the position and orientation information provided by the landing assistance device 206 to align the gaps between the shoes 633 with the insulating regions 223 such that each shoe 633 rests on a corresponding one of the contact pads 222, 224.

In the illustrated form, the nest 210 is frustoconical, and each shoe 633 is provided as a segment of a cone. It is also contemplated that the shoes 633 may be planar, for example in embodiments in which the nest 210 is defined by a plurality of planar sidewalls 219. Moreover, while each of the illustrated shoes 633 extends between and connects a corresponding pair of the feet 634, it is also contemplated that each shoe 633 may be mounted to a single corresponding and respective foot 634.

As noted above, the UAV 100 may be provided with one or more modular auxiliary systems 170. In implementing the product line 600, each UAV configuration 622, 624 may have a corresponding common platform including those components required for basic flight operations (e.g., the chassis 110, the arms 120, and the control system 150). From this common platform, one or more UAV species can be created by installing to the common platform an appropriate set of landing apparatus 130 and/or auxiliary system(s) 170. For example, a first landing apparatus configuration may include shorter legs, a second landing apparatus configuration may include longer legs, and landing apparatuses of the first and second configurations may be interchangeable such that each landing apparatus configuration is operable to be installed to the common platform for the UAV configuration. In certain embodiments, the landing apparatus configuration with the longer legs may further include additional battery compartments 114 operable to store additional batteries, which may increase the operational time and/or range for the UAV 100.

It should be appreciated that the modularity of the product line 600 need not be limited to the landing apparatus 630. For example, certain species within a particular UAV configuration may include the carriage 180, while the carriage 180 may be omitted from other species. Likewise, certain species within a particular UAV configuration may include the winch mechanism 300, while the winch mechanism 300 may be omitted from other species. Similarly, the surveillance device 172 may be included in some species and excluded from others, and different forms of surveillance device 172 may be provided for different species. For example, the surveillance device 172 of one or more species may include an infrared camera, and the surveillance device 172 of one or more species may include a visible light camera. In certain embodiments, one or more of the auxiliary systems 170 may be configured for mounting to plural UAV configurations. Additionally or alternatively, one or more of the auxiliary systems 170 may be dedicated to a corresponding UAV configuration. For example, the larger UAV configuration 622 may be capable of generating the lift required to carry a relatively heavy auxiliary system (e.g., additional batteries 162), whereas the smaller UAV configuration 624 may be unable to generate the requisite lift.

Figure 21:
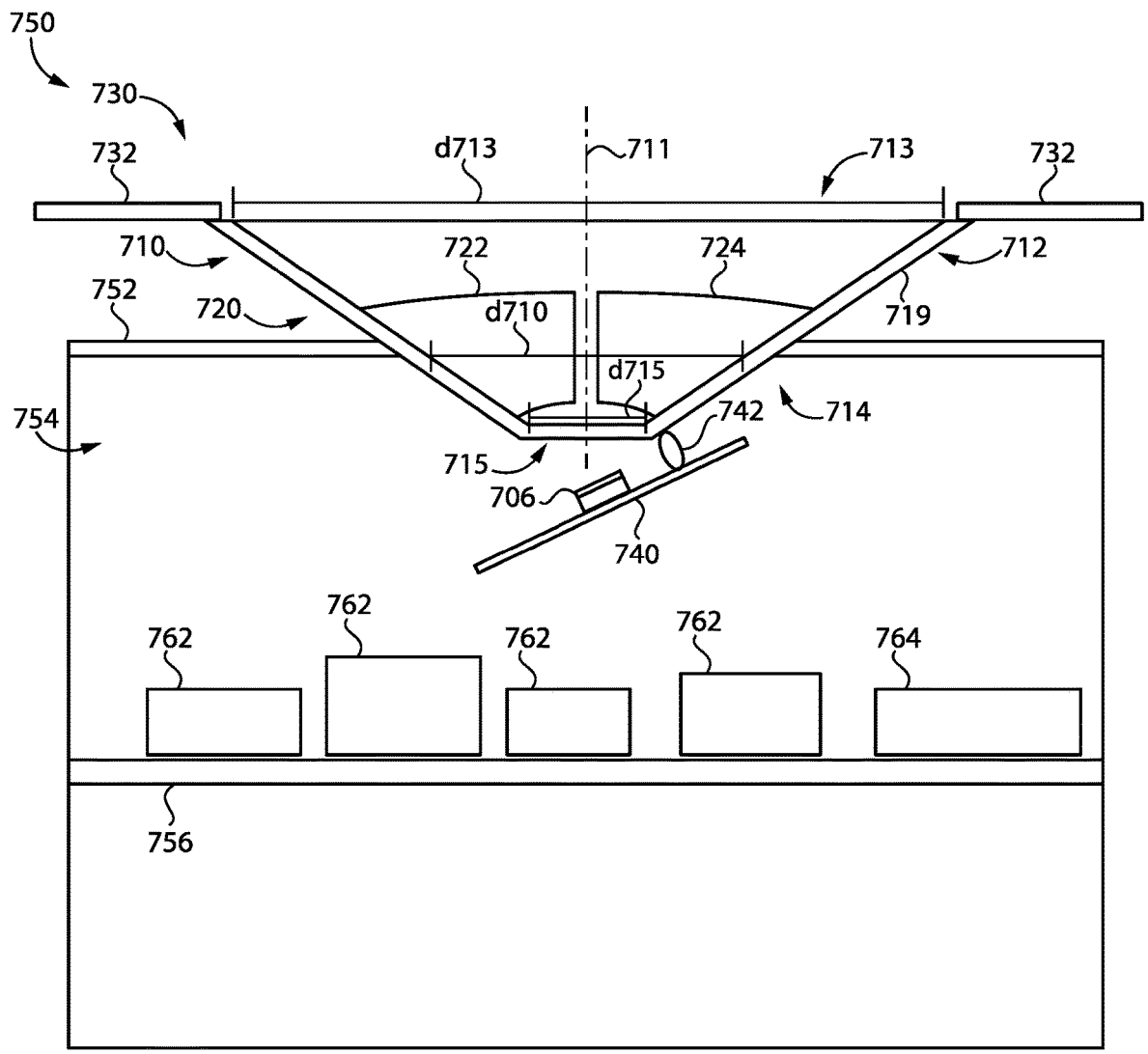
FIG. 21 is a schematic representation of a base station according to certain embodiments, which includes a docking station according to certain embodiments.

With additional reference to FIG. 21, illustrated therein is a docking station 700 according to certain embodiments. The docking station 700 is substantially similar to the above-described docking station 200, and similar reference characters are used to indicate similar elements and features. For example, the docking station 700 includes a nest 710 and may further include a charging device 720, which respectively correspond to the above-described nest 210 and charging device 220. In the interest of conciseness, the following description of the docking station 700 focuses primarily on features that are different from those described above with reference to the docking station 200, such as a cover 730 and a base plate 740.

As with the above-described nest 210, the nest 710 extends along a central axis 711, and includes an upper portion 712 and a lower portion 714. The upper portion 712 defines an upper opening 713 having an upper opening diameter d713 that is greater than the landing apparatus effective diameter d130 such that upper opening 713 is operable to receive the landing apparatus 130. There exists a plane normal to the central axis 711 in which the diameter d710 of the nest 710 is equal to the landing apparatus effective diameter d130 such that the landing apparatus 130 is operable to be supported by the nest 710. Additionally, the lower portion 714 defines a lower opening 715 having a lower opening diameter d715 that is less than the landing apparatus effective diameter d130 such that the landing apparatus 130 is inoperable to pass through the lower opening 715. Thus, when the UAV 100 lands in the nest 710, the underside of the UAV 100 is accessible via the lower opening 715.

In certain embodiments, the docking station 700 may include a charging device 720 corresponding to the above-described charging device 220. Thus, the charging device 720 may include a first contact pad 722 and a second contact pad 724 electrically isolated from the first contact pad 722. In such forms, the docking station 700 may be operable to charge the power supply 160 of the UAV 100 in a manner analogous to that described above. It is also contemplated that the charging device 720 may be omitted from the docking station 700.

In the illustrated form, the docking station 700 further includes a cover 730 operable to cover the upper end of the nest 710 to selectively enclose the upper opening 713. In certain forms, the cover 730 may be moved manually to open and close the nest 710. In certain embodiments, the docking station 700 may include a motor operable to move the cover 730 to open and close the nest 710. The cover 730 may, for example, include one or more movable panels 732. In the illustrated form, the panels 732 are retractable along a plane occupied by the panels 732 when the cover 730 is in its closed position. In other forms, the panel(s) 732 may pivot between the open and closed positions thereof. In certain embodiments, the panel(s) 732 may be rigid. In certain embodiments, the panel(s) 732 may be flexible. For example, the panel(s) 732 may be articulated such that the panels are capable of bending or curving. It is also contemplated that the panel(s) 732 may be replaced or supplemented by other forms of covers, such as a tarp, or that the cover 730 may be omitted.

The docking station 700 may further include a base plate 740 operable to at least partially cover the lower opening 715. In the illustrated form, the base plate 740 is attached to the lower portion 714 of the nest 710 via a hinge 742. It is also contemplated that the base plate 740 may be operable to cover the lower opening 715 by swiveling side to side, or in another manner, such as those described above with reference to the manners in which the cover 730 may be operable to cover the upper opening. While other locations are contemplated, in the illustrated form, the landing assistance device 706 is mounted to the base plate 740 such that the landing assistance device 706 is accessible via the upper opening 713 when the base plate 740 is in its closed position.

As described herein, the docking station 700 may be provided to a base station 750, and may occasionally be exposed to the elements, such as rain and snow. In order to mitigate the adverse effects of these elements and to avoid entry of precipitation into the base station 750, the docking station 700 may be provided with seals, gutters, channels, drains, pumps, and/or tubes that direct the precipitation away from the nest 710. As one example, the base plate 740 may seal with the lower end of the nest 710 when in the closed position, and may define a funnel that leads to a tube to collect precipitation and prevent pooling of precipitation within the nest 710.

Also illustrated in FIG. 21 is a base station 750 including the docking station 700. The base station 750 includes a roof or ceiling 752 to which the docking station 700 is mounted. In the illustrated form, the nest 710 extends through the ceiling 752 such that the upper portion 712 is positioned above the ceiling 752 and the lower portion 714 is positioned below the ceiling 752. In other embodiments, the upper opening 713 may be defined in the ceiling 752, and the nest 710 may extend downward from the ceiling 752 into a loading area 754 that is at least partially covered by the ceiling 752. In further embodiments, the lower opening 715 may be defined in the ceiling 752, and the nest 710 may extend upward from the ceiling 752.

In certain embodiments, the base station 750 may be provided as a static base station. For example, the base station 750 may be a distribution center, a residence, or a place of business. It is also contemplated that the base station 750 may be provided as a mobile base station, such as a delivery vehicle. For example, the loading area 754 may be provided as the trailer or stowage cabin of a delivery vehicle, such as a truck or other land vehicle, a plane or other air vehicle, or a boat or other water vehicle. Additionally, in embodiments in which the docking station 700 includes the charging device 720, the charging device 720 may receive power from a power supply of the base station 750. For example, in embodiments in which the base station 750 is a static structure, the charging device 720 may be connected to the line power that powers the base station. In embodiments in which the base station 750 is mobile, the charging device 720 may receive power from a battery or other power source of the mobile base station.

In certain embodiments, one or more delivery loads 762, 764 may be disposed in the loading area 754, for example on one or more shelves 756. The delivery loads may include first, UAV-deliverable delivery loads 762 and second, non-UAV-deliverable delivery loads 764. As described herein, a process 800 according to certain embodiments involves delivering a UAV-deliverable delivery load 762 from the base station 750 to a corresponding delivery zone using the UAV 100. Each of the UAV-deliverable delivery loads 762 is sized and shaped such that the delivery load 762 is operable to pass through the lower opening 715. Each of the UAV-deliverable delivery loads 762 also has a weight that is less than or equal to the maximum payload weight for the UAV 100. The non-UAV-deliverable delivery loads 764 may have one or more characteristics that render the loads 764 unsuitable for delivery by the UAV 100, such as size, shape, and/or weight.

Figure 22:
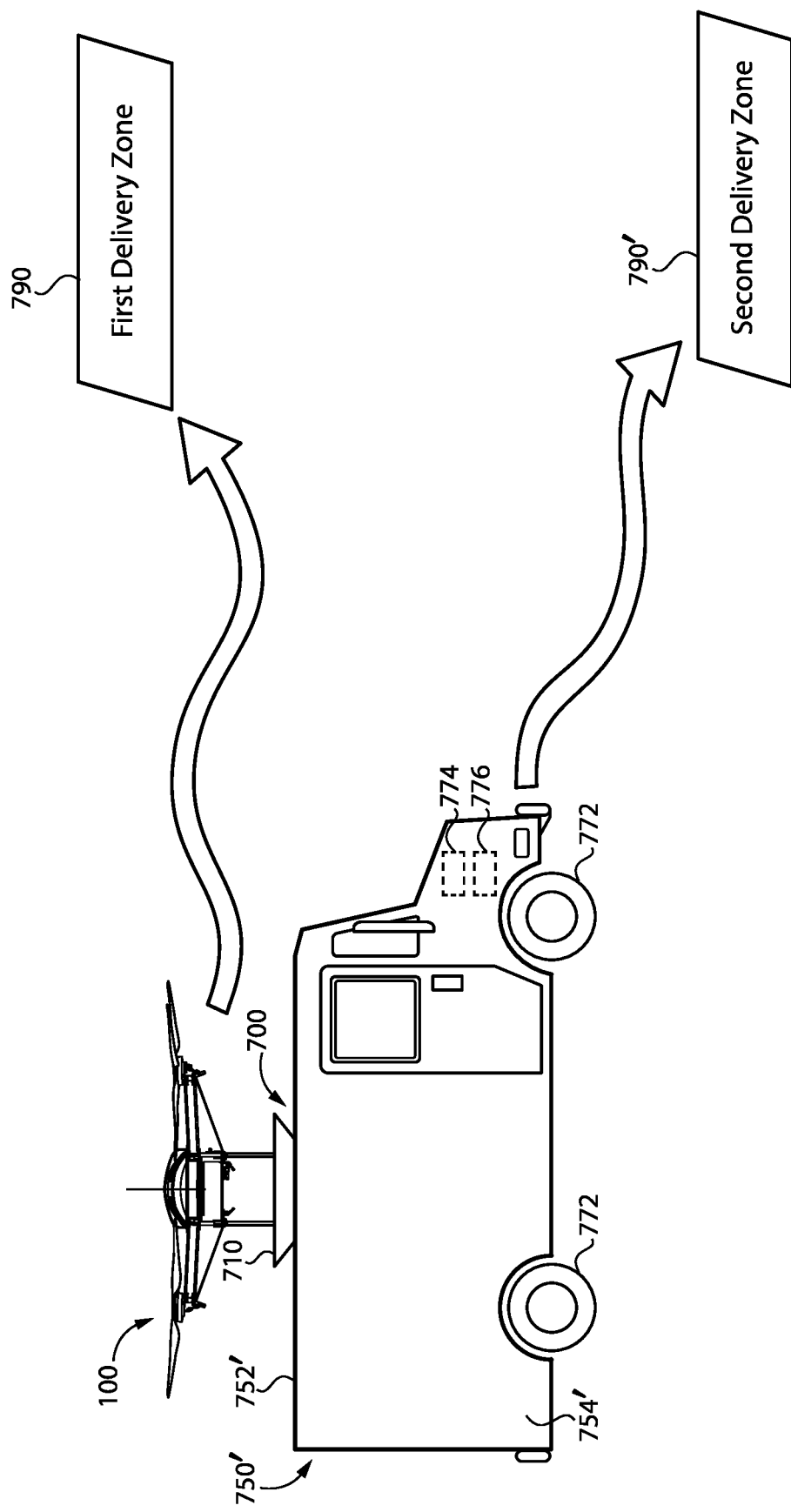
FIG. 22 is a schematic representation of a delivery vehicle according to certain embodiments.

With additional reference to FIG. 22, in certain embodiments, the base station 750 may be provided as a delivery vehicle 750'. While the illustrated delivery vehicle 750' is a land delivery vehicle, it is also contemplated that the delivery vehicle 750' may be provided as an air or water delivery vehicle. Regardless of the form of the delivery vehicle 750', the delivery vehicle 750' may include a stowage compartment 754' that defines the loading area 754. For example, a roof 752' of the delivery vehicle 750' may define the ceiling 752 of the loading area 754, and the stowage compartment 754' may have the loads 762, 764 stored on shelves 756 and/or other support structures therein. As described herein, the delivery vehicle 750' may be utilized to deliver the loads 762, 764 in a process such as the process 800 illustrated in FIG. 23.

As noted above, the illustrated delivery vehicle 750' is a land delivery vehicle. As is typical of land delivery vehicles, the vehicle 750' includes a plurality of wheels 772, a prime mover 774 operable to drive at least one of the wheels 772, and a battery 776 operable to provide electrical power to one or more electrical systems of the vehicle 750'. In certain embodiments, the prime mover 774 may take the form of an engine, such as an internal combustion engine. In certain embodiments, the prime mover 774 may take the form of an electric motor that operates using power stored in the battery 776. In embodiments in which the base station 700 comprises a charging device 720, the charging device 720 may be operable to charge the UAV 100 using electrical power provided by the battery 776.

In the illustrated embodiment, the stowage compartment 754' is permanently coupled to the cab of the vehicle 750'. It is also contemplated that the vehicle 750' may include a cab portion and a trailer removably secured to the cab portion, such as is typically the case with semi-trucks. In such forms, the trailer may define the stowage compartment 754'. Additionally, the prime mover 774 may be operable to rotate the wheels 772 of the cab portion to move the cab portion, thereby rotating the wheels 772 of the trailer as the trailer moves with the cabin portion. In certain embodiments, the land vehicle may simply be provided as a trailer that is not coupled to a cabin at the time of operation.

Figure 23:
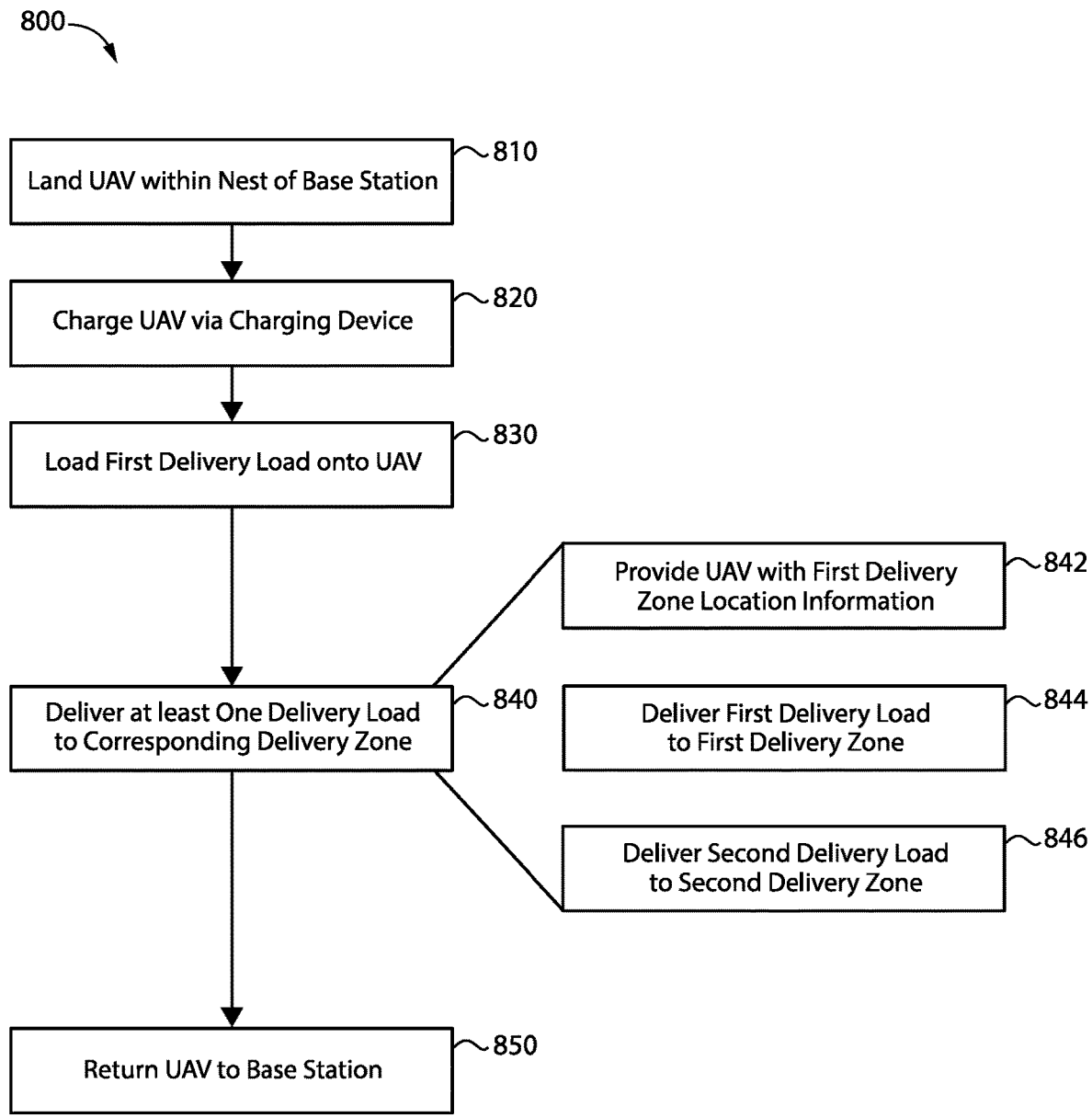
FIG. 23 is a schematic flow diagram of a delivery process according to certain embodiments.

With additional reference to FIG. 23, illustrated therein is a process 800 according to certain embodiments, which may be employed to deliver at least one delivery load to a corresponding destination or delivery zone. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another unless specified to the contrary. Moreover, while the process 800 is described with specific reference to the example UAV 100 illustrated in FIG. 1, it is to be appreciated that the process 800 may be performed using a UAV of similar or different configurations. Additionally, although the process 800 is described in connection with a mobile base station 750 in the form of a delivery vehicle 750', it is also contemplated that certain blocks of the process 800 may be performed in connection with another form of mobile base station and/or a static base station.

The illustrated process 800 generally includes a landing procedure 810, a charging procedure 820, a loading procedure 830, a delivery procedure 840, and a return procedure 850. As described herein, the landing procedure 810 generally involves landing a UAV 100 in a nest 710 of a base station 750, the charging procedure 820 generally involves charging the UAV 100 via a charging device 720, the loading procedure 830 generally involves loading a delivery load 762 onto the UAV 100, the delivery procedure 840 generally involves delivering the load 762 to a destination such as a delivery zone 790, and the return procedure 850 generally involves returning the UAV 100 to the base station 750.

The landing procedure 810 generally involves landing the UAV 100 within a nest 710 of the base station 750. In certain embodiments, such as those in which the UAV 100 is capable of autonomous landing, the landing procedure 810 may be performed by or under control of the control system 150. In certain embodiments, such as those in which the UAV 100 is capable of being controlled remotely, the landing procedure 810 may be performed under control of a remote control system and/or a user.

As noted above, the nest 710 includes an upper opening 713 having an upper opening diameter d713 and a lower opening 715 having a lower opening diameter d715 less than the upper opening diameter d713. Moreover, the upper opening diameter d713 is greater than the landing apparatus effective diameter d130, and the lower opening diameter d715 is less than the landing apparatus effective diameter d130. The landing procedure 810 may, for example, involve landing the UAV 100 in the nest 710 based upon information received from the landing assistance device 706 in a manner analogous to that described above. In certain embodiments, the landing procedure 810 may involve landing the UAV 100 in the nest 710 based upon positional information received from the landing assistance device 706. In certain embodiments, the landing procedure 810 may be performed while the delivery vehicle 750' is still (e.g., parked). It is also contemplated that the landing procedure 810 may be performed while the delivery vehicle 750' is moving.

In certain embodiments, the landing procedure 810 may involve landing the UAV 100 in the nest 710 in a predetermined orientation, for example using orientation information provided by the landing assistance device 706. The predetermined orientation may be one in which at least one leg 132 is in contact with the first contact pad 722 and at least one leg 132 is in contact with the second contact pad 724. In embodiments in which the landing apparatus includes one or more shoes such as the above-described shoes 633, the predetermined orientation may be one in which each shoe is positioned on exactly one contact pad such that a short circuit condition does not occur.

In certain embodiments, the process 800 may include a charging procedure 820, which generally involves charging the UAV 100 via the charging device 720. The charging procedure 820 may, for example, be performed by and/or using the charging device 720. For example, the charging procedure 820 may involve applying a voltage differential to the first contact pad 722 and the second contact pad 724 such that current flows to the power supply 160 via the landing apparatus 130/630 as described above. In certain embodiments, one or more sensors may be utilized to determine when to start the charging (e.g., when the sensors indicate that the UAV 100 has landed in the nest). In certain embodiments, one or more sensors may be utilized to regulate the rate of charge according to the needs of the batteries 162. Such sensors may additionally or alternatively stop the charging and transition to a battery-maintenance function at the appropriate time (e.g., when a voltage sensor indicates that the charge in the batteries 162 has reached full or near-full charge).

The process 800 includes a loading procedure 830, which generally involves loading a UAV-deliverable delivery load 762 to the UAV 100. The loading procedure 830 may, for example, be performed by delivery personnel, such as the operator of the delivery vehicle 750'. As noted above, the delivery vehicle 750' may include a stowage compartment 754' defining the loading area 754. In certain embodiments, the loading procedure 830 may include lowering the line 340 through the lower opening 715 such that the attachment device 360 is positioned within the loading area 754. In such forms, the loading procedure 830 may involve attaching the load 762 to the attachment device 360 and optionally retracting the line 340 to raise the attached load 762. In certain embodiments, the loading procedure 830 may involve passing the load 762 through the lower opening 715 and attaching the load 762 to the attachment device 360 and/or the carriage 180. Further details that may be associated with the loading procedure are provided above with reference to the above-described loading procedure 410.

The process 800 further includes a delivery procedure 840, which generally involves delivering at least one delivery load to a corresponding delivery zone 790. In certain embodiments, such as those in which the UAV 100 is capable of autonomous delivery, the delivery procedure 840 may be performed at least in part by or under control of the control system 150. In certain embodiments, such as those in which the UAV 100 is capable of being controlled remotely, the delivery procedure 840 may be performed under control of a remote control system and/or a user.

In certain embodiments, such as those in which the UAV 100 is operable to autonomously deliver the load 762, the delivery procedure 840 may include block 842. Block 842 generally involves providing the UAV 100 with information related to the location of the delivery zone 790 corresponding to the delivery load 762 that has been loaded to the UAV 100. In certain embodiments, the information may be provided by the load 762 itself. As one example, the load 762 or a sticker attached thereto may include the information, either in plaintext or in an encoded form (e.g., a barcode), and the control system 150 may derive such information via an optical scanner of the sensor array 156. As another example, the load 762 may be provided with a radio frequency identification (RFID) tag having the information encoded thereon, and the control system 150 may derive such information via an RFID reader of the sensor array 156. In certain embodiments, the information may be provided in another manner. As one example, the delivery personnel may upload the information to the control system 150 via an external device 190 (e.g., a mobile device), which may be in communication with the control system 150 via the wireless communication device(s) 158.

The delivery procedure 840 further includes block 844, which generally involves delivering the load 762 to the corresponding delivery zone 790. Block 844 may, for example, involve delivering the load 762 to the corresponding delivery zone 790 in a manner analogous to that described above with reference to the above-described procedures 420, 430, 440, 450, 460 of the process 400. Should the line 340 become tangled, the delivery procedure 840 may further include severing the line 340, for example as described above with reference to the line severing procedure 470 of the process 400.

In certain embodiments, such as those in which the base station 750 is provided as a delivery vehicle 750', the delivery procedure 840 may further include block 846, which generally involves delivering a second delivery load to a second delivery zone 790' remote from the first delivery zone 790. For example, the load delivered in block 846 may be a non-UAV-deliverable load 764. Block 846 may involve navigating the delivery vehicle 750' to the second delivery zone 790' and delivering the second delivery load 764 according to conventional methods. In certain embodiments, such as those in which the delivery of block 844 is performed autonomously or under the control of someone other than the driver of the delivery vehicle 750', the delivery of the second load 764 in block 846 may be performed concurrently with the delivery of the first load 762 in block 844.

The process 800 may further include the return procedure 850, which generally involves returning the UAV 100 to a base station 750. In certain embodiments, the return procedure 850 may involve returning the UAV 100 to the same base station 750 at which the delivery load 762 was loaded onto the UAV 100 (e.g., the delivery vehicle 750'). It is also contemplated that the return procedure 850 may involve returning the UAV 100 to another base station 750. For example, if it is determined that another base station (e.g., another delivery vehicle 750') is closer to the first delivery zone 790 and/or is in need of a UAV 100, the return procedure 850 may involve returning the UAV 100 to such other base station 750. Further details that may be associated with the return procedure 850 are provided above with reference to the return procedure 480 of the above-described process 400. Once the UAV 100 has returned to the base station 750 (e.g., the delivery vehicle 750') in the return procedure 850, the UAV 100 may repeat the landing procedure 810 to begin the process 800 anew.

Figure 24:
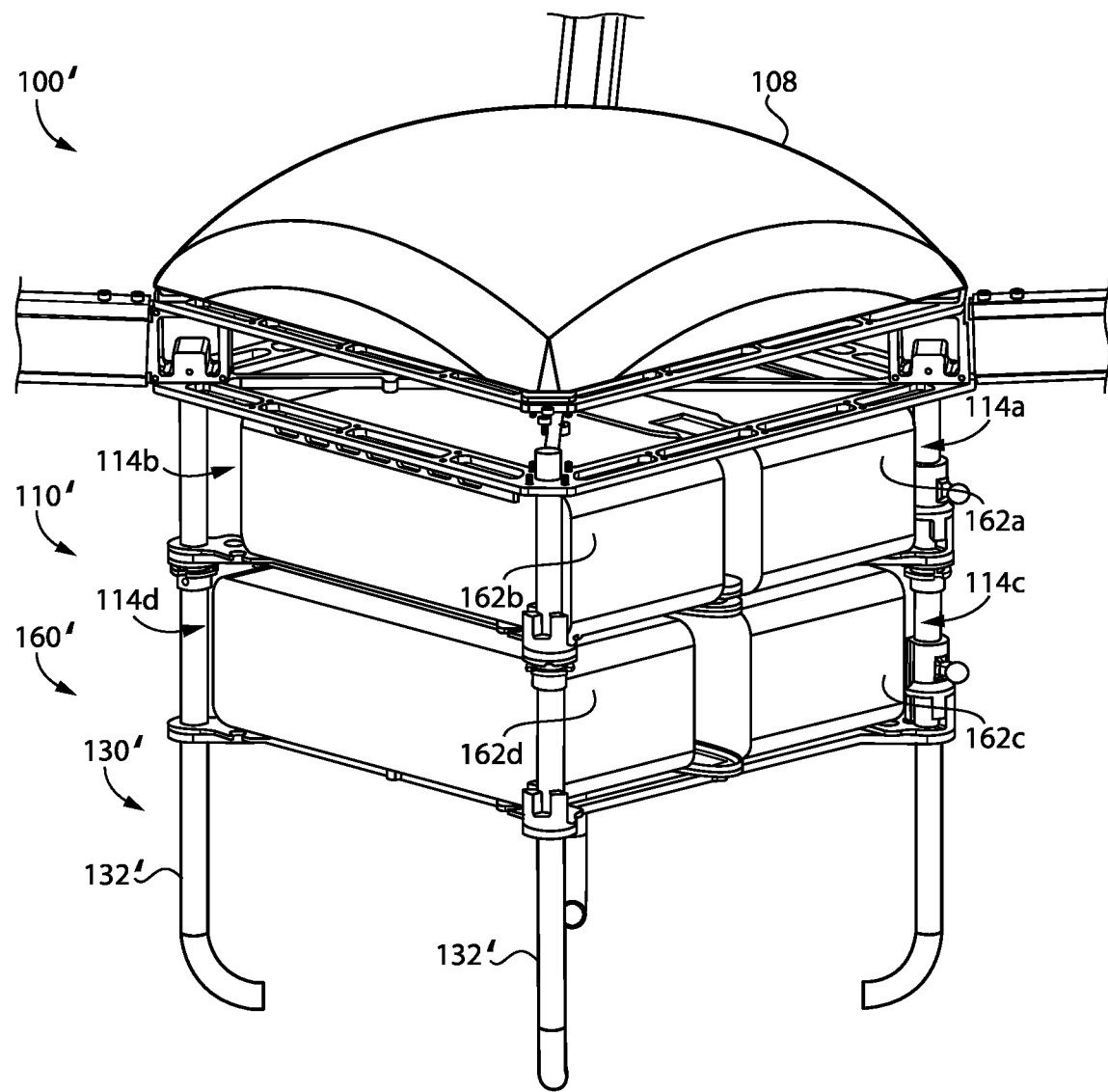
FIG. 24 is a perspective illustration of a UAV according to certain embodiments.

With additional reference to FIG. 24, illustrated therein is a UAV 100' according to certain embodiments, which is a variant of the UAV 100 illustrated in FIGS. 1-8. The UAV 100' is substantially similar to the UAV 100, and includes the arms 120 (one of which is omitted from the illustration for clarity), support structure 140, and control system 150 described above. In the interest of conciseness, the following description of the UAV 100' focuses primarily on features that differ from those described above with reference to the UAV 100. It is to be appreciated, however, that elements and features described with reference to only one of the UAVs 100, 100' may nonetheless be applicable to the other of the UAVs 100, 100'. For example, the UAV 100' includes a cap 108 that, while not specifically illustrated in FIGS. 1-8, may nonetheless be provided to the UAV 100. The cap 108 covers the support structure 140 and the control system 150 to provide at least some degree of protection from the elements.

The illustrated UAV 100' includes a chassis 110', a landing apparatus 130', and a power supply 160', which are respectively provided as variations of the chassis 110, the landing apparatus 130, and the power supply 160. More particularly, the chassis 110' is an extended chassis that includes not only the first and second battery compartments 114a, 114b, but also third and fourth battery compartments 114c, 114d. Likewise, the power supply 160 includes not only the first and second batteries 162a, 162b, but also third and fourth batteries 162c, 162d. The legs 132' of the landing apparatus 130' may be longer than the legs 132 of the above-described landing apparatus 130 in order to accommodate the extended form of the chassis 110' and the additional batteries 162c, 162d.

The control system 150 is connected with the power supply 160' such that the control system 150 is operable to receive power from the batteries 162. The UAV 100' is operational at least when all four batteries 162a-162d are installed, and may further be operable when less than all of the batteries 162 are removed. For example, the UAV 100' may be operable in a first mode when all four batteries 162a-162d are installed, and may be operable in a second mode when only the first and second batteries 162a, 162b are installed. The first mode may be advantageous in situations where a greater flight time is desired, whereas the second mode may be advantageous in situations where greater agility and/or speed are desired.

It should be appreciated that the UAVs 100, 100' may be individual species of a particular UAV configuration within a product line, such as the above-described product line 600. For example, the UAV 100 may be a member of a first species of the first UAV configuration 622, and the UAV 100' may be a member of a second species of the first UAV configuration 622. In certain embodiments, a UAV of one species may be converted to a UAV of another species by substituting one or more modular components. For example, the battery compartments of the chassis may be defined in part by the modular landing apparatus such that the base model UAV 100 can be converted to the extended-range UAV 100' by replacing the landing apparatus 130 with the landing apparatus 130' and providing additional batteries 162c, 162d. Such substitution may, for example, be performed without replacing the base components of the UAV configuration (e.g. the chassis housing 112, the arms 120, the support structure 140, and the control system 150).

Figure 25A:
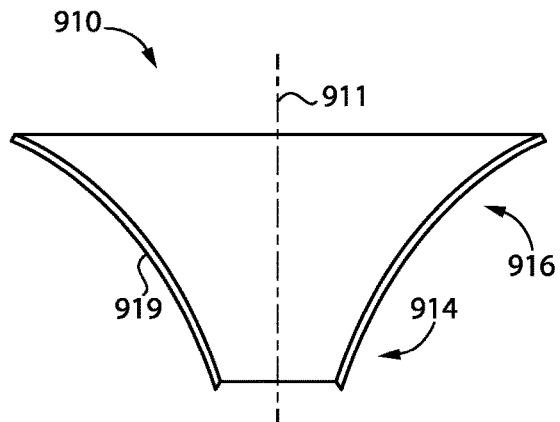
FIGS. 25a-25d are cross-sectional illustrations of nests according to certain embodiments.
Figure 25B:
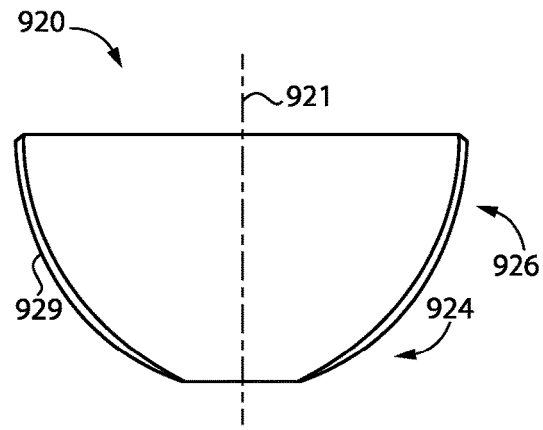

With additional reference to FIGS. 25a-25d, illustrated therein are alternative geometries for a nest, such as the nest 210. As noted above, the outer wall of the nest may be curved within a plane defined in part by the central axis of the nest. As one example, FIG. 25a illustrates a nest 910 including a sidewall 919 that defines a convex curve in a plane including the central axis 911. The convex curve is one in which the slope of the curve is greater in the lower portion 914 than in the upper portion 916. As another example, FIG. 25b illustrates a nest 920 including a sidewall 929 that defines a concave curve in a plane including the central axis 921. The concave curve is one in which the slope of the curve is greater in the upper portion 916 than in the lower portion 914.

Figure 25C:
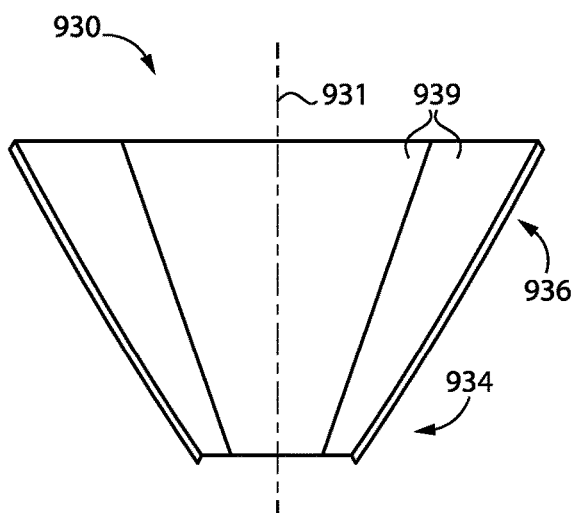
Figure 25D:
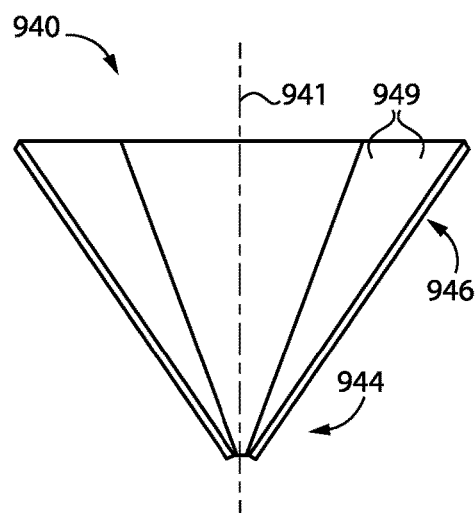

As also noted above, a nest may include a plurality of substantially planar sidewalls. As one example, FIG. 25c illustrates a nest 930 in which a plurality of trapezoidal sidewalls 939 are joined together such that the smaller ends define the lower portion 934 and the larger ends define the upper portion 916. As another example, FIG. 25d illustrates a nest 940 in which a plurality of triangular sidewalls 949 are joined together such that the tips of the triangles define the lower portion 944 and the larger ends define the upper portion 946.

Figure 26:
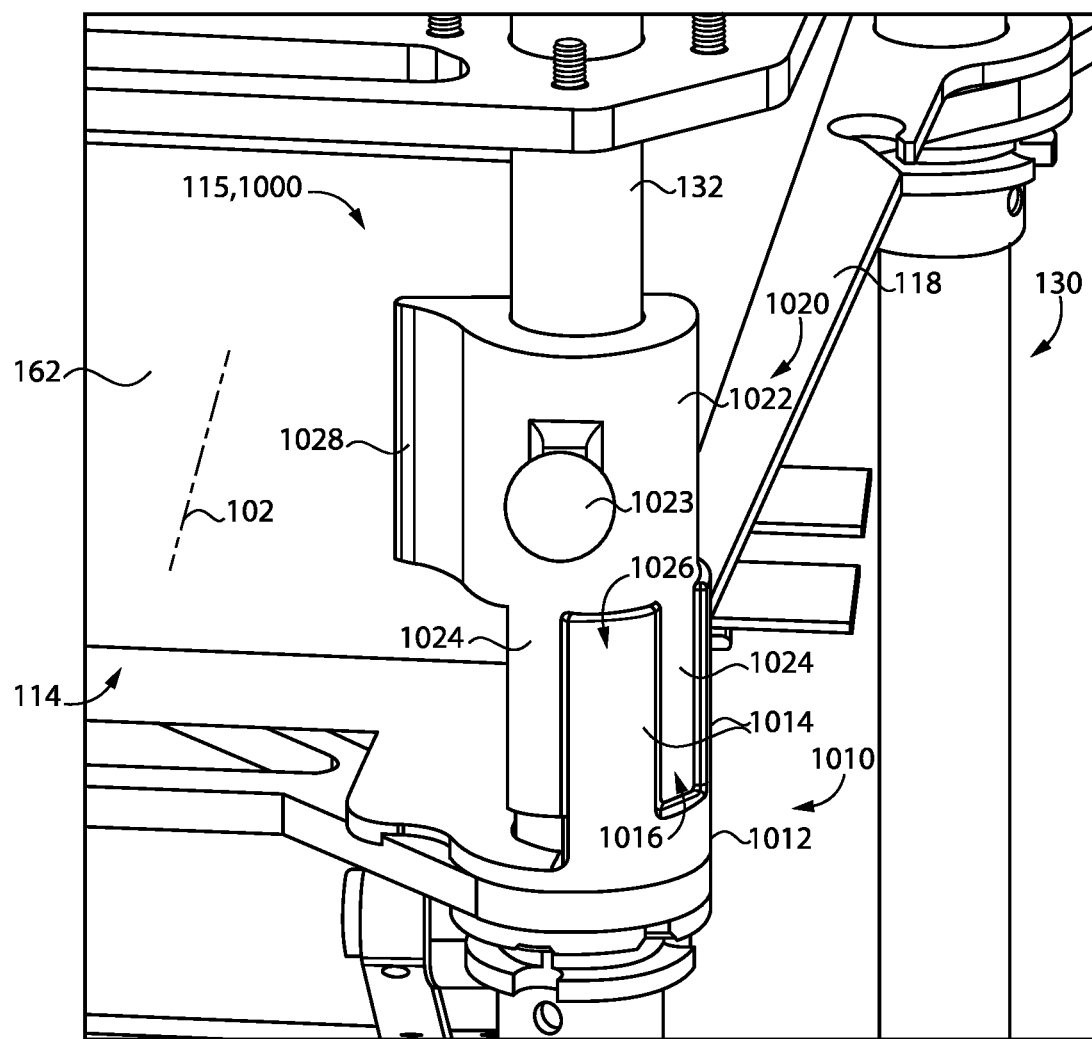
FIG. 26 is a perspective view of a latching mechanism according to certain embodiments.

With additional reference to FIG. 26, illustrated therein is a latch mechanism 1000, which may be utilized as the latch mechanism 115 of the UAV 100. The latch mechanism 1000 generally includes a fixed component 1010 fixedly coupled to a leg 132 of the landing apparatus 130, and a movable component 1020 movably mounted to the leg 132. The fixed component 1010 includes a body portion 1012 and a plurality of vertical splines 1014 extending upward from the body portion 1012 such that one or more channels 1016 are formed between the splines 1014. Similarly, the movable component 1020 includes a body portion 1022 and a plurality of vertical splines 1024 extending downward from the body portion 1022 such that one or more channels 1026 are formed between the splines 1024. Extending radially from the body portion 1022 is a flange 1028, and the body portion 1022 includes a knob 1023 that facilitates manipulation of the movable portion 1022 to move the latch mechanism 1000 between an unlatching state and a latching state.

Figure 27:
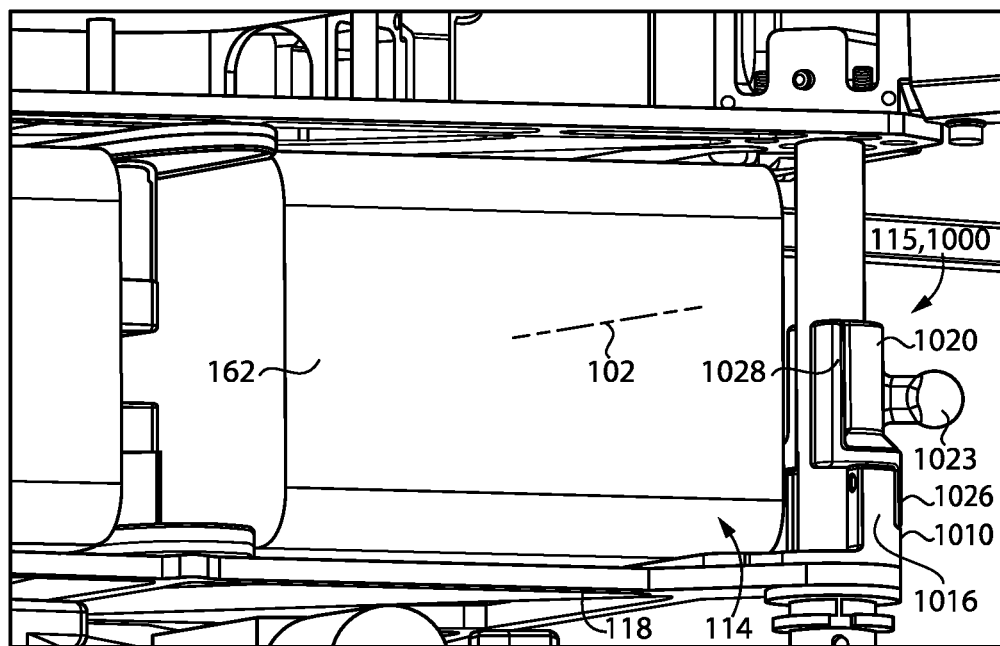
FIG. 27 illustrates the latching mechanism in an unlatching state.

With additional reference to FIG. 27, illustrated therein is the latch mechanism 115, 1000 in its unlatching state. In this state, the movable component 1020 is in its unlatching position, which includes a first rotational position in which the flange 1028 does not project into the insertion/removal path of the corresponding battery 162. As a result, the battery 162 can be inserted into the battery compartment 114 along the horizontal insertion axis 102 without interference from the latch mechanism 115. As the battery 162 is inserted, the rail(s) 117 guide such insertion to restrict lateral movement of the battery 162 until the battery 162 abuts an end wall of the compartment 114.

With the battery 162 inserted, the latch mechanism 115, 1000 may be transitioned from its unlatching state to its latching state by lifting the movable component 1020 along the leg 132 such that the splines 1014, 1024 exit the channels 1016, 1026, for example using the knob 1023. With the splines 1014, 1024 removed from the channels 1016, 1026, the movable component 1020 can be rotated about the leg 132 to a second rotational position in which at least one of the splines 1014, 1024 is aligned with a different one of the channels 1016, 1026. The movable component 1020 may then be lowered to cause the one or more splines 1014, 1024 to place the movable component 1020 in its latching position, thereby placing the latch mechanism 115, 1000 in its latching state and securing the battery 162 within the compartment 114.

Figure 28:
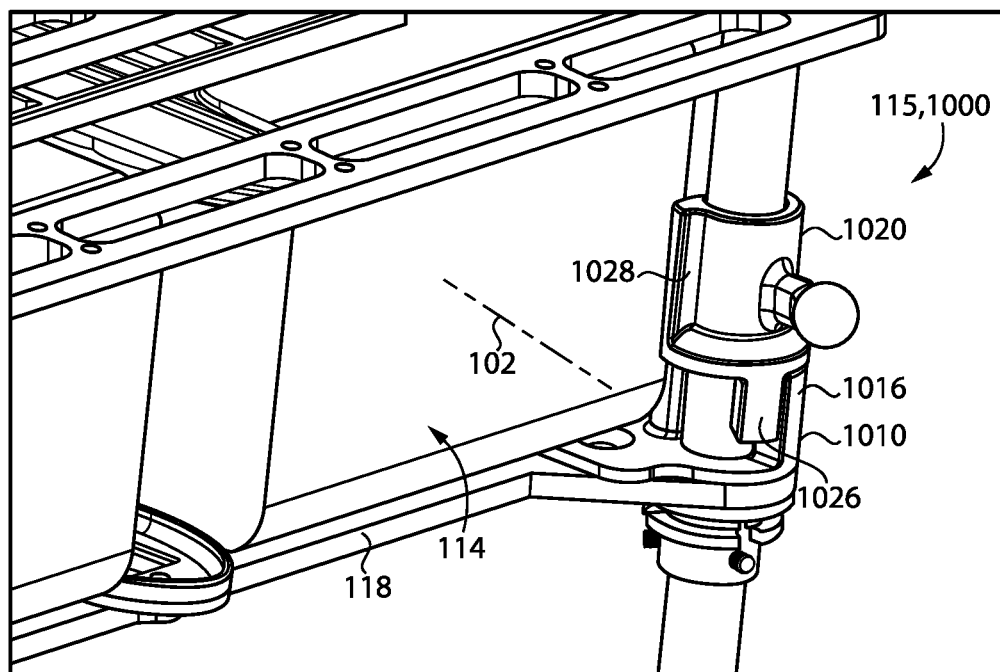
FIG. 28 illustrates the latching mechanism in a latching state.

With additional reference to FIG. 28, illustrated therein is the latch mechanism 115, 1000 in its latching state. In this state, the movable component 1020 is in its latching position, which is rotationally offset from the unlatching position. With the movable component 1020 in its latching position, the flange 1028 projects into the insertion/removal path of the corresponding battery 162. As such, an attempt to remove the battery 162 along the insertion axis 102 will cause the battery 162 to engage the flange 1028, thereby urging the movable component 1020 to rotate toward its unlatching position. However, such rotation of the movable component 1020 is prevented by engagement of the fixed component splines 1014 with the movable component splines 1024. More particularly, a spline of one of the components is received in a channel of the other component such that rotation of the movable component 1020 is prevented. As a result, the latch mechanism 115, 1000 in its latching state selectively retains the battery 162 within the corresponding compartment 114.

In order to permit removal of the battery 162, the latch mechanism 115, 1000 may be transitioned from its latching state to its unlatching state by reversing the latching process. More particularly, the movable component 1020 may be lifted along the leg 132 such that the splines 1014, 1024 exit the channels 1016, 1026, for example using the knob 1023. With the splines 1014, 1024 removed from the channels 1016, 1026, the movable component 1020 can be rotated about the leg 132 to its first rotational position, in which at least one of the splines 1014, 1024 is again aligned with one of the channels 1016, 1026. The movable component 1020 may then be lowered to cause the one or more splines 1014, 1024 to place the movable component in its unlatching position, thereby placing the latch mechanism 115, 1000 in its unlatching state and permitting removal of the battery 162 from the battery compartment 114.

Figure 29:
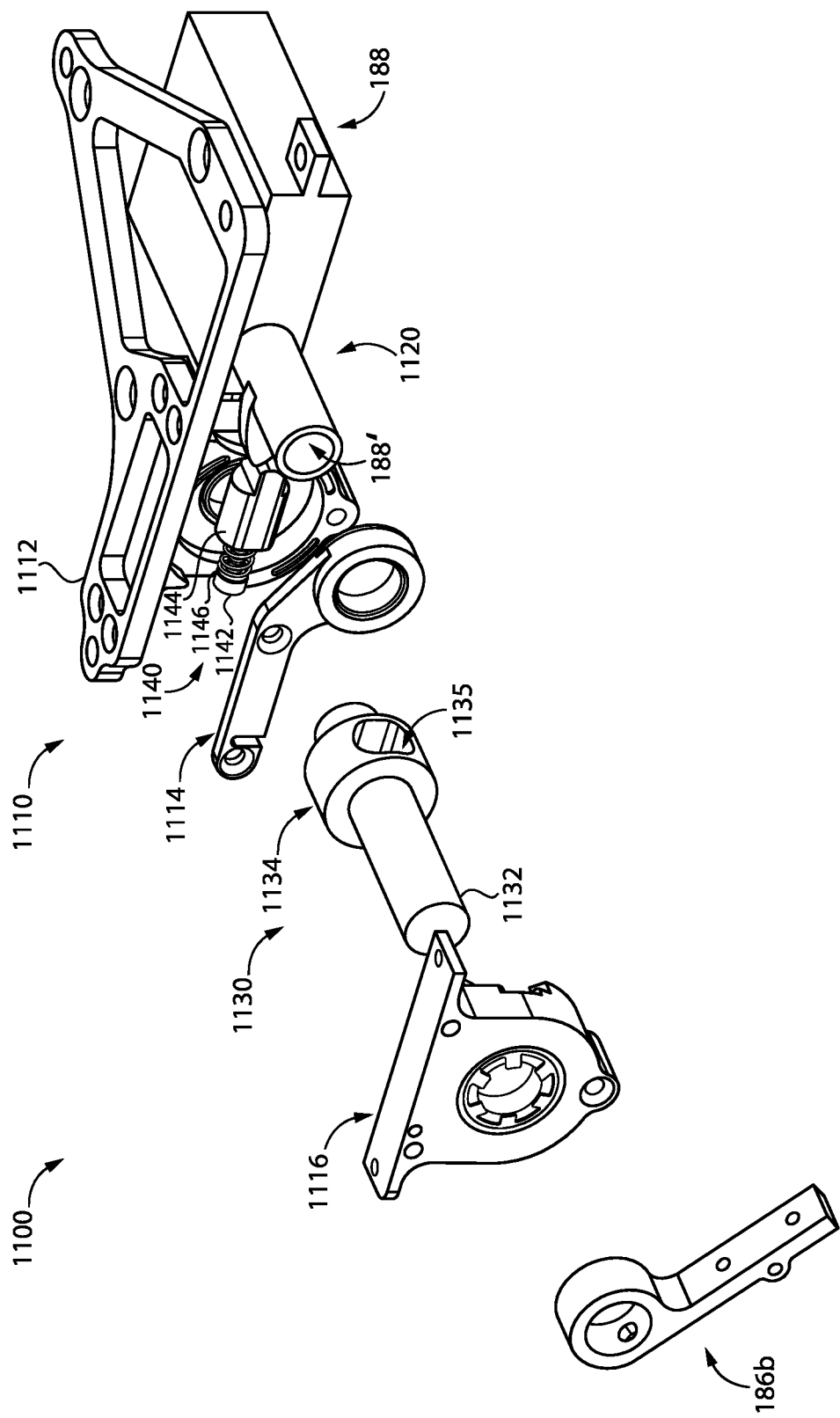
FIG. 29 is an exploded assembly view of a carriage lock mechanism according to certain embodiments.
Figure 30:
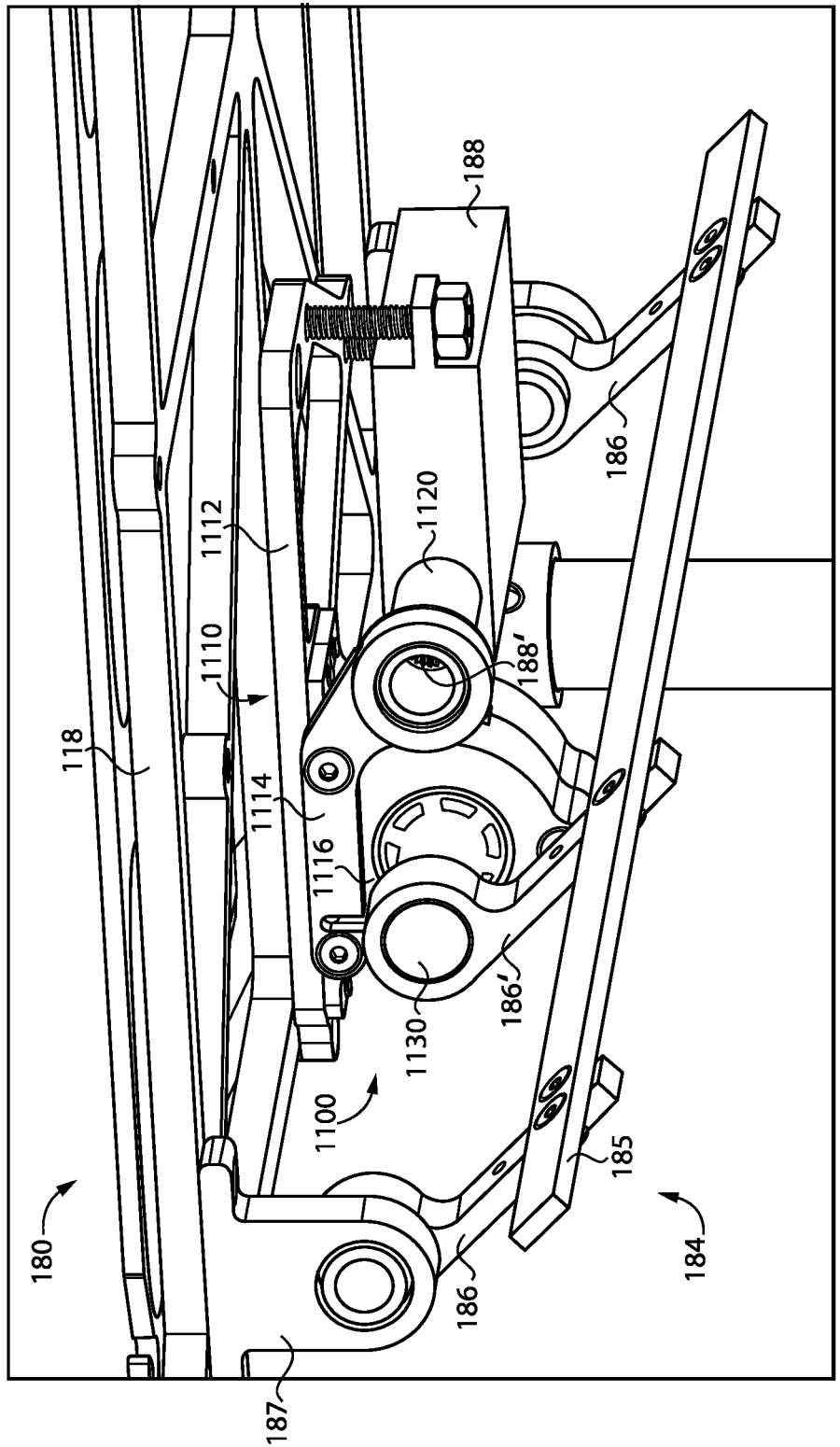
FIG. 30 is a perspective illustration of the carriage lock mechanism installed to the carriage of FIG. 8.

With additional reference to FIG. 29-32, illustrated therein is a carriage lock mechanism 1100 according to certain embodiments. Also illustrated in FIG. 29 are certain other portions of the carriage 180, including the retention arm 186' and the motor 188. The carriage lock mechanism 1100 generally includes a housing assembly 1110 to which the motor 188 is mounted, a cam shaft 1120 engaged with the motor 188 such that the motor 188 is operable to rotate the cam shaft 1120, a locking shaft 1130 rotationally coupled with the retention arm 186', and a latch device 1140 operable to selectively prevent rotation of the locking shaft 1130 and the retention arm 186'.

The housing assembly 1110 generally includes a mounting bracket 1112 mounted to underside of the chassis floor 118 and to which the motor 188 is mounted, a cam shaft support bracket 1114 secured to the mounting bracket 1112 and rotatably supporting the cam shaft 1120, and a locking shaft support bracket 1116 secured to the mounting bracket 1112 and rotatably supporting the locking shaft 1130. The mounting bracket 1112 and the output shaft support bracket 1116 cooperate to define a chamber 1118 in which the latch device 1140 is seated.

The cam shaft 1120 is engaged with the motor 188 such that rotation of the motor shaft 188' causes a corresponding rotation of the cam shaft 1120. In the illustrated form, the cam shaft 1120 is rotationally coupled with the motor shaft 188'. In other embodiments, the cam shaft 1120 may be indirectly engaged with the motor shaft 188', for example via one or more gears. The illustrated cam shaft 1120 includes a generally tubular portion 1122 that matingly engages the motor shaft 188', and an eccentric lobe 1124 projecting from the tubular portion 1122. As described herein, the motor 188 is operable to rotate the cam shaft 1120 between a locking position and an unlocking position to transition the latch device 1140 between a blocking state and an unblocking state.

The locking shaft 1130 is rotatably supported by the housing assembly 1110 and is rotationally coupled with the retention arm 186'. More particularly, a first end portion 1132 of the locking shaft 1130 is rotationally coupled with the retention arm 186', and an opposite second end portion 1134 of the locking shaft 1130 is received in the chamber 1118. Additionally, the second end portion 1134 defines a cavity 1135 in which the latch device 1140 is at least partially seated.

The latch device 1140 is seated in the chamber 1118, and generally includes a mounting post 1142, a latchbolt 1144 movably mounted to the mounting post 1142 for movement between a projected position and a depressed position, and a biasing member 1146 biasing the latchbolt 1144 toward the projected position. In the illustrated form, the biasing member 1146 is provided in the form of a compression spring. It is also contemplated that the biasing member 1146 may be provided in another form, such as that of an extension spring, a torsion spring, a leaf spring, an elastic member, a magnetic biasing member, or another form of biasing member.

Figure 31:
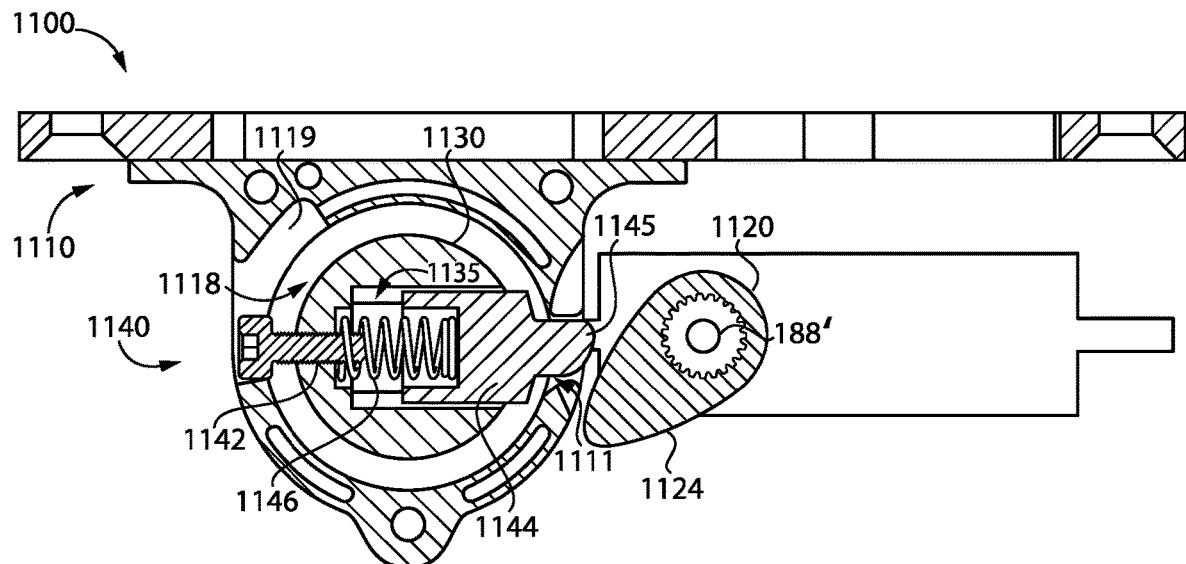
FIG. 31 is a cutaway view of the carriage lock mechanism in a locking or capturing state.

FIG. 31 illustrates the carriage lock mechanism 1100 in its latching state, in which the carriage lock mechanism 1100 holds the second grip 184 in its capturing position. In this state, the cam shaft 1120 is in its locking position, in which the lobe 1124 is disengaged from the latchbolt 1144 such that the biasing member 1146 biases the latchbolt 1144 to its extended or locking position. With the latchbolt 1144 in the projected position, a nose 1145 of the latchbolt 1144 projects through an opening 1111 that is open to the chamber 1118. As a result, the extended latchbolt 1144 prevents rotation of the locking shaft 1130 and the retention arm 186' coupled thereto, thereby preventing pivoting of the second grip 184 from its capturing position.

The carriage lock mechanism 1100 can be transitioned from its latching state (FIG. 31) to its unlatching state (FIG. 32) by rotating the cam shaft 1120 from its locking position to its unlocking position. For example, the control system 150 may operate the motor 188 to rotate the motor shaft 188' through an angle sufficient to cause the cam shaft 1120 to rotate from its locking position to its unlocking position. As the cam shaft 1120 rotates from the locking position to the unlocking position, the lobe 1124 engages the nose 1145 of the latchbolt 1144, thereby driving the latchbolt 1144 to its depressed position against the force of the biasing member 1146 urging the latchbolt 1144 toward its projected position.

Figure 32:
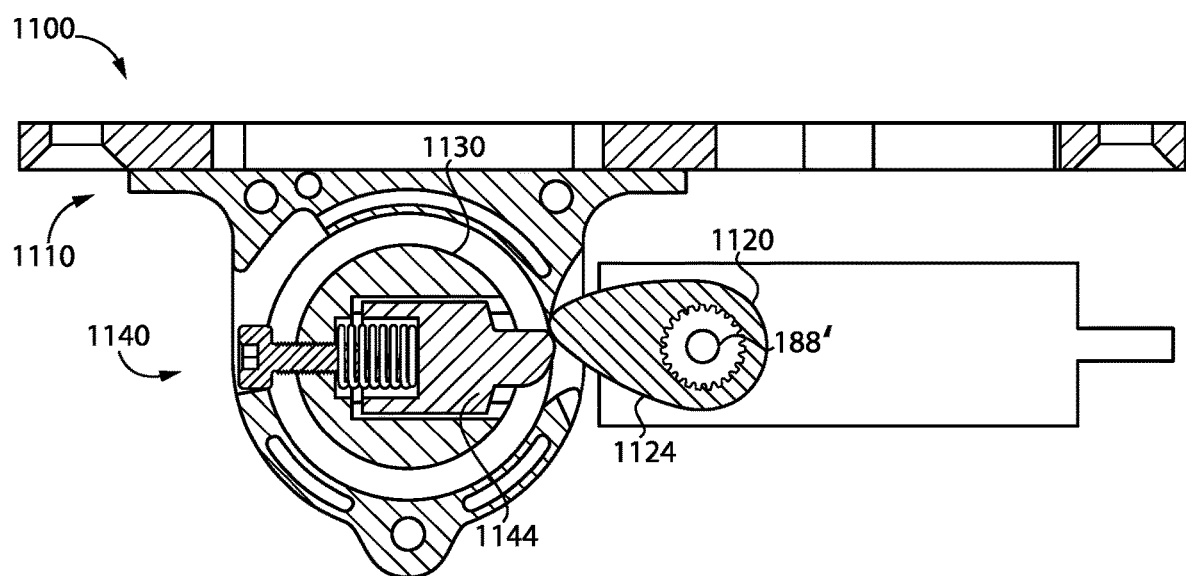
FIG. 32 is a cutaway view of the carriage lock mechanism in an unlocking or releasing state.

With additional reference to FIG. 32, illustrated therein is the carriage lock mechanism 1100 in its unlatching state, in which the carriage lock mechanism 1100 permits pivoting of the second grip 184 from its capturing position to its releasing position. In this state, the cam shaft 1120 is in its unlocking position, in which the lobe 1124 has driven the latchbolt 1144 to its depressed position as described above. With the latchbolt 1144 retracted, the locking shaft 1130 and the retention arm 186' are operable to rotate from the home positions thereof, thereby permitting pivoting of the second grip 184 from its capturing position. For example, in the event that the carriage 180 is loaded, the weight of the load may urge the second grip 184 toward its releasing position such that the load is operable to drop from the carriage 180.

As the second grip 184 pivots to its releasing position, the radially outer end of the mounting post 1142 (which in the illustrated form is provided in the form of a threaded fastener) travels along an arcuate channel 1119 connected with the chamber 1118. When the mounting post 1142 reaches the end of the channel 1119, the end wall of the channel 1119 engages the mounting post 1142 and limits the rotational movement of the locking shaft 1130, thereby limiting the pivoting of the second grip 184.

As noted above, when the carriage lock mechanism 1100 is in its locking state (FIG. 31), the latchbolt 1144 is in its projected position, in which the nose 1145 extends through the opening 1111. As a result, the weight of the load being held by the second grip 184 is borne by the locking shaft 1130, the housing assembly 1110, and the latch device 1140 that interferes with rotation of the locking shaft 1130 relative to the housing assembly 1110. Notably, no rotational forces are exerted on the motor shaft 188'. As a result, the motor 188 need not be supplied with power to resist the rotation of the second grip 184. The weight of the package can thus be borne by the carriage 180 entirely mechanically without the requirement of power being supplied to the motor 188.

In the illustrated form, the carriage lock mechanism 1100 bears the weight of the load exerted on the second grip 184 mechanically, and does not require the motor 188 to be powered for the reasons described above. It is also contemplated that the carriage 180 may not necessarily include the carriage lock mechanism 1100. For example, the motor shaft 188' may be directly coupled with the retention arm 186' or indirectly engaged with the retention arm 186', for example via one or more gears. In such forms, the motor 188 may resist rotation of the retention arm. However, the motor 188 may need to be supplied with power in order to resist such rotation. As such, it may be preferable to include a carriage lock mechanism that mechanically bears the weight of the load, such as the carriage lock mechanism 1100.

As noted above, the carriage 180 may be loaded with a delivery load, for example as described above with reference to block 414. Such loading of the carriage 180 may begin with the second grip 184 in its releasing position and the cam shaft 1120 in its locking position, and the user may insert the load into the carriage 180 such that the load is at least partially supported by the first grip 181. The second grip 184 may then be pivoted (e.g., by the user and/or by a biasing mechanism of the carriage) to its capturing position such that the load is captured by the grips 181, 184. As the second grip 184 pivots to its capturing position, the locking shaft 1130 and the latch device 1140 rotate to the home positions thereof, at which point the biasing member 1146 drives the latchbolt 1144 to its projected position such that the nose 1145 projects through the opening 1111. At this point, the carriage lock mechanism is in the locking state illustrated in FIG. 31, where it will remain until the motor 188 is actuated by the control system 150 to rotate the cam shaft 1120 to its unlocking position.

In the illustrated form, the driver of the carriage 180 is provided in the form of a motor 188, and more particularly as a rotary motor that rotates the motor shaft 188' between a capturing position corresponding to the locking position of the cam shaft 1120 and a releasing position corresponding to the unlocking position of the cam shaft 1120 such that the cam shaft 1120 rotates to transition the latch device 1140 between its latching state and its unlatching state. It is also contemplated that the driver of the carriage 180 may be provided in another form. For example, the driver may be provided in the form of a solenoid or linear motor that linearly drives a driver shaft to selectively depress the latchbolt 1144.

Figure 33:
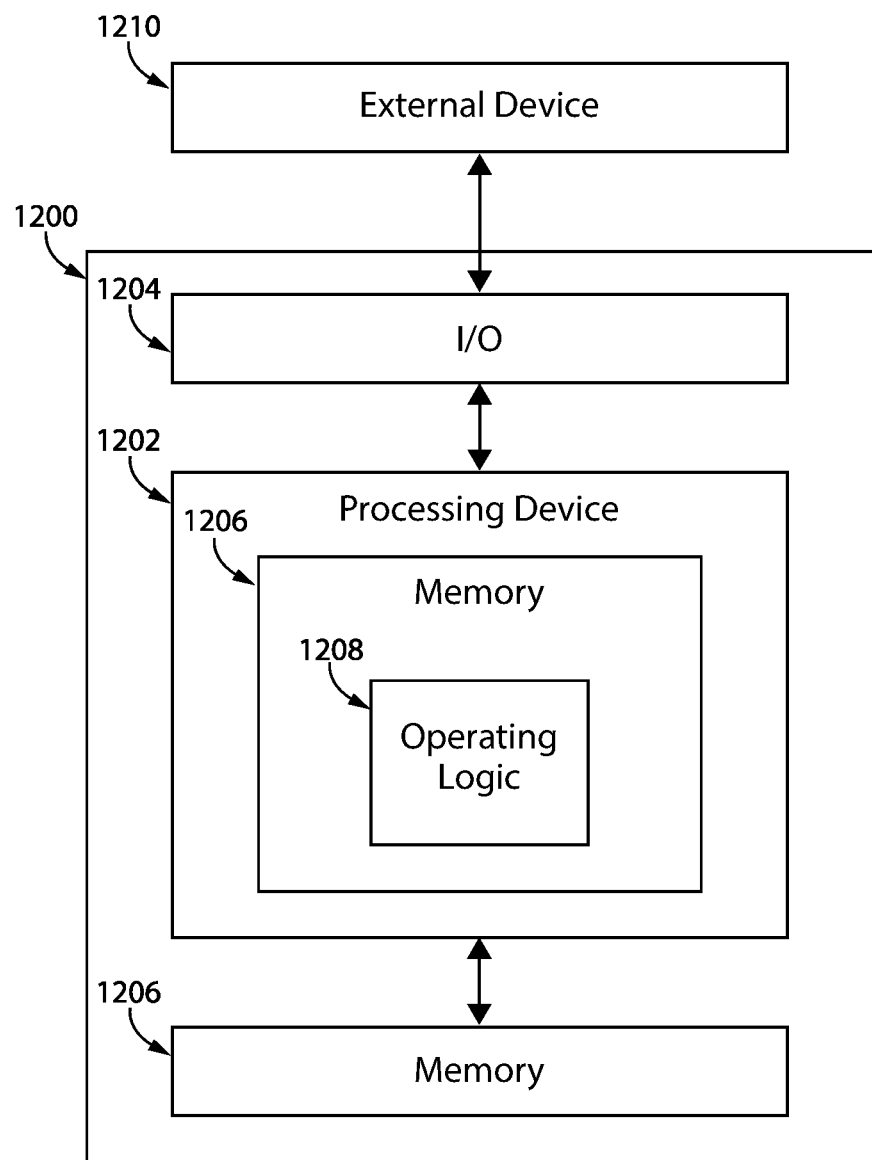
FIG. 33 is a schematic block diagram of a computing device according to certain embodiments.

With additional reference to FIG. 33, illustrated therein is a simplified block diagram of at least one embodiment of a computing device 1200. The illustrative computing device 1200 depicts at least one embodiment of a controller or control system that may be utilized in connection with the controller 152 and/or control system 150 illustrated in FIG. 7.

Depending on the particular embodiment, the computing device 1200 may be embodied as a server, desktop computer, laptop computer, tablet computer, notebook, netbook, Ultrabook™, mobile computing device, cellular phone, smartphone, wearable computing device, personal digital assistant, Internet of Things (IOT) device, control panel, processing system, router, gateway, and/or any other computing, processing, and/or communication device capable of performing the functions described herein.

The computing device 1200 includes a processing device 1202 that executes algorithms and/or processes data in accordance with operating logic 1208, an input/output device 1204 that enables communication between the computing device 1200 and one or more external devices 1210, and memory 1206 which stores, for example, data received from the external device 1210 via the input/output device 1204.

The input/output device 1204 allows the computing device 1200 to communicate with the external device 1210. For example, the input/output device 1204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 1200. The input/output device 1204 may include hardware, software, and/or firmware suitable for performing the techniques described herein.

The external device 1210 may be any type of device that allows data to be inputted or outputted from the computing device 1200. For example, in various embodiments, the external device 1210 may be embodied as the sensor array 156, the wireless communication device 158, the rotors 126, the auxiliary system(s) 170, and/or the external device 190. Further, in some embodiments, the external device 1210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 1210 may be integrated into the computing device 1200.

The processing device 1202 may be embodied as any type of processor(s) capable of performing the functions described herein. In particular, the processing device 1202 may be embodied as one or more single or multi-core processors, microcontrollers, or other processor or processing/controlling circuits. For example, in some embodiments, the processing device 1202 may include or be embodied as an arithmetic logic unit (ALU), central processing unit (CPU), digital signal processor (DSP), and/or another suitable processor(s). The processing device 1202 may be a programmable type, a dedicated hardwired state machine, or a combination thereof. Processing devices 1202 with multiple processing units may utilize distributed, pipelined, and/or parallel processing in various embodiments. Further, the processing device 1202 may be dedicated to performance of just the operations described herein, or may be utilized in one or more additional applications. In the illustrative embodiment, the processing device 1202 is of a programmable variety that executes algorithms and/or processes data in accordance with operating logic 1208 as defined by programming instructions (such as software or firmware) stored in memory 1206. Additionally or alternatively, the operating logic 1208 for processing device 1202 may be at least partially defined by hardwired logic or other hardware. Further, the processing device 1202 may include one or more components of any type suitable to process the signals received from input/output device 1204 or from other components or devices and to provide desired output signals. Such components may include digital circuitry, analog circuitry, or a combination thereof.

The memory 1206 may be of one or more types of non-transitory computer-readable media, such as a solid-state memory, electromagnetic memory, optical memory, or a combination thereof. Furthermore, the memory 1206 may be volatile and/or nonvolatile and, in some embodiments, some or all of the memory 1206 may be of a portable variety, such as a disk, tape, memory stick, cartridge, and/or other suitable portable memory. In operation, the memory 1206 may store various data and software used during operation of the computing device 1200 such as operating systems, applications, programs, libraries, and drivers. It should be appreciated that the memory 1206 may store data that is manipulated by the operating logic 1208 of processing device 1202, such as, for example, data representative of signals received from and/or sent to the input/output device 1204 in addition to or in lieu of storing programming instructions defining operating logic 1208. As illustrated, the memory 1206 may be included with the processing device 1202 and/or coupled to the processing device 1202 depending on the particular embodiment. For example, in some embodiments, the processing device 1202, the memory 1206, and/or other components of the computing device 1200 may form a portion of a system-on-a-chip (SoC) and be incorporated on a single integrated circuit chip.

In some embodiments, various components of the computing device 1200 (e.g., the processing device 1202 and the memory 1206) may be communicatively coupled via an input/output subsystem, which may be embodied as circuitry and/or components to facilitate input/output operations with the processing device 1202, the memory 1206, and other components of the computing device 1200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1200 may include other or additional components, such as those commonly found in a typical computing device (e.g., various input/output devices and/or other components), in other embodiments. It should be further appreciated that one or more of the components of the computing device 1200 described herein may be distributed across multiple computing devices. In other words, the techniques described herein may be employed by a computing system that includes one or more computing devices. Additionally, although only a single processing device 1202, I/O device 1204, and memory 1206 are illustratively shown in FIG. 24, it should be appreciated that a particular computing device 1200 may include multiple processing devices 1202, I/O devices 1204, and/or memories 1206 in other embodiments. Further, in some embodiments, more than one external device 1210 may be in communication with the computing device 1200.

Certain embodiments of the present application relate to an unmanned aerial vehicle, comprising: a chassis; a power supply mounted to the chassis; a control system operable to receive power from the power supply; a plurality of arms extending outward from the chassis, wherein each arm comprises: an arm inner end portion connected to the chassis; an arm outer end portion opposite the arm inner end portion; an arm body extending between and connecting the arm inner end portion and the arm outer end portion; and a rotor mounted to the arm outer end portion, wherein the rotor is in communication with the control system and is operable to generate lift under control of the control system; and a support structure mounted atop the chassis, the support structure comprising a plurality of struts and an apex region, wherein each strut comprises: a strut outer end portion connected with the arm inner end portion of a corresponding arm of the plurality of arms; a strut inner end portion connected with the apex region; and a strut body extending between and connecting the strut outer end portion and the strut inner end portion.

In certain embodiments, each strut body comprises an opening defined in part by a reinforcing rib.

In certain embodiments, each strut body is curved to define an arch.

In certain embodiments, the plurality of struts defines a plurality of arches; and wherein each arch comprises a corresponding pair of struts in which the strut inner end portions of the pair of struts are connected to one another to define the corresponding arch.

In certain embodiments, the plurality of arms comprises a first arm, a second arm opposite the first arm, a third arm, and a fourth arm opposite the third arm; wherein the plurality of struts comprises: a first strut, wherein the strut outer end portion of the first strut is connected with the arm inner end portion of the first arm; a second strut opposite the first strut, wherein the strut outer end portion of the second strut is connected with the arm inner end portion of the second arm; a third strut, wherein the strut outer end portion of the third strut is connected with the arm inner end portion of the third arm; and a fourth strut opposite the third strut, wherein the strut outer end portion of the fourth strut is connected with the arm inner end portion of the fourth arm; wherein the strut inner end portions of the first strut and the second strut are joined to form a first arch; and wherein the strut inner end portions of the third strut and the fourth strut are joined to form a second arch.

In certain embodiments, the first arch comprises a first integrally formed structure, and wherein the second arch comprises a second integrally formed structure.

In certain embodiments, the unmanned aerial vehicle further comprises a detection-and-ranging device mounted to the apex region and in communication with the control system.

In certain embodiments, the unmanned aerial vehicle further comprises a landing apparatus extending below the chassis; wherein the landing apparatus comprises: a first leg comprising a first contact surface connected with the power supply via a first electrical conduit; and a second leg comprising a second contact surface connected with the power supply via a second electrical conduit; wherein the power supply is operable to receive electrical power via the landing apparatus.

In certain embodiments, the first leg is electrically conductive and defines the first contact surface and the first electrical conduit; and wherein the second leg is electrically conductive and defines the second contact surface and the second electrical conduit.

Certain embodiments of the present application relate to a system including the unmanned aerial vehicle, the system further comprising a charging device, the charging device comprising a first contact pad operable to contact the first contact surface and a second contact pad operable to contact the second contact surface; wherein the charging device is configured to apply a voltage differential to the first contact pad and the second contact pad to thereby deliver electrical current to the power supply.

In certain embodiments, the charging device further comprises a nest, and wherein the first contact pad and the second contact pad are positioned within the nest.

Certain embodiments of the present application relate to unmanned aerial vehicle, comprising: a chassis; a power supply mounted to the chassis; a control system operable to receive power from the power supply; a plurality of arms extending outward from the chassis, wherein the plurality of arms includes a first arm and a second arm, and wherein each arm comprises: an inner end portion connected to the chassis; an outer end portion opposite the arm inner end portion; and a rotor mounted to the arm outer end portion, wherein the rotor is in communication with the control system and is operable to generate lift under control of the control system; and a support structure mounted atop the chassis, the support structure comprising a first arch, the first arch comprising: a first arch first end portion connected to the inner end portion of the first arm; a first arch second end portion connected to the inner end portion of the second arm; and a first apex positioned above the chassis.

In certain embodiments, the first arm is diametrically opposite the second arm.

In certain embodiments, the plurality of arms further comprises a third arm and a fourth arm; wherein the support structure further comprises a second arch, the second arch comprising: a second arch first end portion connected to the inner end portion of the third arm; a second arch second end portion connected to the inner end portion of the fourth arm; and a second apex positioned above the chassis.

In certain embodiments, the support structure further comprises an apex region comprising the first apex, the second apex, and a recessed seat defined at least in part by the first arch and the second arch.

In certain embodiments, the unmanned aerial vehicle further comprises a ranging-and-detection device seated in the recessed seat and in communication with the control system.

In certain embodiments, the first apex is joined to the second apex.

In certain embodiments, the first arch comprises a plurality of openings.

In certain embodiments, the first arch further comprises at least one reinforcing rib that partially defines at least two of the openings.

Certain embodiments of the present application relate to an unmanned aerial vehicle, comprising: a chassis; a power supply mounted to the chassis; a control system operable to receive power from the power supply; at least one rotor operable to generate lift under control of the control system; a winch mounted to the chassis, the winch comprising: a reel having a line wound thereon, the line having a free end; a motor operable to rotate the reel under control of the control system to thereby cause the line to wind onto and off of the reel, thereby causing the free end of the line to raise and lower; and a severing mechanism operable to sever the line under control of the control system.

In certain embodiments, the severing mechanism comprises a heating element configured to sever the line by causing the line to burn and/or melt.

In certain embodiments, the heating element defines a tube through which the line extends.

In certain embodiments, the control system is further configured to determine a fault condition based upon information received from one or more electronic components of the unmanned aerial vehicle, and to activate the severing mechanism to sever the line in response to the fault condition.

In certain embodiments, the severing mechanism is mounted to an armature through which the line extends; wherein the armature is biased toward a home position and is configured to move toward a shifted position in response to a load being borne by the line; wherein the winch further comprises a position sensor operable to detect a home/shifted position of the armature; and wherein the control system is configured to determine a loaded/unloaded state of the winch based upon the home/shifted position sensed by the position sensor.

Certain embodiments of the present application relate to an unmanned aerial vehicle, comprising: a chassis; a power supply mounted to the chassis; a control system operable to receive power from the power supply; at least one rotor operable to generate lift under control of the control system; and a winch mounted to the chassis, the winch comprising: a reel having a line wound thereon, the line having a free end; and a motor operable to rotate the reel under control of the control system to thereby cause the line to wind onto and off of the reel, thereby causing the free end of the line to raise and lower; wherein the control system comprises a downward-facing ranging-and-detection device, and is operable to determine a distance between the ranging-and-detection device and a surface below the ranging-and-detection device based upon information generated by the ranging-and-detection device; and wherein the control system is configured to operate the motor to cause the free end of the line to: accelerate toward the surface as the free end of the line passes through a first portion of the distance; and decelerate as the free end of the line passes through a lower portion of the distance.

In certain embodiments, the control system is further configured to operate the motor to cause the free end of the line to lower toward the surface at a controlled speed as the free end of the line passes through an upper portion of the distance, and wherein the first portion of the distance is between the upper portion of the distance and the lower portion of the distance.

In certain embodiments, the controlled speed is a constant speed.

In certain embodiments, the unmanned aerial vehicle further comprises a position sensor in communication with the control system; wherein the line extends through an armature such that the armature moves between a first position and a second position in response to a pulling force being applied to the free end of the line; wherein movement of the armature between the first position and the second position alters an output of the position sensor; and wherein the control system is configured to determine a loaded/unloaded condition of the winch based upon the output of the position sensor.

Certain embodiments of the present application relate to a method of operating an unmanned aerial vehicle (UAV), the method comprising: navigating the UAV to a destination comprising a designated surface, wherein the UAV comprises a winch including a line having a delivery load releasably coupled to a free end of the line; determining a distance between the UAV and the designated surface; operating the winch to lower the delivery load toward the designated surface, comprising: increasing a delivery speed of the delivery load through a first zone of the distance; and reducing the delivery speed of the delivery load through a second zone of the distance, wherein the second zone is located below the first zone.

In certain embodiments, the method further comprises maintaining the UAV at a nominally constant hover height while operating the winch to lower the delivery load toward the designated surface.

In certain embodiments, the navigating, the determining, and the operating are performed by a control system of the UAV.

In certain embodiments, operating the winch further comprises limiting the delivery speed of the delivery load through a third zone of the distance, wherein the third zone is located above the first zone.

In certain embodiments, the method further comprises releasing the delivery load from the free end of the line in response to the delivery load landing on the designated surface; and sensing release of the delivery load via a load sensor of the winch.

In certain embodiments, the load sensor comprises a position sensor associated with a movable armature through which the line extends, and wherein sensing release of the delivery load comprises sensing a position of the armature.

In certain embodiments, the method further comprises operating the winch to raise the free end of the line in response to sensing release of the delivery load.

Certain embodiments of the present application relate to an unmanned aerial vehicle, comprising: a chassis; a power supply mounted to the chassis; a control system operable to receive power from the power supply; at least one rotor operable to generate lift under control of the control system; and a winch mounted to the chassis, the winch comprising: a reel having a line wound thereon, the line having a free end, wherein the reel comprises a circumferential channel in which a wound portion of the line is wound onto the reel, wherein the circumferential channel comprises an inner portion, an outer portion, and a passage connecting the inner portion and the outer portion; and a motor operable to rotate the reel under control of the control system to thereby cause the line to wind onto and off of the reel, thereby causing the free end of the line to raise and lower.

In certain embodiments, the passage has a passage width; wherein the inner portion has an inner portion width; and wherein the passage width is less than the inner portion width.

In certain embodiments, the outer portion tapers inward from an outer portion maximum width to an outer portion minimum width, and wherein the outer portion minimum width is defined between the outer portion maximum width and the passage.

In certain embodiments, the reel comprises a circumferential ridge that at least partially defines the passage.

In certain embodiments, the reel further comprises a circumferential groove facing an apex of the circumferential ridge, the circumferential groove further defining the passage.

In certain embodiments, the reel further comprises: a first portion comprising the circumferential ridge; and a second portion comprising the circumferential groove; wherein the first portion and the second portion are coupled to one another.

Certain embodiments of the present application relate to an unmanned aerial vehicle, comprising: a chassis; a power supply mounted to the chassis; a control system operable to receive power from the power supply; at least one rotor operable to generate lift under control of the control system; a winch mounted to the chassis, the winch comprising: a reel having a line wound thereon; an attachment device coupled to a free end of the line, the attachment device configured to releasably attach a load to the line such that the unmanned aerial vehicle is operable to transport the load; and a motor operable to rotate the reel under control of the control system to thereby cause the line to wind onto and off of the reel, thereby causing the free end of the line to raise and lower.

In certain embodiments, the attachment device comprises: a hook-shaped body portion coupled to the free end of the line, the hook-shaped body portion defining a hook recess; a lever pivotably mounted to the hook-shaped body portion, the lever having a first position in which the lever covers the hook recess, the lever having a second position in which the lever does not cover the hook recess; and a biasing member urging the lever toward the first position.

In certain embodiments, an upper surface of the lever defines a ramp configured to urge an object away from the hook recess when the lever is in the first position.

In certain embodiments, a load is attached to the attachment device; wherein a ring of the load is seated in the hook recess and maintains the lever in the second position; wherein the ring is configured to move out of the hook recess when the load is supported by a surface below the unmanned aerial vehicle, thereby causing the lever to move to the first position under force of the biasing member; and wherein the ramp is configured to urge the ring out of engagement with the lever upon raising of the attachment device by the control system.

Certain embodiments of the present application relate to an unmanned aerial vehicle, comprising: a chassis comprising: a first battery compartment configured to receive sliding insertion of a first battery, the first battery compartment comprising a first latch configured to releasably lock the first battery within the first battery compartment when engaged by the first battery; and a second battery compartment configured to receive sliding insertion of a second battery, the second battery compartment comprising a second latch configured to releasably lock the second battery within the second battery compartment when engaged by the second battery; a control system operable to receive power from the first battery and the second battery; and at least one rotor operable to generate lift under control of the control system when both the first battery and the second battery are installed to the chassis; wherein each of the first latch and the second latch is independently operable to releasably lock the corresponding battery within the corresponding battery compartment such that the second battery is operable to be removed while the first battery remains installed; and wherein the control system is configured to remain at least partially active under power supplied by the first battery when the second battery is removed from the chassis.

In certain embodiments, the control system is configured to remain fully active under power supplied by the first battery when the second battery is removed from the chassis.

In certain embodiments, the control system is further configured to remain at least partially active under power supplied by the second battery when the first battery is removed from the chassis.

In certain embodiments, the at least one rotor is configured to generate the lift to urge the chassis along a vertical axis; wherein the first battery compartment is configured to receive sliding insertion of the first battery along a first horizontally-extending insertion axis; and wherein the second battery compartment is configured to receive sliding insertion of the second battery along a second horizontally-extending insertion axis.

In certain embodiments, the chassis further comprises at least one additional battery compartment configured to receive sliding insertion of at least one additional battery, each additional battery compartment comprising an additional latch configured to releasably lock the corresponding additional battery within the corresponding additional battery compartment when engaged by the corresponding additional battery; wherein the unmanned aerial vehicle is operable to fly when the at least one additional battery is installed to the chassis; and wherein the unmanned aerial vehicle is operable to fly when the at least one additional battery is not installed to the chassis.

In certain embodiments, the at least one additional battery compartment comprises two additional battery compartments; and wherein the at least one additional battery comprises two additional batteries.

In certain embodiments, the unmanned aerial vehicle further comprises a landing apparatus including a plurality of electrically-conductive legs; wherein at least one of the first battery or the second battery is operable to receive electrical power via the plurality of electrically-conductive legs.

Certain embodiments of the present application relate to a method of operating an unmanned aerial vehicle (UAV), the method comprising: installing a first battery to a chassis of the UAV such that a control system of the UAV is operable to receive electrical power from the first battery; with the first battery installed to the chassis, performing an initialization procedure to activate the control system; with the first battery installed to the chassis, installing a second battery to the chassis such that the control system is operable to receive electrical power from each of the first battery and the second battery; with the second battery installed, removing the first battery from the chassis of the UAV such that the control system is inoperable to receive electrical power from the first battery; with the first battery removed and the second battery installed, continuing to operate the control system under power received from the second battery without repeating the initialization procedure.

In certain embodiments, the method further comprises: replacing the first battery with a third battery such that the control system is operable to receive electrical power from each of the second battery and the third battery; and operating the UAV with the second battery and the third battery installed.

In certain embodiments, the method further comprises: after replacing the first battery with the third battery, replacing the second battery with a fourth battery; and while replacing the second battery with the fourth battery, continuing to operate the control system under power received from the third battery.

In certain embodiments, the method further comprises: after performing the initialization procedure and before removing the first battery, operating the UAV, thereby draining electrical power from the first battery.

In certain embodiments, performing the initialization procedure comprises calibrating at least one electronic component of the UAV.

Certain embodiments of the present application relate to an unmanned aerial vehicle, comprising: a chassis comprising a battery compartment; a battery mounted in the battery compartment, wherein the battery is slidable relative to the battery compartment along an insertion/removal axis; a control system operable to receive power from the battery; at least one rotor operable to generate lift under control of the control system; and a latch mechanism operable to selectively limit movement of the battery along the insertion/removal axis, the latch mechanism comprising: a first component comprising a first channel; and a second component comprising a spline operable to be received in each of the first channel and the second channel; wherein one of the first component or the second component is a movable component and further comprises a flange; wherein the latch mechanism has a closed state in which the movable component is in a first rotational position, the spline is received in the first channel, and the flange prevents removal of the battery from the battery compartment; and wherein the latch mechanism has an open state in which the movable component is in a second rotational position, the spline is removed from the first channel, and the flange does not prevent removal of the battery from the battery compartment.

In certain embodiments, engagement between the first channel and the spline prevents rotation of the movable component from the first rotational position to the second rotational position when the spline is received in the first channel.

In certain embodiments, the movable component is rotatable between the first rotational position and the second rotational position upon lifting of the movable component in a vertical direction to remove the spline from the first channel.

In certain embodiments, the first component further comprises a second channel; and wherein with the latch mechanism in the open state, the spline is received in the second channel.

In certain embodiments, engagement between the second channel and the spline prevents rotation of the movable component from the second rotational position to the first rotational position when the spline is received in the second channel.

In certain embodiments, the movable component further comprises a knob configured to facilitate movement of the movable component.

Certain embodiments of the present application relate to an unmanned aerial vehicle, comprising: a chassis; a power supply mounted to the chassis; a control system operable to receive power from the power supply; at least one rotor operable to generate lift under control of the control system;

a carriage mounted to the chassis, the carriage comprising: a first grip; a second grip spaced apart from the first grip such that a receiving space is defined between the first grip and the second grip, the second grip having a first capturing position and a first releasing position, wherein movement of the second grip from the first capturing position to the first releasing position expands the receiving space; and a driver operable to selectively retain the second grip in the first capturing position, wherein the driver is operable to drive a driver shaft between a second capturing position and a second releasing position; wherein the control system is in communication with the driver and is operable to actuate the driver to move the driver shaft between the second capturing position and the second releasing position; and wherein the second grip is configured to move from the first capturing position to the first releasing position in response to movement of the driver shaft from the second capturing position to the second releasing position.

In certain embodiments, the driver comprises a rotary motor configured to rotate the driver shaft between the second capturing position and the second releasing position.

In certain embodiments, the carriage further comprises a carriage lock mechanism configured to retain the second grip in the first capturing position while the driver shaft is in the second capturing position without urging the driver shaft toward the second releasing position.

In certain embodiments, the second grip is connected with a retention arm; wherein the retention arm is rotatably mounted to a locking shaft; wherein the carriage further comprises a latch device, the latch device having: a latching state in which the latch device prevents rotation of the locking arm from a home position, thereby retaining the second grip in the first capturing position; and an unlatching state in which the latch device permits rotation of the locking arm from the home position, thereby permitting movement of the second grip from the first capturing position to the first releasing position; and wherein movement of the driver shaft from the second capturing position to the second releasing position transitions the latch device from the latching state to the unlatching state.

In certain embodiments, the latch device comprises a latchbolt having a projected position in the latching state and a depressed position in the unlatching state; and wherein the latchbolt is configured to move from the projected position to the depressed position in response to movement of the drive shaft from the second capturing position to the second releasing position.

In certain embodiments, the latch device further comprises a biasing mechanism urging the latchbolt toward the projected position.

In certain embodiments, the driver comprises a rotary motor configured to rotate the driver shaft between the second capturing position and the second releasing position; wherein the carriage further comprises a cam shaft engaged with the driver shaft such that rotation of the driver shaft causes a corresponding rotation of the cam shaft; wherein the cam shaft comprises a lobe operable to engage the latchbolt; wherein the lobe is configured to retain the latchbolt in the depressed position when the driver shaft is in the second releasing position; and wherein the biasing mechanism retains the latchbolt in the projected position when the driver shaft is in the second capturing position.

In certain embodiments, the carriage further comprises a latch device, the latch device having a latching state when the driver shaft is in the second capturing position, the latch device having an unlatching state when the driver shaft is in the second releasing position; wherein the latch device in the latching state retains the second grip in the first capturing position; and wherein the latch device in the unlatching state permits movement of the second grip from the first capturing position to the first releasing position.

In certain embodiments, the driver comprises a rotary motor configured to rotate the driver shaft between the second capturing position and the second releasing position; wherein the carriage further comprises a cam shaft engaged with the driver shaft such that rotation of the driver shaft causes a corresponding rotation of the cam shaft; and wherein the cam shaft comprises a lobe that moves the latch device between the latching state and the unlatching state as the driver shaft rotates between the second capturing position and the second releasing position.

Certain embodiments of the present application relate to a carriage configured for mounting to an unmanned aerial vehicle, the carriage comprising: a housing assembly configured for mounting to the unmanned aerial vehicle; a movable grip mounted to the housing assembly for movement between a capturing position and a releasing position; a latch device having a latching state and an unlatching state, wherein the latch device is configured to retain the movable grip in the capturing position when the latch device is in the latching state, and wherein the latch device is configured to permit movement of the movable grip from the capturing position to the releasing position when in the unlatching state; and a driver operable to transition the latch device from the latching state to the unlatching state.

In certain embodiments, the latch device in the latching state is configured to retain the movable grip in the capturing position without transmitting force from the movable grip to the driver.

In certain embodiments, the carriage further comprises a locking shaft rotatably mounted to the housing assembly, wherein the locking shaft is engaged with the movable grip such that movement of the movable grip from the capturing position to the releasing position is correlated with rotation of the locking shaft from a home position to a rotated position; and wherein the latch device is engaged between the housing assembly and the locking shaft; wherein the latch device in the latching state is configured to retain the locking shaft in the home position to thereby retain the movable grip in the capturing position; and wherein the latch device in the unlatching state is configured to permit rotation of the locking shaft from the home position toward the rotated position to thereby enable movement of the movable grip from the capturing position to the releasing position.

In certain embodiments, the carriage further comprises a cam shaft operably connected with the driver such that the driver is operable to rotate the cam shaft between a locking position and an unlocking position; wherein the latch device comprises a biasing mechanism urging the latch device toward the latching state; wherein rotation of the cam shaft from the locking position to the unlocking position causes a lobe of the cam shaft to drive the latch device to the unlatching state against the urging of the biasing mechanism; and wherein rotation of the cam shaft from the unlocking position to the locking position enables the latch mechanism to move to the latching state under the urging of the biasing mechanism.

In certain embodiments, the latch device comprises a latchbolt movably mounted within the locking shaft, the latchbolt having a projected position in which the latchbolt engages the housing assembly and prevents rotation of the locking shaft relative to the housing assembly, the latchbolt having a depressed position in which the latchbolt permits rotation of the locking shaft relative to the housing assembly; wherein the biasing mechanism urges the latchbolt toward the projected position; and wherein rotation of the cam shaft from the locking position to the unlocking position causes the lobe to drive the latchbolt toward the depressed position.

Certain embodiments of the present application relate to an unmanned aerial vehicle (UAV) comprising the carriage, wherein the carriage is mounted to an underside of a chassis of the UAV, and wherein the UAV further comprises a control system in communication with the driver and operable to control the driver to transition the latch device between the latching state and the unlatching state.

In certain embodiments, the UAV further comprises: a power supply mounted to the chassis; and at least one rotor operable to generate lift under control of the control system.

Certain embodiments of the present application relate to a charging station for an unmanned aerial vehicle (UAV), the charging station comprising: a nest including an upper portion and a lower portion, wherein the upper portion defines an upper opening sized and shaped to receive a landing apparatus of the UAV, wherein a diameter of the nest reduces from a first diameter at the upper opening to a second diameter at the lower portion; and a charging device mounted in the nest, the charging device including a first contact pad and a second contact pad electrically isolated from the first contact pad; wherein the charging device is configured to apply a voltage differential across the first contact pad and the second contact pad such that the charging station is operable to charge a power supply of the UAV via the landing apparatus.

In certain embodiments, the charging station is configured for connection to line power, and is configured to apply the voltage differential using electrical power received from the line power.

In certain embodiments, the charging station is configured for connection to a mobile power source, and is configured to apply the voltage differential using electrical power received from the mobile power source.

In certain embodiments, the nest is defined at least in part by a sidewall, and wherein the sidewall is curved within a plane including a central axis of the nest.

In certain embodiments, the nest is defined at least in part by a sidewall, and wherein the sidewall extends at an oblique angle relative to a central axis of the nest.

In certain embodiments, the charging station further comprises a two-dimensional barcode configured to provide orientation information to the UAV.

In certain embodiments, the lower portion defines a lower opening having a third diameter less than the first diameter and the second diameter.

In certain embodiments, the nest includes at least one sidewall that extends between and at least partially defines the upper portion and the lower portion; and wherein each of the first contact pad and the second contact pad is positioned at least partially on the sidewall.

Certain embodiments of the present application relate to a system including the charging station, and further comprising the UAV; wherein the landing apparatus of the UAV includes a plurality of electrical conduits connected with the power supply; and wherein the charging station is configured to charge the power supply when a first of the electrical conduits is in contact with the first contact pad and a second of the electrical conduits is in contact with the second contact pad.

Certain embodiments of the present application relate to a system, comprising: an unmanned aerial vehicle (UAV) comprising: a chassis; a power supply mounted to the chassis; a control system operable to draw power from the power supply; at least one rotor configured to generate lift under control of the control system; and a landing apparatus attached to the chassis, the landing apparatus having a landing apparatus diameter; a mobile base station for the UAV, the mobile base station comprising: a vehicle; and a nest mounted to the vehicle, wherein the nest includes an upper portion and a lower portion, wherein the upper portion includes an upper opening having an upper opening diameter greater than the landing apparatus diameter, and wherein the lower portion has a lower portion diameter less than the upper opening diameter.

In certain embodiments, the vehicle comprises a ceiling; and wherein the nest is mounted to the ceiling.

In certain embodiments, the vehicle further comprises a stowage compartment beneath the nest; and wherein the lower portion defines a lower opening at least selectively open to the stowage compartment.

In certain embodiments, the system further comprises a movable base plate operable to close the lower opening.

In certain embodiments, the lower opening has a lower opening diameter less than the landing apparatus diameter.

In certain embodiments, the landing apparatus comprises a plurality of feet; wherein each foot includes a heel and a toe; wherein the heels define an outer perimeter; and wherein the toes are positioned within the outer perimeter.

Certain embodiments of the present application relate to a method of operating a system comprising an unmanned aerial vehicle (UAV) and a base station, wherein the base station comprises a nest, wherein the nest comprises an upper opening having an upper opening diameter and a lower opening having a lower opening diameter less than the upper opening diameter, and wherein the lower opening is accessible from within the base station, the method comprising: landing the UAV within the nest such that a portion of the UAV is accessible via the lower opening; releasably attaching a load to the UAV; and operating the UAV to deliver the load to a destination.

In certain embodiments, the UAV comprises a winch operable to raise and lower a line, and wherein releasably attaching the load to the UAV comprises releasably attaching the load to the line.

In certain embodiments, a free end of the line has a gravity hook attached thereto, and wherein releasably attaching the load to the line comprises releasably attaching the load to the gravity hook.

In certain embodiments, the nest further comprises a first contact pad and a second contact pad electrically isolated from the first contact pad; wherein the UAV comprises an onboard power supply and a landing apparatus electrically connected with the onboard power supply; wherein landing the UAV within the nest comprises placing a first contact surface of the landing apparatus in contact with the first contact pad and placing a second contact surface of the landing apparatus in contact with the second contact pad; and wherein the method further comprises applying a voltage differential across the first contact pad and the second contact pad, thereby charging the onboard power supply via the landing apparatus.

In certain embodiments, the base station further comprises a two-dimensional barcode providing the UAV with orientation information; wherein landing the UAV within the nest comprises orienting the UAV based upon the orientation information; and wherein orienting the UAV based upon the orientation information comprises aligning the first contact surface with the first contact pad and aligning the second contact surface with the second contact pad.

In certain embodiments, the method further comprises operating a beacon to provide a homing signal to the UAV; wherein landing the UAV within the nest comprises landing the UAV within the nest based at least in part upon the homing signal.

In certain embodiments, the base station is a mobile base station comprising a vehicle.

In certain embodiments, the vehicle comprises a stowage cabin and a ceiling covering the stowage cabin; wherein the lower opening is accessible from within the stowage cabin; and wherein the releasably attaching the load to the UAV is performed from within the stowage cabin.

In certain embodiments, the method further comprises: while operating the UAV to deliver the load to a destination, operating the vehicle to deliver a second load to a second destination remote from the first destination.

In certain embodiments, the method further comprises: providing the UAV with location information relating to a location of the destination; wherein the UAV operates autonomously to deliver the load to the destination based on the location information.

Certain embodiments of the present application relate to a mobile base station, comprising: a delivery vehicle comprising a stowage compartment and a roof covering the stowage compartment and separating an interior of the stowage compartment from an exterior of the stowage compartment; and a nest mounted to the roof, the nest comprising: an upper portion comprising an upper opening accessible from the exterior of the stowage compartment, the upper opening having an upper opening diameter; a lower portion comprising a lower opening accessible from the interior of the stowage compartment, the lower opening having a lower opening diameter less than the upper opening diameter.

In certain embodiments, the nest has a central axis and comprises at least one sidewall extending between the upper portion and the lower portion; wherein the at least one sidewall is angled and/or curved relative to the central axis.

In certain embodiments, the at least one sidewall defines an oblique angle relative to the central axis.

In certain embodiments, the delivery vehicle is a land delivery vehicle comprising a plurality of wheels and a prime mover operable to rotate at least one of the plurality of wheels.

In certain embodiments, the nest extends through the roof such that the upper opening is positioned in the exterior of the stowage compartment and the lower opening is positioned in the interior of the stowage compartment.

In certain embodiments, the nest further comprises a landing zone, the landing zone having a landing zone diameter greater than the lower opening diameter and less than the upper opening diameter.

In certain embodiments, the delivery vehicle comprises a trailer.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An unmanned aerial vehicle, comprising:
    a chassis comprising:
        a first battery compartment configured to receive sliding insertion of a first battery; and
        a second battery compartment configured to receive sliding insertion of a second battery;
    a control system operable to receive power from the first battery and the second battery when the first battery is received in the first battery compartment and the second battery is received in the second battery compartment;
    at least one rotor operable to generate lift under control of the control system when both the first battery and the second battery are installed to the chassis; and
    a latch mechanism operable to selectively limit movement of the first battery along a first insertion/removal axis, the latch mechanism comprising:
        a first component comprising a first channel; and
        a second component comprising a spline configured for insertion in the first channel;
    wherein the control system is configured to remain at least partially active under power supplied by the first battery when the second battery is removed from the second battery compartment;
    wherein one of the first component or the second component is a movable component and further comprises a flange;
    wherein the latch mechanism has a closed state in which the movable component is in a first rotational position, the spline is received in the first channel, and the flange prevents removal of the first battery from the first battery compartment; and
    wherein the latch mechanism has an open state in which the movable component is in a second rotational position, the spline is removed from the first channel, and the flange does not prevent removal of the first battery from the first battery compartment.

2. The unmanned aerial vehicle of claim 1, wherein engagement between the first channel and the spline prevents rotation of the movable component from the first rotational position to the second rotational position when the spline is received in the first channel.

3. The unmanned aerial vehicle of claim 2, wherein the movable component is rotatable between the first rotational position and the second rotational position upon lifting of the movable component in a vertical direction to remove the spline from the first channel.

4. The unmanned aerial vehicle of claim 1, wherein the first component further comprises a second channel; and
    wherein with the latch mechanism in the open state, the spline is received in the second channel.

5. The unmanned aerial vehicle of claim 4, wherein engagement between the second channel and the spline prevents rotation of the movable component from the second rotational position to the first rotational position when the spline is received in the second channel.

6. The unmanned aerial vehicle of claim 1, wherein the movable component further comprises a knob configured to facilitate movement of the movable component.

\* \* \* \* \*